United States Patent [19]
Tsujihara et al.

[11] Patent Number: 5,808,699
[45] Date of Patent: Sep. 15, 1998

[54] VISUAL IMAGE SIGNAL PROCESSING APPARATUS USING ARITHMETIC OPERATION ON BRIGHTNESS REFERENCE SIGNAL OVERLAID IN FLY-BACK PERIOD OF INPUT VISUAL IMAGE SIGNAL

[75] Inventors: Susumu Tsujihara, Neyagawa; Ikunori Inoue, Ibaraki; Yoshio Seki; Mitsuo Isobe, both of Osaka, all of Japan

[73] Assignee: Matsushita Electric Industrial Co., Ltd., Kadoma, Japan

[21] Appl. No.: 688,305

[22] Filed: Jul. 20, 1996

[51] Int. Cl.$^6$ .......................................................... H04N 5/18
[52] U.S. Cl. ............................................. 348/673; 348/689
[58] Field of Search ..................................... 348/673, 678, 348/682, 687, 689; H04N 5/18

[56] References Cited

U.S. PATENT DOCUMENTS

| 4,506,292 | 3/1985 | Newton . |
| 4,604,647 | 8/1986 | Peele . |
| 5,504,538 | 4/1996 | Tsujihara ................................ 348/673 |

FOREIGN PATENT DOCUMENTS

| 50-124830 | 10/1975 | Japan . |
| 61-6985 | 1/1986 | Japan . |
| 3167965 | 7/1991 | Japan . |
| 580876 | 11/1993 | Japan . |
| 695766 | 11/1994 | Japan . |

*Primary Examiner*—Sherrie Hsia
*Attorney, Agent, or Firm*—Renner, Otto, Boisselle & Sklar, P.L.L.

[57] ABSTRACT

A visual image signal processing apparatus includes: an overlaying unit for overlaying a brightness reference signal at a predetermined position in a fly-back period of an input visual image signal; a first clamping unit for clamping an output from the overlaying unit at a predetermined clamping voltage; a detecting unit for applying an output from the first clamping unit to a driving electrode of a cathode ray tube and for detecting a beam current flowing based on the brightness reference signal overlaid in the input visual image signal; and a second clamping unit for controlling the predetermined clamp voltage based on the beam current detected by the detecting unit.

6 Claims, 52 Drawing Sheets

FIG.10
(a) 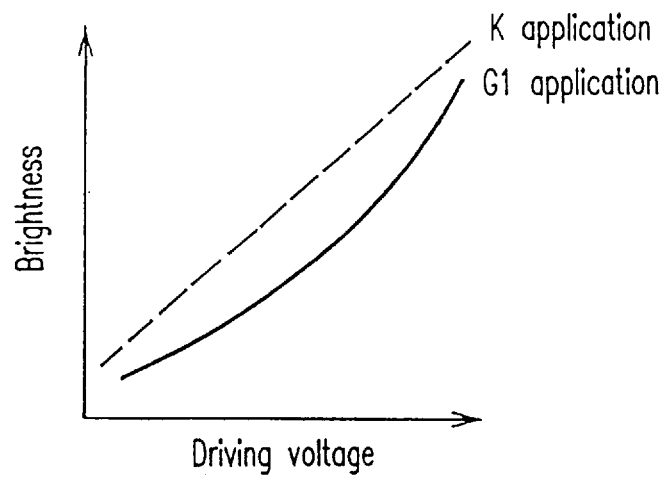
(b) 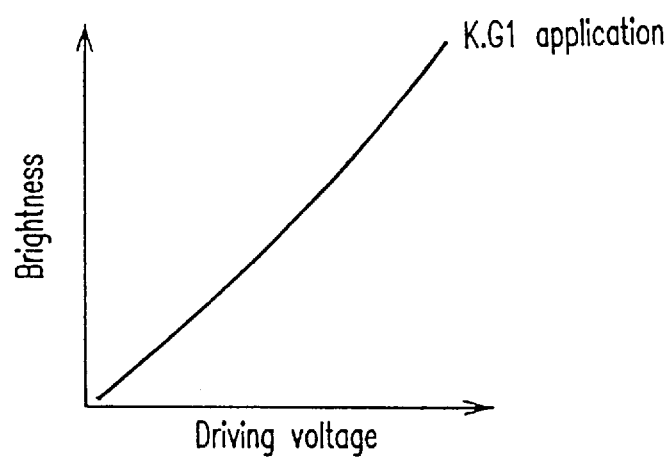
(c) 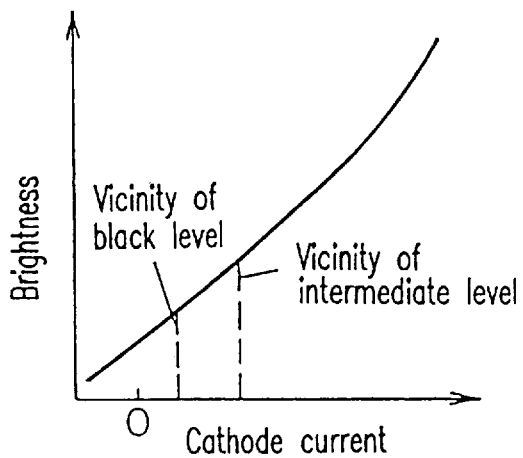

FIG.26
(a)
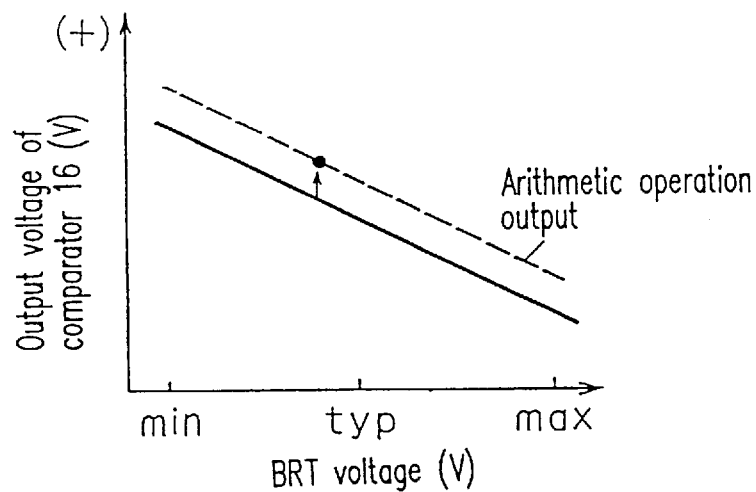
(b)
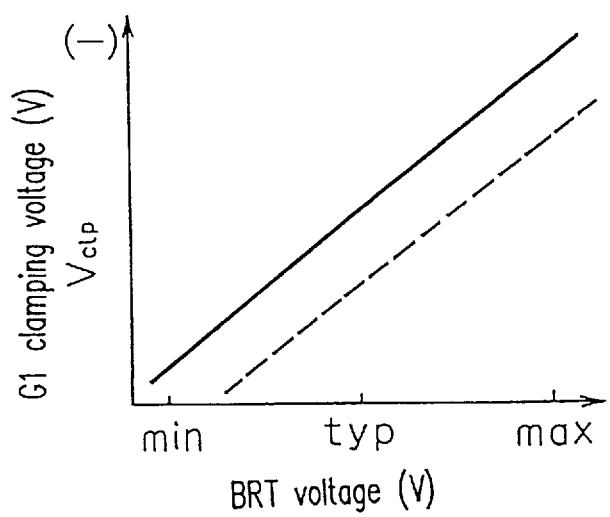
(c)
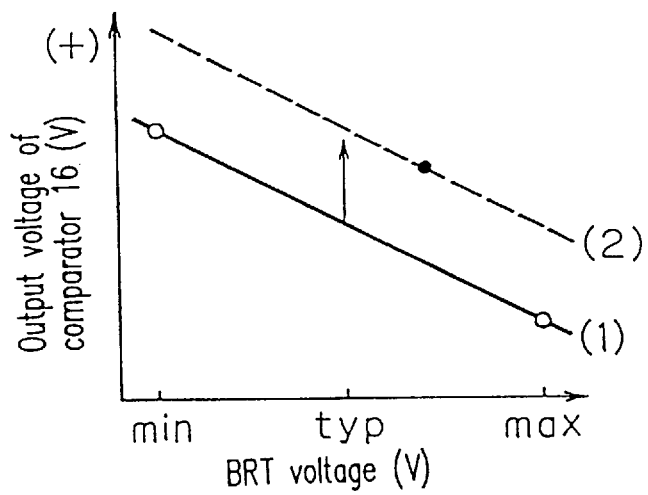

FIG.30
(a)
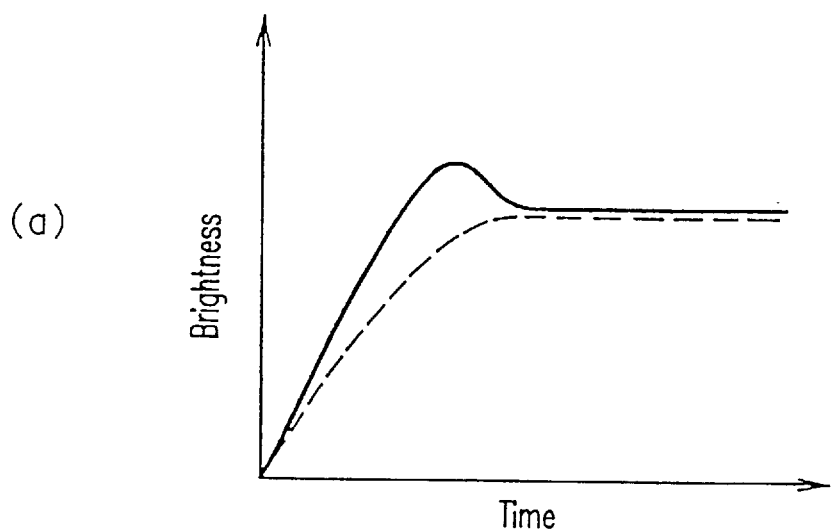
(b)
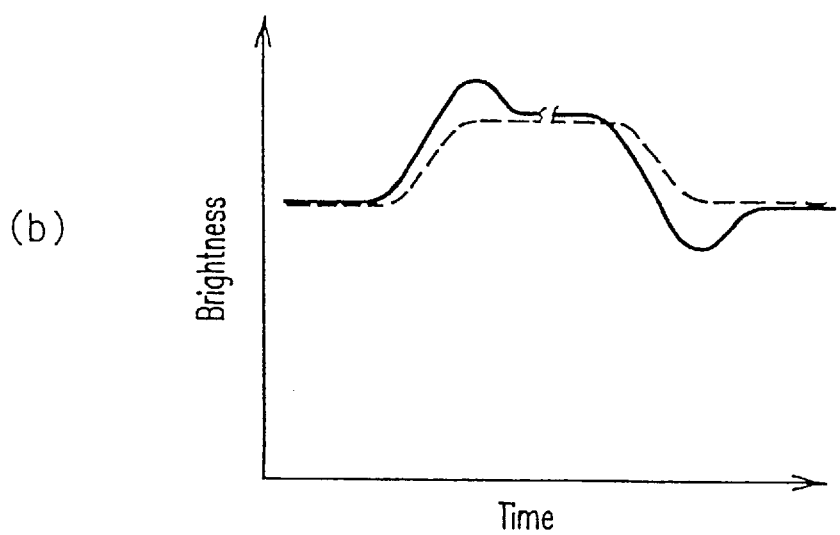

FIG.37
(a) 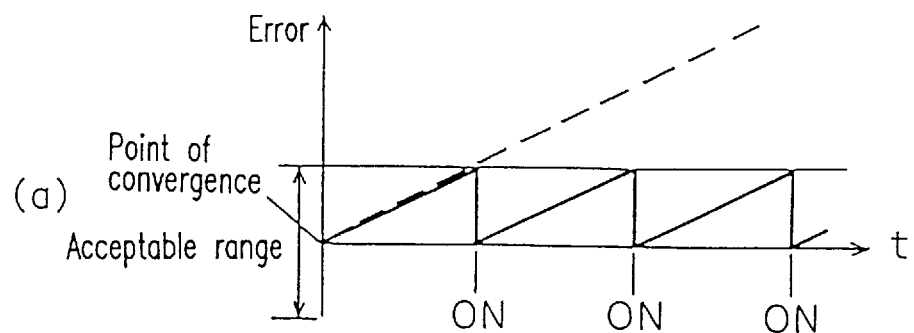
(b) 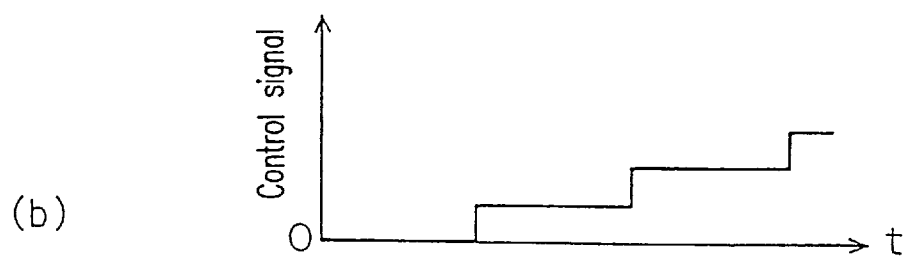
(c) 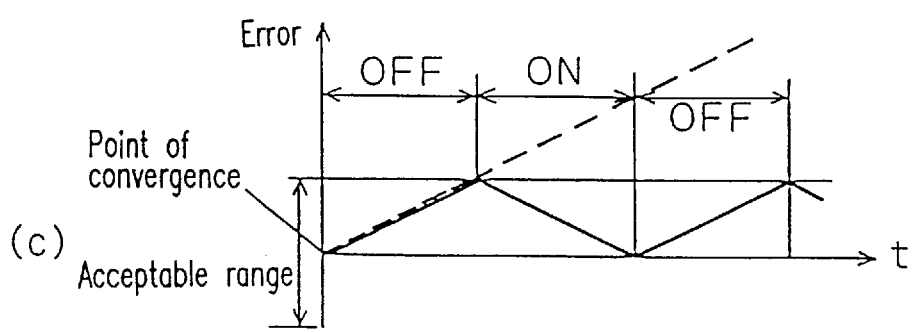
(d) 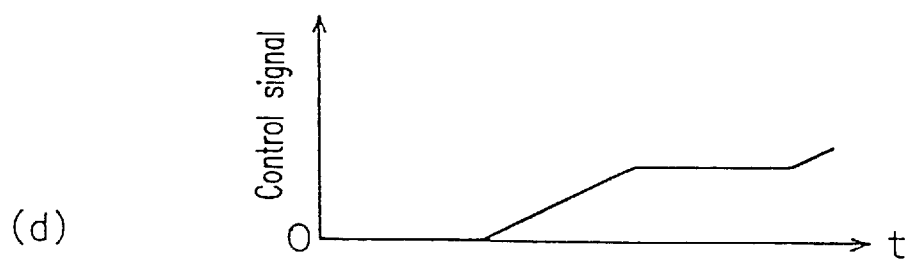

$V_{CONT2} = V_{CONT1} + (\Delta V_{BRT})$ (a)

(b)

```
fH=15.75KHz
fv=60Hz
AKB=ON
VBRT3=128
VCONT3=200
```

(c)

```
fH=127KHz
fv=60Hz
AKB=OFF
VBRT4=256
VCONT4=64
```

VISUAL IMAGE SIGNAL PROCESSING APPARATUS USING ARITHMETIC OPERATION ON BRIGHTNESS REFERENCE SIGNAL OVERLAID IN FLY-BACK PERIOD OF INPUT VISUAL IMAGE SIGNAL

BACKGROUND OF THE INVENTION

1. Field of the Invention

The present invention relates to a visual image signal processing apparatus which can realize a very stable high-fidelity image in a broad band width in processing visual image signals for a color television receiver.

2. Description of the Related Art

Proposed as a conventional visual image signal processing apparatus are: a video driving circuit for a CRT described in Japanese Laid-Open Patent Publication No. 3-167965 including a driving method which can realize broad band width and high brightness with small amplitude by applying visual image signals to the cathode and grid electrodes of the cathode ray tube; an image adjusting apparatus described in Japanese Laid-Open Patent Publication No. 61-6985 including a method for performing stable and highly accurate image adjustment by detecting each reference signal overlaid in the fly-back period of the visual image signal and performing feedback control. Further conventional apparatuses are described in Japanese Patent Publications No. 6-95766 and No. 5-80876 including a method for reducing an adverse influence on an image quality due to a detection pulse during auto white balance adjustment.

FIG. 51 is a block diagram illustrating a conventional visual image signal processing apparatus. In FIG. 51, reference numeral 117 designates an inversion amplifier, reference numeral 119 designates a non-inversion amplifier, reference numerals 121 and 123 designate a video output amplifier and reference numerals 147 and 163 designate a grid electrode and a cathode electrode, respectively, of a cathode ray tube 127.

Next, operation of the apparatus will be described. A visual image signal from the input terminal IN is supplied to the inversion amplifier 117 and to the non-inversion amplifier 119, and visual image signals of both polarities are produced. The visual image signal from the inversion amplifier 117 is supplied to the video output amplifier 121 constituted of cascade amplifiers, which applies the video output signal of positive polarity which has been amplified to a level capable of driving the grid electrode 147 of the cathode ray tube 127. Similarly, the visual image signal from the non-inversion amplifier 119 is amplified by the video output amplifier 123 which applies the video output signal of negative polarity to the cathode electrode 163.

As described above, by driving the cathode ray tube 127 with the video output signals of both polarities applied to the cathode and grid electrodes, 163 and 147 respectively, a cathode ray tube driving apparatus which is capable of realizing broad band width and high brightness with small amplitude can be realized.

FIG. 52 is a block diagram illustrating a conventional visual image signal processing apparatus. In FIG. 52, reference numeral 202 designates a mixer, reference numeral 205 designates a gain adjusting circuit, reference numerals 206 and 212 designate sample holding circuits, reference numerals 208 and 214 designate comparators, and reference numeral 210 designates a video output amplifier.

Next, operation of the apparatus will be described. A video signal, a pulse for contrast adjustment and a pulse for brightness adjustment from the input terminals 201, 203 and 204, respectively, are supplied to the mixer 202 where the pulses are mixed into a fly-back period of the video signal. The contrast adjustment pulse in the mixed video signal from the mixer 202 is detected by a contrast feedback control loop including the gain adjusting circuit 205, the sample holding circuit 206 and the comparator 208 so as to perform gain adjustment. The signal which has been adjusted for the gain from the gain adjusting circuit 205 is supplied to the video output amplifier 210 which applies the video output signal amplified to a level capable of driving the cathode electrode of the cathode ray tube 211.

The cut-off adjustment is performed by controlling the direct current voltage at the grid electrode of the cathode ray tube so that the pulse for brightness adjustment is maintained constant by detecting the beam current in the brightness feedback control loop including the video output amplifier 210, the sample holding circuit 212 and the comparator 214.

As described above, by always performing feedback control so as to fix the voltage value of the pulses for contrast and brightness adjustments always at a reference voltage, stable contrast and auto cut-off (auto Kine Bias) controls can be performed, thereby realizing a stable visual image processing apparatus.

FIG. 53 is a block diagram illustrating a conventional visual image processing apparatus. R, G and B signals from input terminals representing three primaries are added to amplifiers 311R, 311G and 311B for white balance and brightness adjustments through adders 310R, 310G and 310B. Furthermore, the output from these amplifiers are supplied to a CRT 313 through driving amplifiers 312R, 312G and 312B, respectively. Control signals are supplied from a control micro computer 320 to a detection pulse generating circuit 332 through a bus and an interface 327, and detection pulses are supplied from this generating circuit 332 to the adders 310R, 310G and 310B, respectively. This detection pulse constitutes a black level signal for cut-off current measurement and, for example, a 50 IRE level signal for driving current measurement. A current measuring circuit 333 is connected to the cathodes of CRT 313, each representing red, green and blue, and the cut-off current and the driving current of the cathodes are measured with timing of the detection pulse added to each primary color signal. This measurement result is transformed into digital signals by an A/D transformer 334 and then supplied to the control micro computer 320 through the interface 327 and the bus. The cut-off current and the driving current for each color when white balance is adjusted are written in a memory 323 as a reference value. At the same time, an amplifier control circuit 311 is controlled by the micro computer 320 so that the cut-off voltage and the driving voltage become predetermined values, thereby automatically directing adjustment to the white balance. Moreover, when fluctuations of synchronization signal such as switching of input signals, switching of channels, lack of synchronization signals and the like are present, the insertion of the detection pulse is stopped or its level is reduced so that the automatic white balance adjustment is not performed.

As described above, when there is a fluctuation of the synchronization signal, the auto white balance adjustment is stopped so that any adverse influence on an image quality due to the detection pulse is reduced.

However, in the structure of a conventional visual image processing apparatus, although the broad band width, the low power consumption and the miniaturization can be easily realized by driving the cathode and the grid in parallel, light emitting characteristics differ for each electrode of the cathode ray tube and, therefore, the color intensity of the image considerably fluctuates. Especially in a CRT projection type display in which large screen display is performed, saturation of the light emitting characteristics of fluorescent material occurs and, therefore, fluctuation of the color intensity becomes very large compared to a direct view type display. Furthermore, in order to stabilize the color intensity, it is necessary to perform complex gradient compensation using digital technology. This makes the scale of a circuit very large because of a need for fast processing and for an increase in the number of quantization bits. It further makes it impossible to realize processing of broad band width due to an impairment of the performance and reliability.

As a result, although the color intensity can be stabilized by an addition of the AKB function, since the apparatus is used in an underscanning mode especially for computer signals, signals for detection stand out and deterioration of frequency characteristics occurs in the cathode current detecting unit.

SUMMARY OF THE INVENTION

According to one aspect of the present invention, a visual image signal processing apparatus includes: an overlaying unit for overlaying a brightness reference signal at a predetermined position in a fly-back period of an input visual image signal; a first clamping unit for clamping an output from the overlaying unit at a predetermined clamping voltage; a detecting unit for applying an output from the first clamping unit to a driving electrode of a cathode ray tube and for detecting a beam current flowing based on the brightness reference signal overlaid in the input visual image signal; and a second clamping unit for controlling the predetermined clamp voltage based on the beam current detected by the detecting unit.

In one embodiment of the present invention, the brightness reference signal includes a first brightness reference signal and a second brightness reference signal; the first clamping unit clamps a wave height value of the second brightness reference signal at the predetermined clamping voltage; and the detecting unit detects a beam current flowing based on the first brightness reference signal.

In one embodiment of the present invention, the second clamping unit outputs a control data controlling the predetermined clamping voltage. The visual image signal processing apparatus further includes a data holding unit for holding the control data.

In one embodiment of the present invention, the driving electrode of the cathode ray tube is one of a cathode electrode and a grid electrode or both of a cathode electrode and a grid electrode.

In one embodiment of the present invention, the visual image signal processing apparatus further includes a gamma correction unit for performing a non-linear gamma correction on the output from the overlaying unit.

According to another aspect of the present invention, a visual image signal processing apparatus includes: an overlaying unit for overlaying a brightness reference signal at a predetermined position in a fly-back period of an input visual image signal; an output unit for applying an output from the overlaying unit to a cathode electrode of a cathode ray tube; an arithmetic unit for obtaining by arithmetic operation a control signal controlling a brightness based on the brightness reference signal overlaid in the input visual image signal; and a clamping unit for controlling a voltage applied to a grid electrode of the cathode ray tube in accordance with the control signal.

In one embodiment of the present invention, the overlaying unit overlays the brightness reference signal at a predetermined position in a vertical fly-back period of the input visual image signal.

In one embodiment of the present invention, the visual image signal processing apparatus further includes a detecting unit for detecting at least one of a wave height value of the brightness reference signal overlaid in the input visual image signal and a beam current flowing based on the brightness reference signal overlaid in the input visual image signal.

In one embodiment of the present invention, the arithmetic unit obtains by arithmetic operation the control signal based on the brightness reference signal overlaid in the input visual image signal and a light emitting characteristic of the cathode ray tube.

In one embodiment of the present invention, the arithmetic unit obtains by arithmetic operation the control signal based on a wave height value of the brightness reference signal overlaid in the input visual image signal. The visual image signal processing apparatus further includes: a detecting unit for detecting a beam current flowing based on the brightness reference signal overlaid in the input visual image signal; and a switching circuit for supplying to the clamping unit one of a output from the arithmetic unit and an output from the detecting unit.

In one embodiment of the present invention, the visual image signal processing apparatus further includes a detecting unit for detecting a beam current flowing based on the brightness reference signal overlaid in the input visual image signal. The arithmetic unit obtains by arithmetic operation the control signal based on a wave height value of the brightness reference signal overlaid in the input visual image signal and an output from the detecting unit.

According to yet another aspect of the present invention, a visual image signal processing apparatus includes: an overlaying unit for overlaying a brightness reference signal at a predetermined position in a fly-back period of an input visual image signal; a detecting unit for applying an output from the overlaying unit to a cathode electrode of a cathode ray tube and for detecting a beam current flowing based on the brightness reference signal overlaid in the input visual image signal; an image adjustment signal generating unit for generating an image adjustment signal including a contrast and a brightness; and a clamping unit for controlling a voltage applied to a grid electrode of the cathode ray tube in accordance with an output from the detecting unit and the image adjustment signal.

In one embodiment of the present invention, the voltage applied to the grid electrode of the cathode ray tube is further controller in accordance with a wave height value of the brightness reference signal overlaid in the input visual image signal.

According to still another aspect of the present invention, a visual image signal processing apparatus includes: an overlaying unit for overlaying a cut-off adjustment signal at a predetermined position in a fly-back period of an input visual image signal; a detecting unit for applying an output from the overlaying unit to a driving electrode of a cathode ray tube and for detecting a beam current flowing based on the cut-off adjustment signal overlaid in the input visual image signal; a cut-off adjustment unit for performing a cut-off adjustment for the cathode ray tube based on the beam current detected by the detecting unit; and a cut-off adjustment signal generating unit for generating the cut-off adjustment signal in accordance with a display information displayed on the cathode ray tube.

In one embodiment of the present invention, the display information includes an image scene and an image adjustment condition, and the cut-off adjustment signal is generated in accordance with a change of at least one of the image scene and the image adjustment condition.

In one embodiment of the present invention, the display information includes a screen size of an image displayed on the cathode ray tube, and the cut-off adjustment signal is generated in accordance with a change in the screen size of the image.

In one embodiment of the present invention, the display information includes a brightness and a color intensity of an image displayed on the cathode ray tube, and the cut-off adjustment signal is generated in accordance with a change in at least one of the brightness and the color intensity of the image.

According to still another aspect of the present invention, a visual image signal processing apparatus, in which a white balance is automatically adjusted based on a beam current of a cathode ray tube based on a brightness reference signal overlaid in an input visual image signal, includes: blanking means for blanking the brightness reference signal after adjusting the white balance; arithmetic means for obtaining by arithmetic operation a control signal controlling a brightness based on a wave height value of the brightness reference signal and the beam current before the blanking; and control means for controlling the brightness in accordance with the control signal.

In one embodiment of the present invention, the blanking means shifts the brightness reference signal to inside a vertical blanking period after the white balance adjustment.

In one embodiment of the present invention, the blanking means performs blanking on the brightness reference signal in response to a vertical blanking signal after the white balance adjustment.

In one embodiment of the present invention, the arithmetic means obtains by arithmetic operation the control signal based on a wave height value of the brightness reference signal and the beam current during the white balance adjustment, and the arithmetic means obtains by arithmetic operation the control signal based on a change in the wave height value of the brightness reference signal after the white balance adjustment.

In one embodiment of the present invention, the white balance adjustment is performed when a power source is engaged.

According to still another aspect of the present invention, a visual image signal processing apparatus, in which a white balance is automatically adjusted based on a beam current of a cathode ray tube flowing based on a brightness reference signal overlaid in an input visual image signal, includes: setting means for setting an automatic white balance adjustment operational function; detecting means for detecting a wave height value of the brightness reference signal and the beam current; memory means for storing an output from the setting means and an output from the detecting means; arithmetic means for obtaining by arithmetic operation the automatic white balance adjustment operational function and a control signal controlling a brightness after the white balance adjustment based on the data stored in the memory means; and control means for controlling the brightness in accordance with the control signal.

In one embodiment of the present invention, when the automatic white balance adjustment operational function is set to be stopped, the white balance adjustment is performed when a power source is engaged, and the white balance adjustment is stopped thereafter.

In one embodiment of the present invention, the arithmetic means obtains by arithmetic operation the control signal based on a wave height value of the brightness reference signal and the beam current during the white balance adjustment, and the arithmetic means obtains by arithmetic operation the control signal based on a change in the wave height value of the brightness reference signal after the white balance adjustment.

According to still another aspect of the present invention, a visual image signal processing apparatus includes: an overlaying unit for overlaying a brightness reference signal and a contrast reference signal at predetermined positions in a fly-back period of an input visual image signal; a detecting unit for applying an output from the overlaying unit to a cathode electrode and a grid electrode of a cathode ray tube and for detecting a wave height value of the brightness reference signal overlaid in the input visual image signal, a wave height value of the contrast reference signal overlaid in the input visual image signal and a beam current flowing based on the brightness reference signal overlaid in the input visual image signal; a gain controlling unit for controlling a gain based on the wave height value of the contrast reference signal detected by the detecting unit; a first controlling unit for controlling a brightness based on the beam current detected by the detecting unit; and a second controlling unit for obtaining by arithmetic operation a control signal controlling the brightness based on the wave height value of the brightness reference signal and the beam current detected by the detecting unit and for controlling the brightness in accordance with the control signal.

In one embodiment of the present invention, the overlaying unit overlays the contrast reference signal at a predetermined position in a horizontal fly-back period of the input visual image signal and overlays the brightness reference signal at a predetermined position in a vertical fly-back period of the input visual image signal; and the gain controlling unit and the first controlling unit perform a voltage feedback control using the contrast reference signal and perform a current feedback control using the brightness reference signal.

In one embodiment of the present invention, the second controlling unit obtains by arithmetic operation the control signal based on the wave height value of the brightness reference signal and the beam current during a white balance adjustment, and the second controlling unit obtains by arithmetic operation the control signal based on a change in the wave height value of the brightness reference signal after the white balance adjustment.

Thus, the invention described herein makes possible the advantage of providing a visual image signal processing apparatus which can realize an image having very stable color intensity and high-fidelity in a broad band width.

In order to achieve the above-mentioned advantage, in the present invention, an image is displayed by driving the cathode ray tube by the visual image signal overlaid with the cut-off adjustment signal in the fly-back period, and the cut-off adjustment of the cathode ray tube is automatically controlled by the detection signal which detected the beam current of this adjustment signal in accordance with the display conditions, so that the on/off operation of the auto cut-off function and the signal for cathode current detection do not stand out and a visual image signal processing apparatus which can realize a highly stable image display of high fidelity can be provided.

These and other advantages of the present invention will become apparent to those skilled in the art upon reading and understanding the following detailed description with reference to the accompanying figures.

BRIEF DESCRIPTION OF THE DRAWINGS

FIGS. 10(a) to (c) are characteristic views for describing the parallel driving operation in the first example.

FIGS. 26(a) to (c) are characteristic views for describing the arithmetic operation in the second example.

FIGS. 30(a) and (b) are characteristic views for describing the transitional response during the auto cut-off ON/OFF in the third example.

FIGS. 37(a) to (d) are characteristic views for describing the auto cut-off converging operation in the fourth example.

DESCRIPTION OF THE PREFERRED EMBODIMENTS (Example 1)

Figure 1:
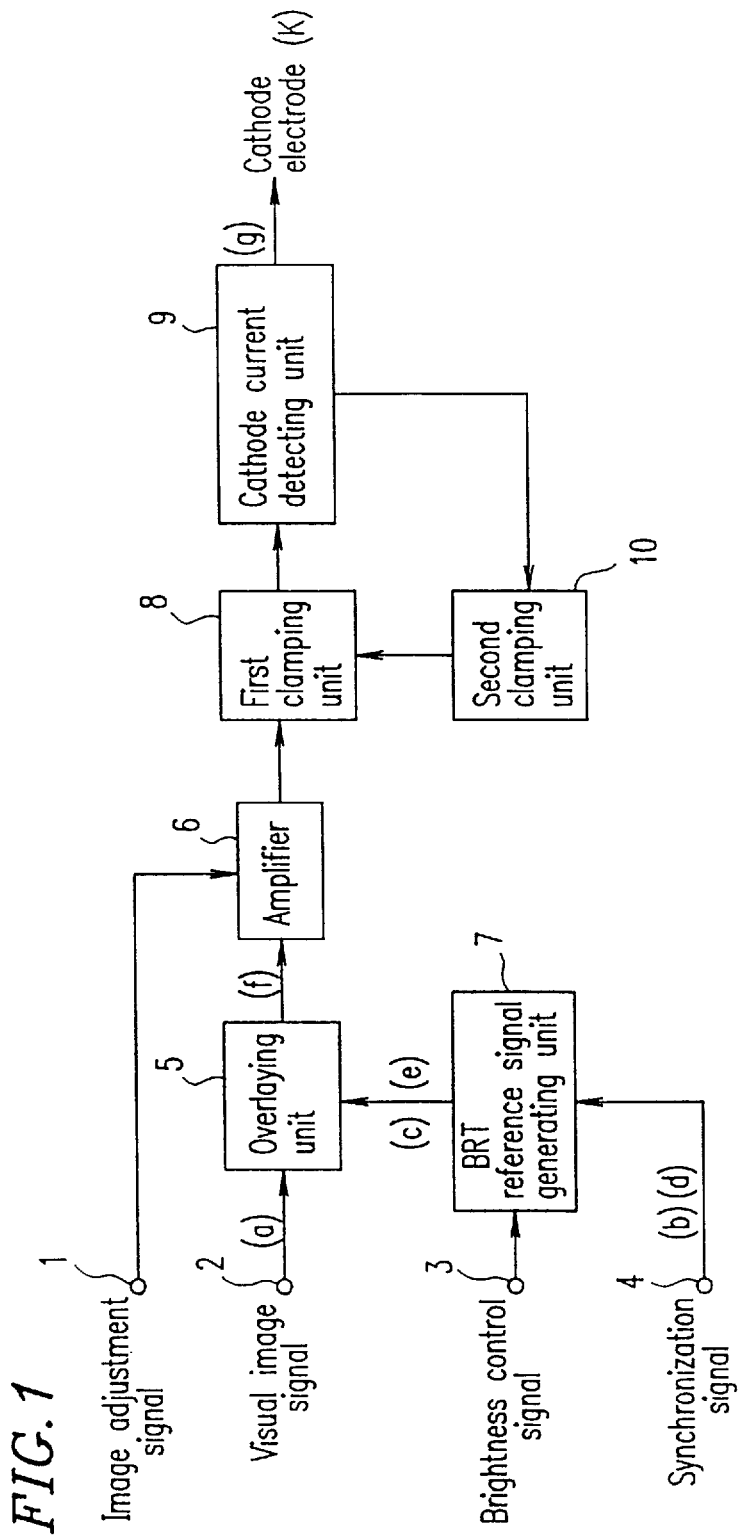
FIG. 1 is a block diagram for a visual image signal processing apparatus according to a first example of the present invention.

Hereinafter, a visual image signal processing apparatus according to a first example of the present invention will be described with reference to the figures. FIG. 1 is a block diagram illustrating the visual image signal processing apparatus according to the first example of the present invention.

In FIG. 1, reference numeral 1 designates an input terminal to which an image adjustment signal such as a contrast (referred to as CONT hereinafter) control signal is supplied, reference numeral 2 designates an input terminal to which a visual image signal is supplied, and reference numeral 3 designates an input terminal to which a brightness control signal is supplied. Reference numeral 4 designates an input terminal to which a synchronization signal is supplied, reference numeral 7 designates a BRT signal generating unit which generates a brightness reference signal (referred to as a BRT signal hereinafter) in the horizontal and vertical fly-back periods, and reference numeral 5 designates an overlaying unit which overlays the before-mentioned BRT signal on the visual image signal. Furthermore, reference numeral 6 designates an amplifier which varies a gain by the image adjustment signal from the input terminal 1, reference numeral 8 designates a first clamping unit which clamps with the BRT signal from the amplifier 6, reference numeral 9 designates a cathode current detecting unit which detects cathode current of the before-mentioned BRT signal, and reference numeral 10 designates a second clamp for controlling clamp voltage of the first clamp 8 with the detection signal from the cathode current detecting unit 9.

Figure 2:
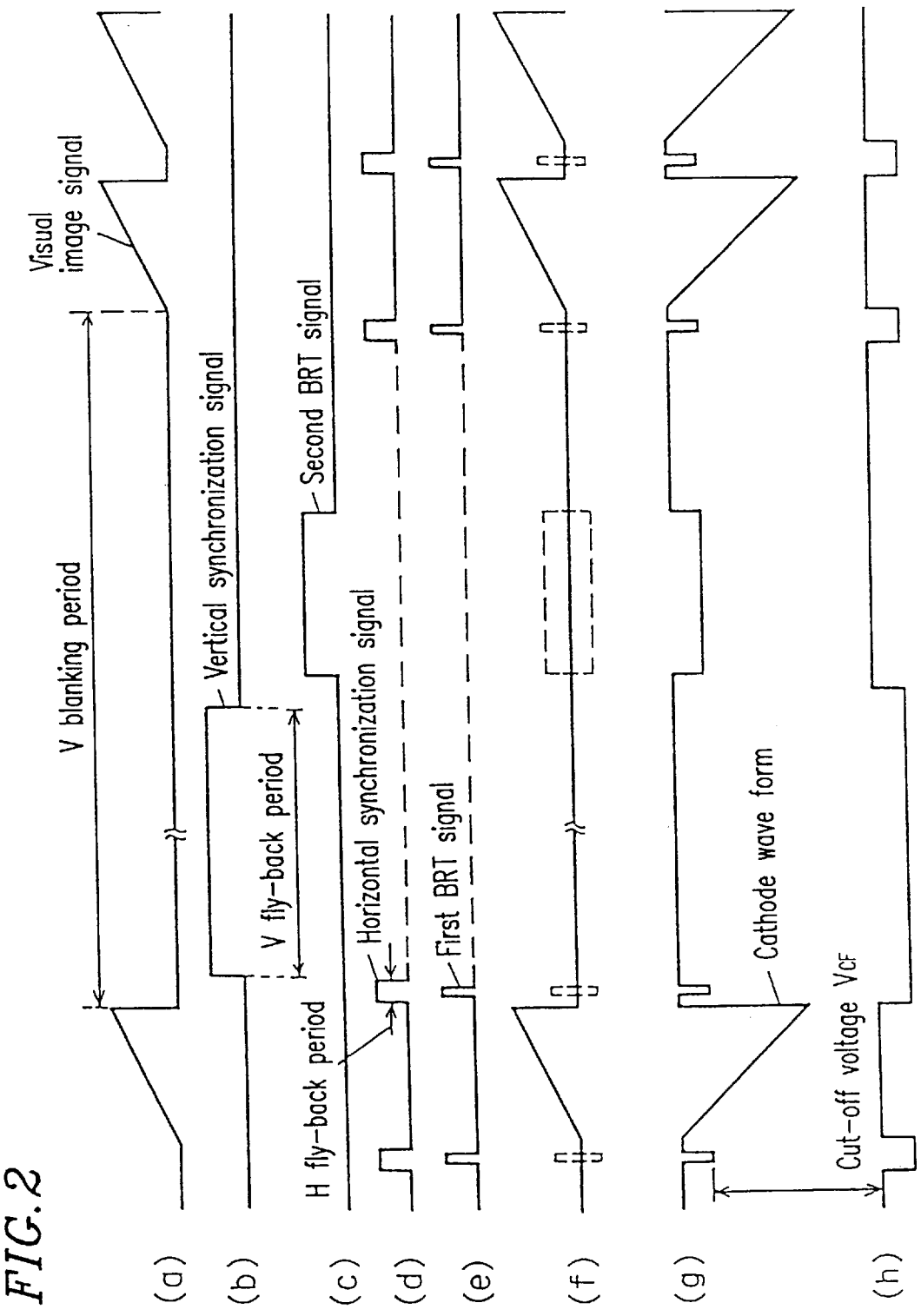
FIGS. 2(a) to (h) are operational wave form diagrams for describing the operation in the first example.

Operation of the visual image signal processing apparatus of the first example constituted as above will be described with reference to an operation wave form diagram in FIGS. 2(a) to 2(h). FIG. 2(a) illustrates the visual image signal which is supplied to the input terminal 2. FIGS. 2(b) and 2(d) illustrate the vertical synchronization signal and the horizontal synchronization signal, respectively, which are synchronized with polarization and supplied to the input terminal 4.

The BRT reference signal generating unit 7 produces a second BRT signal illustrated in FIG. 2(c) and a first BRT signal illustrated in FIG. 2(e). The wave height value of the BRT signal is controlled by the BRT control signal from the input terminal 3. The second BRT reference signal illustrated in FIG. 2(c) is produced in a period outside of the vertical fly-back period (hereinafter, referred to as V fly-back period) of FIG. 2(b), which is within the vertical blanking period (hereinafter, referred to as V blanking period) of FIG. 2(a). The reason is that the detection of the cathode current of the BRT signal is to be performed down stream. In this example, the system is such that a signal for conventional AKB detection and the BRT control signal are used together in order to improve color reproduction performance both in the color intensity tracking of the drive system and in the BRT control in parallel drive.

The first and second BRT signals from the BRT reference signal generating unit 7 and the visual image signal are overlaid by the overlaying unit 5 constituted of analog switches or the like and the BRT signal illustrated by a broken line in FIG. 2(f) is produced. A signal clamped in the pedestal period of the visual image signal from the overlaying unit 5 is amplified by the amplifier 6 constituted of cascade amplifying circuits or the like and, then, clamped by the first clamping unit at the wave height value of the first BRT signal overlaid in the horizontal fly-back period and supplied to the cathode current detecting unit 9. The cathode current detecting unit 9 detects the cathode current of the second BRT signal overlaid in the V blanking period, and the visual image output signal of negative polarity illustrated in FIG. 2(g) is applied to the cathode electrode (referred to as K electrode hereinafter) of the cathode ray tube. The detection signal which detected the cathode current of the second BRT signal from the cathode current detecting unit 9 is supplied to the second clamping unit 10 and, after being compared to the reference voltage, the comparison result is fed back to the first clamping unit 8. That is, in the first clamping unit 8, the signal is clamped at the voltage value of the first BRT signal overlaid in the horizontal fly-back period, and in the second clamping unit 10, the above-mentioned clamp voltage is controlled by the feedback at the current value of the second BRT signal overlaid in the vertical fly-back period. Moreover, the blanking signal (BLK) illustrated in FIG. 2(h) is applied to the first grid electrode (referred to as $G_1$ electrode hereinafter) of the cathode ray tube. As illustrated in FIGS. 2(g) and 2(h), it becomes possible to perform the feedback control of the BRT such that the cut-off voltages $V_{CF}$ of the K voltage and the $C_1$ voltage are always constant.

As in the description of the operation of the BRT control with FIGS. 2(a) to 2(h), the amplifier 6 controls only the amplitude of the visual image signal so that the pedestal voltage is always constant. Therefore, the large amplitude and the broad band width in the amplifier can be easily realized. Moreover, since the BRT control controls the voltage of the cathode clamp, the BRT control can be performed with a simple configuration.

Figure 3:
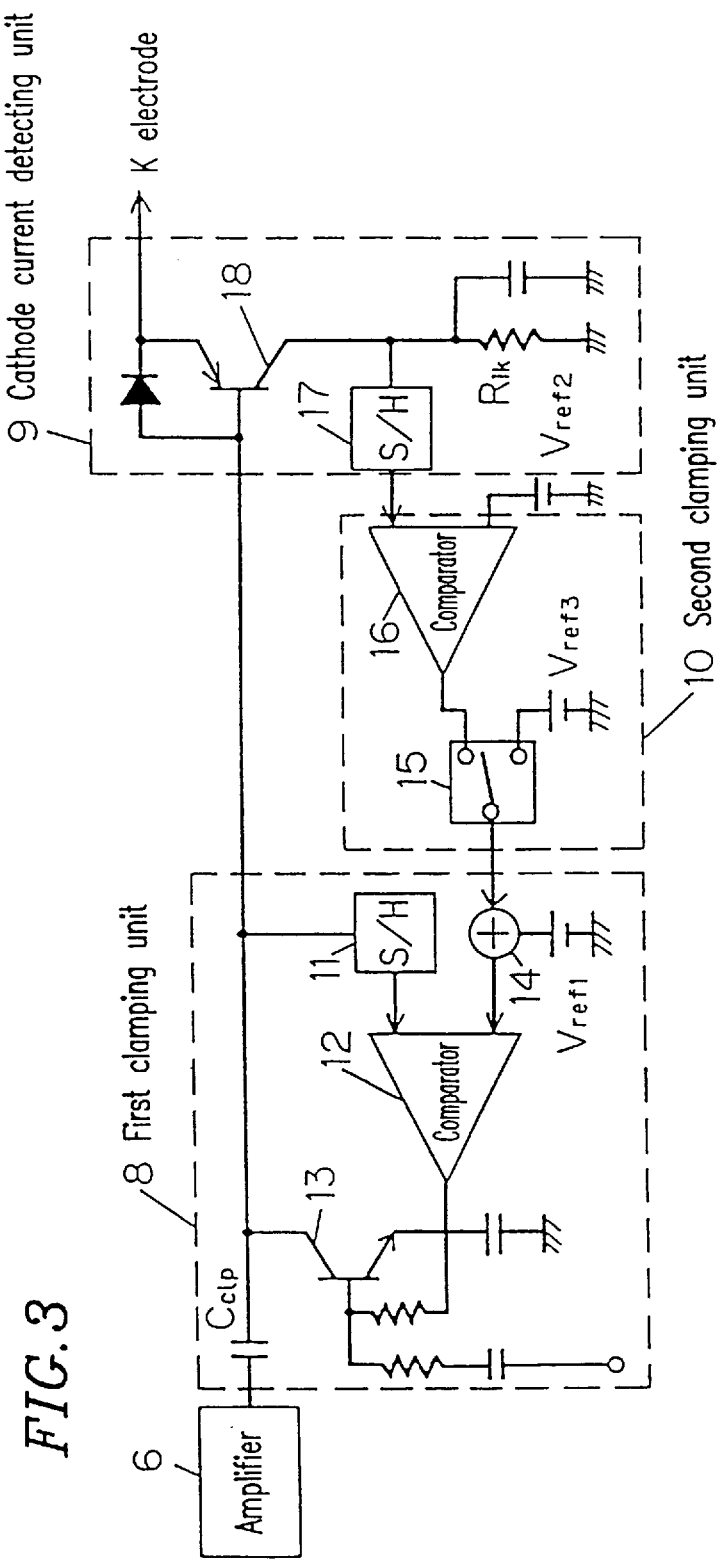
FIG. 3 is a block diagram for describing the brightness control operation in the first example.
Figure 4:
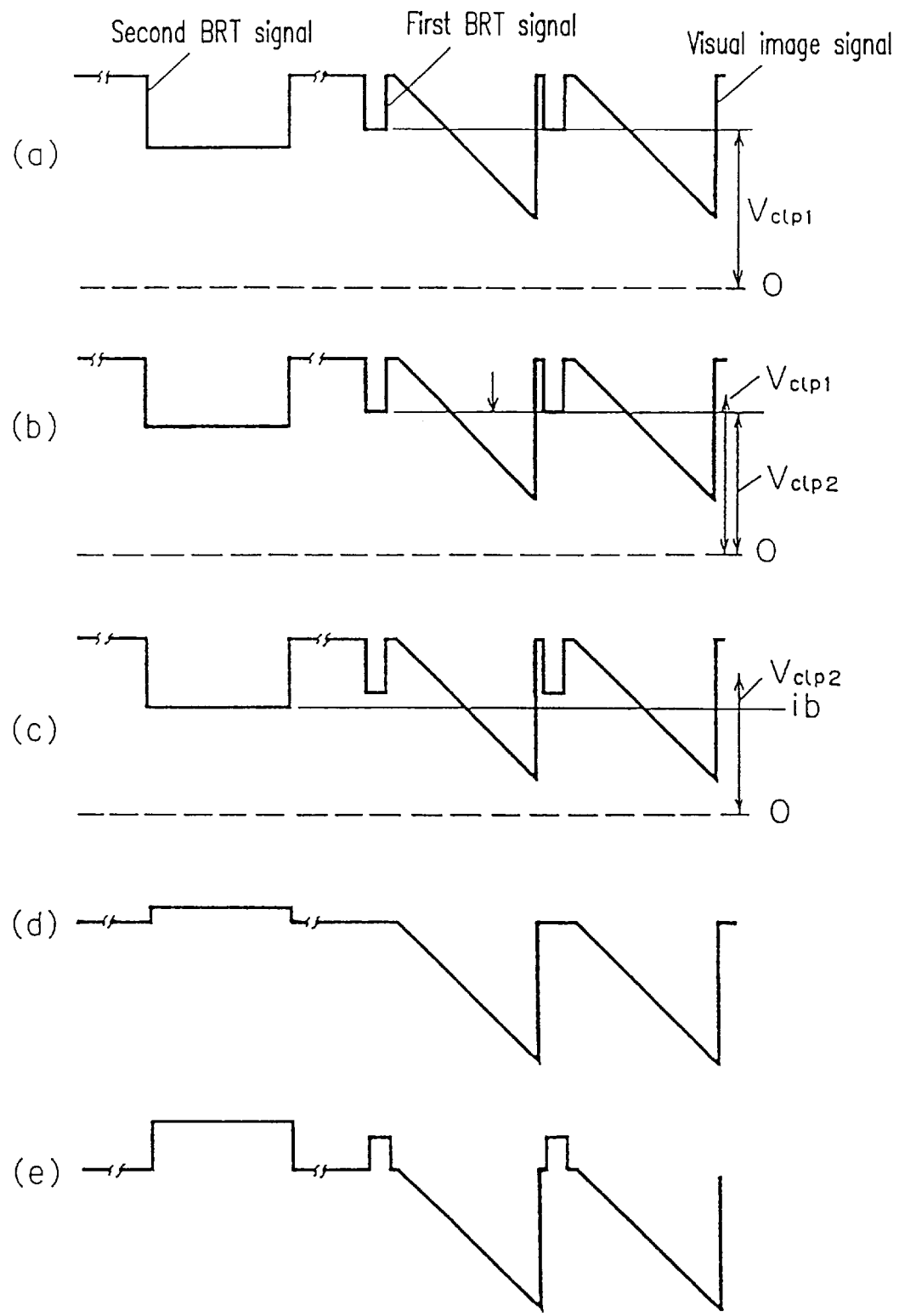
FIGS. 4(a) to (e) are operational wave form diagrams for describing the brightness control operation in the first example.

Next, operation of the cathode clamp and a method for controlling BRT will be described in detail with reference to a block diagram in FIG. 3 and wave form diagrams in FIGS. 4(a) to 4(e). In FIG. 3, those elements having similar functions as in FIG. 1 are designated by the same reference numerals.

First, a first clamping operation will be described. A visual image output signal of negative polarity from the amplifier 6 is supplied to a clamping transistor 13 through a clamping capacitor $C_{CLP}$ and then pulse-clamped at the wave height value of the first BRT signal. This first clamping unit 8 is constituted of a voltage detection type feedback clamp including a clamping transistor 13, a sample holding circuit (S/H) 11 and a comparator 12. The S/H 11 performs a sample holding for the wave height value of the first BRT signal of the K voltage illustrated in FIG. 4(a) and extracts the clamp voltage $V_{CLP1}$. This signal is compared with the reference voltage $V_{ref1}$ in the comparator 12 and then clamped with feedback so that the signal becomes a proper clamping voltage $V_{CLP2}$ (downward) as illustrated in FIG. 4(b).

Next, the visual image output signal clamped with feedback by the first clamping unit 8 is supplied to a cathode current detection transistor 18, and the cathode current of the second BRT signal is detected. The resistor $R_{ik}$ is a resistor for current/voltage transformation and transforms current into voltage information. The S/H 17 performs a sample holding on the wave height value of the second BRT signal of the K voltage illustrated in FIG. 4(b) and extracts the cathode current $i_k$. This signal is compared with the reference voltage $V_{ref2}$ by the comparator 16 and then is clamped with feedback by controlling the reference voltage of the before-mentioned comparator 12 so that the signal becomes a proper cathode current $i_b$ (downward) as illustrated in FIG. 4(b).

As described above, by performing the double feedback control by the first clamping unit 8 performing voltage feedback type cathode clamping and by the second clamping unit 10 performing current feedback type cathode clamping with the detection signal which detected the beam current, highly stable color reproduction performance is realized.

A switching circuit 15 is used for controlling the closed loop operation for current detection. Particularly, since the transition response of the first voltage feedback type clamping and the second current feedback type clamping becomes a problem when engaging the power source, the following control is, for example, performed. That is, the first voltage feedback type feedback clamping is performed when the power source is engaged and, after the operation is stabilized, the second current feedback type clamp is operated. The reference voltage $V_{ref3}$ is used for setting the cathode current which serves as the reference within the closed loop.

FIG. 4(c) illustrates the case where the BRT minimum state (mim) is set. The BRT control is performed by changing the wave height value of the overlaid BRT signal. FIG. 4(d) illustrates the wave form of the K voltage when the BRT typical state (typ) is set and FIG. 4(e) illustrates the wave form of the K voltage when the BRT maximum state (max) is set. The reason why wave height values for the first and second BRT signals are different is that the wave height value of the first BRT signal is the voltage value of the black level while the second BRT signal is for the cathode current value of several μA. Therefore, the wave height value of the second BRT signal includes an off-set component in the direction of the current flow (direction of making brighter).

As described above, by applying to the cathode electrode of the cathode ray tube a voltage feedback type signal which is cathode-clamped with the signal overlaid with the BRT signal in the fly-back period of the visual image signal, and by performing the current feedback type cathode clamping with the detection signal which detected the beam current of this brightness reference signal, highly stable color reproduction performance can be easily realized. When the AKB is OFF, the second BRT signal is controlled to be the pedestal voltage of the visual image signal so that the reference signal for cathode current detection does not stand out.

As described above, in this example, by applying to the K electrode of the cathode ray tube a signal which is clamped with the signal overlaid with the BRT signal in the fly-back period of the visual image signal, and by controlling the clamp voltage by the detection signal which detected the beam current of this brightness reference signal, stable color reproduction performance and the broad band width of the visual image output unit as well as the ON/OFF control of the AKB can be easily realized.

Next, operation will be described when ON/OFF of the AKB is performed while holding clamp voltage data with reference to a block diagram in FIG. 5.

Figure 5:
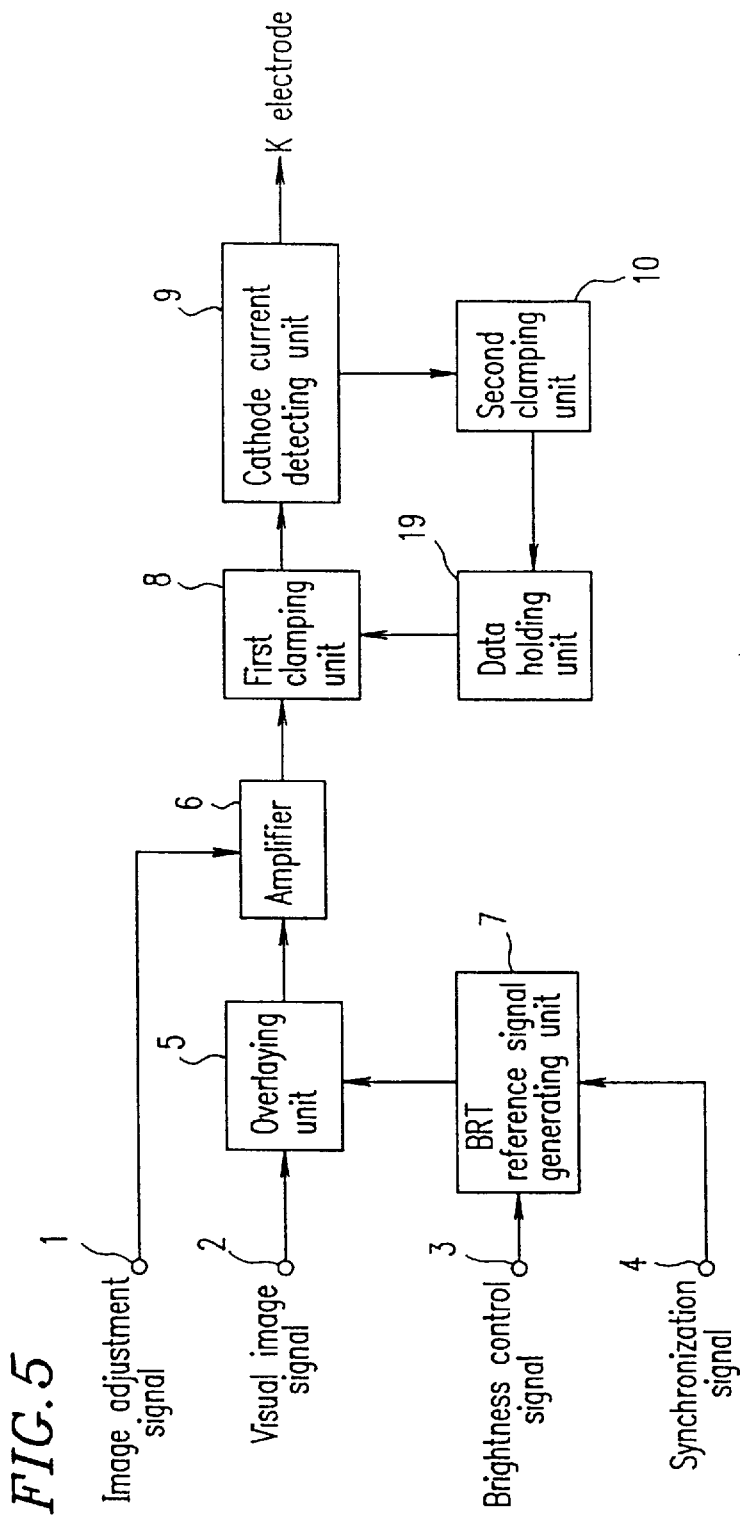
FIG. 5 is a block diagram for describing the data storage operation in the first example.

In FIG. 5, reference numeral 19 designates a data holding unit for holding control data from the before-mentioned second clamping unit 10. Those elements which have similar functions as those in the example of FIG. 1 are designated with the same reference numerals and descriptions thereof are omitted.

Figure 6:
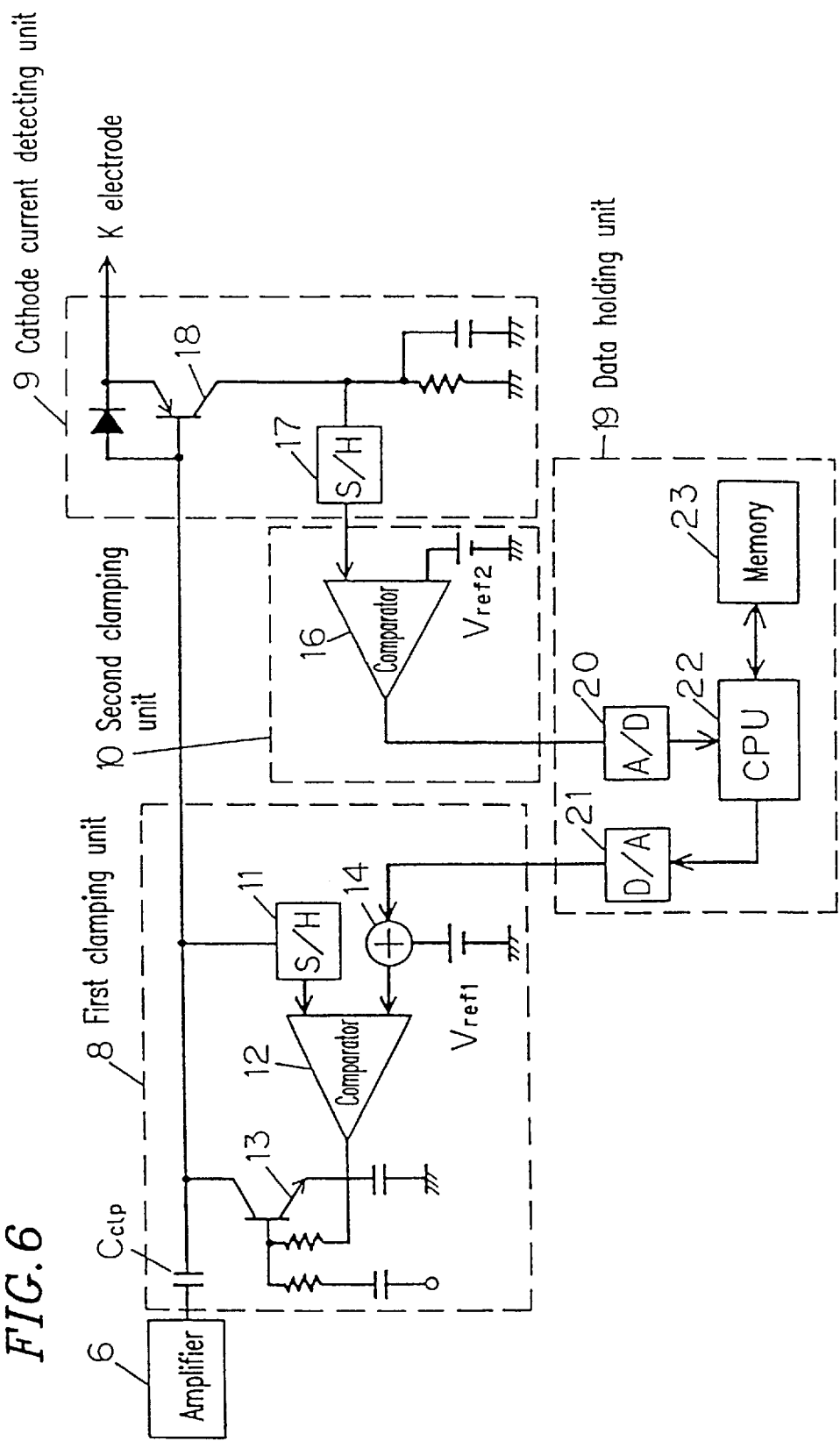
FIG. 6 is a block diagram for describing the brightness control operation in the first example.
Figure 7:
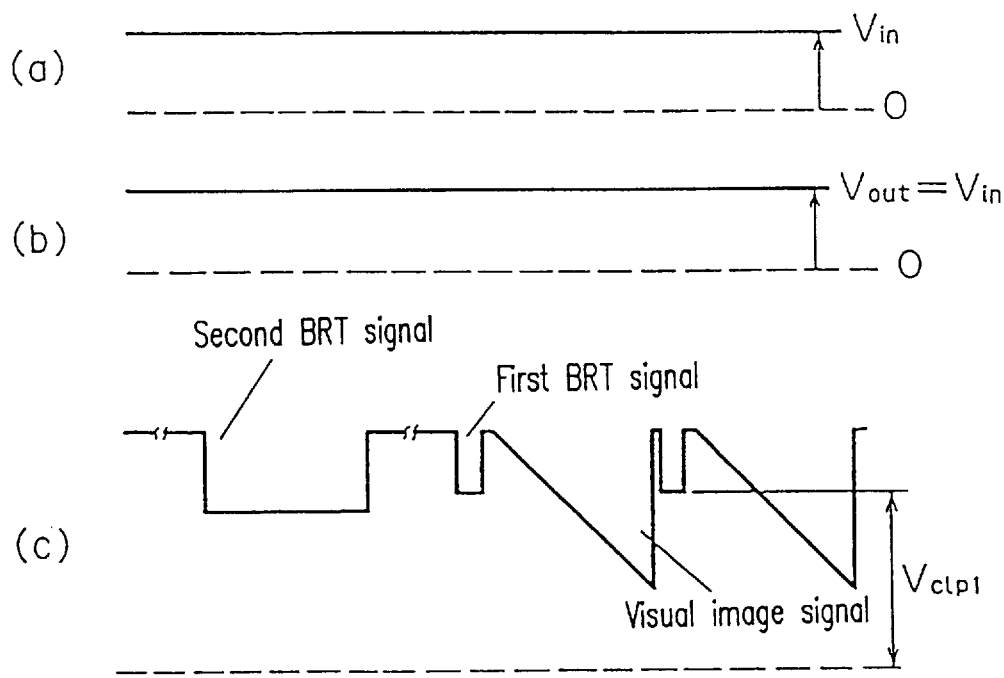
FIGS. 7(a) to (c) are operational wave form diagrams for describing the brightness control operation in the first example.

In order to describe in detail the data holding operation constituted as above, a block diagram in FIG. 6 and an operation wave form diagram in FIG. 7 will be referred to. Those elements in FIG. 6 which have similar functions as those in FIG. 5 are designated by the same reference numerals. In FIG. 6, the data holding unit 19 is constituted of an A/D transformer (A/D) 20 for transforming the analog output from the comparator 16 into digital signals and a D/A transformer (D/A) 21 for transforming the arithmetic operation result from the CPU 22 into analog signals.

The output voltage $V_{in}$ from the comparator 16 for current feedback control shown in FIG. 7(a) is supplied to the CPU 22 and to the memory 23 through the A/D 20 for data storage. This stored control data is transformed into analog signals by the D/A 21, and an output voltage $V_{out}$ having the same voltage as the input shown in FIG. 7(a) is output as illustrated in FIG. 7(b). The signal from the D/A 21 is supplied to the adder 14 of the comparator 12 for voltage feedback control, where cathode clamping is performed as illustrated in FIG. 7(c).

Therefore, since the feedback control is performed using the control data for the ON state even when the AKB is OFF, stable color reproduction performance can be realized. Moreover, the ON/OFF control of the AKB can be performed by an operator or by automatic control performed periodically or when the power source is engaged.

Furthermore, compared to a method where voltage feedback control is directly performed with the signal which detected the beam current, the present invention can realize highly accurate color reproduction performance with the A/D, D/A and memory capacity of small number of bits by performing current feedback type control only on the fluctuation due to chronological change of the CRT or the like.

Incidentally, since the cathode clamping operation and the BRT control method are the same as in the first example, the description thereof is omitted.

As described above, in this example, by applying to the K electrode of the cathode ray tube a signal clamped with the signal overlaid with the BRT signal in the fly-back period of the visual image signal and by controlling the clamp voltage with the signal which holds the detection signal which detects the beam current of this brightness reference signal, the ON/OFF control of the AKB can be easily realized. Therefore, highly accurate color reproduction performance can be easily realized with no detection signals standing out.

Next, operation during parallel drive where the visual image signal is applied to the cathode and grid electrodes of the cathode ray tube will be described in detail with reference to a block diagram in FIG. 8.

Figure 8:
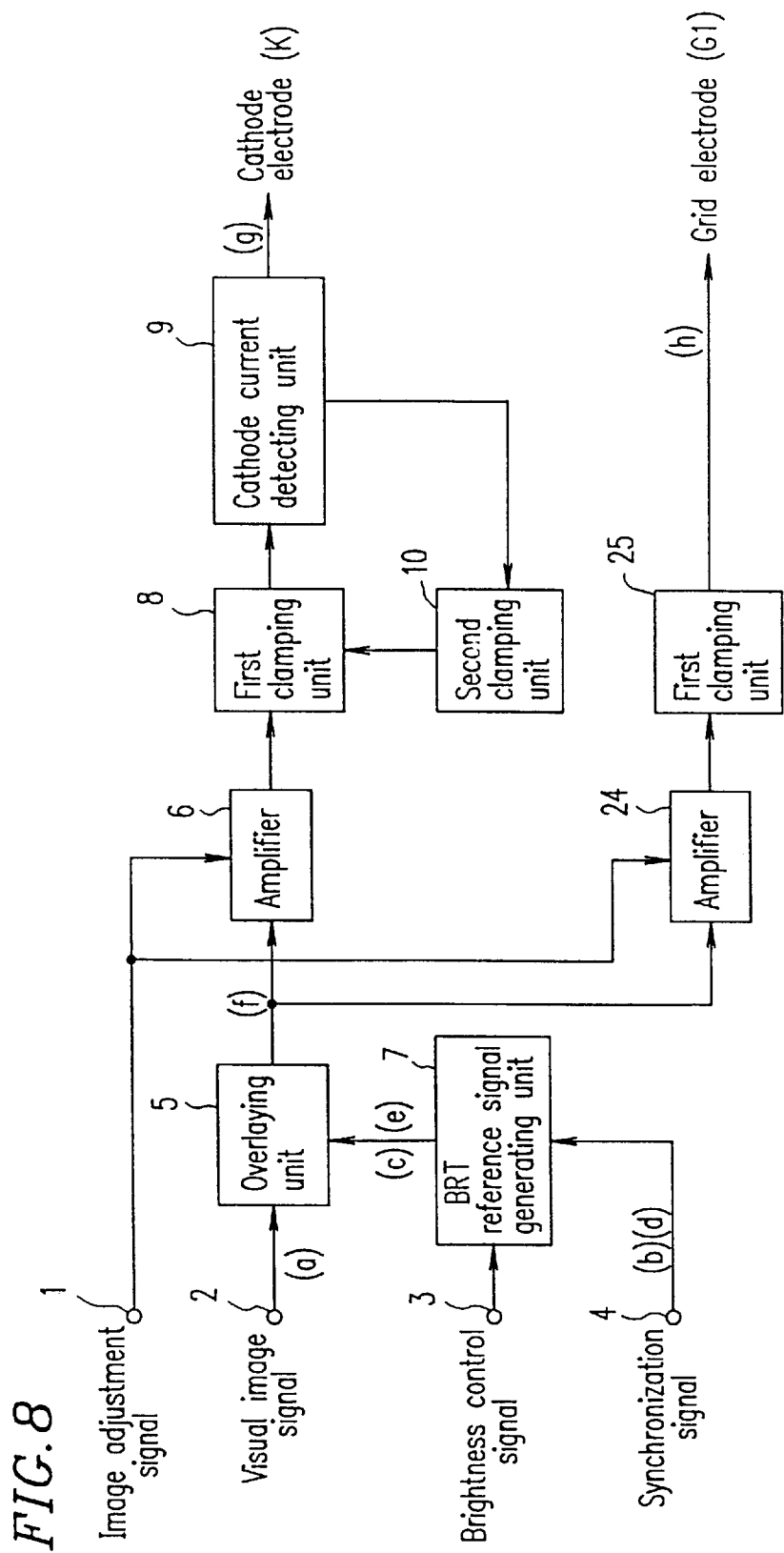
FIG. 8 is a block diagram for describing the operation during the parallel driving in the first example.

In FIG. 8, reference numeral 6 designates an amplifier for the cathode, reference numeral 24 designates an amplifier for the grid, reference numeral 8 designates a first clamping unit for the cathode for clamping with the BRT signal from the amplifier 6 for the cathode, and reference numeral 25 designates a first clamping unit for the grid for clamping with the BRT signal from the amplifier 24 for the grid. Furthermore, reference numeral 9 designates a cathode current detecting unit which detects the cathode current from the before-mentioned BRT signal, and reference numeral 10 designates a second clamping unit for controlling the first clamping unit 8 by the detection signal from the cathode current detecting unit 9. Those elements which have similar functions as those in the examples in FIGS. 1 and 5 are designated by the same reference numerals and the descriptions thereof are omitted.

Figure 9:
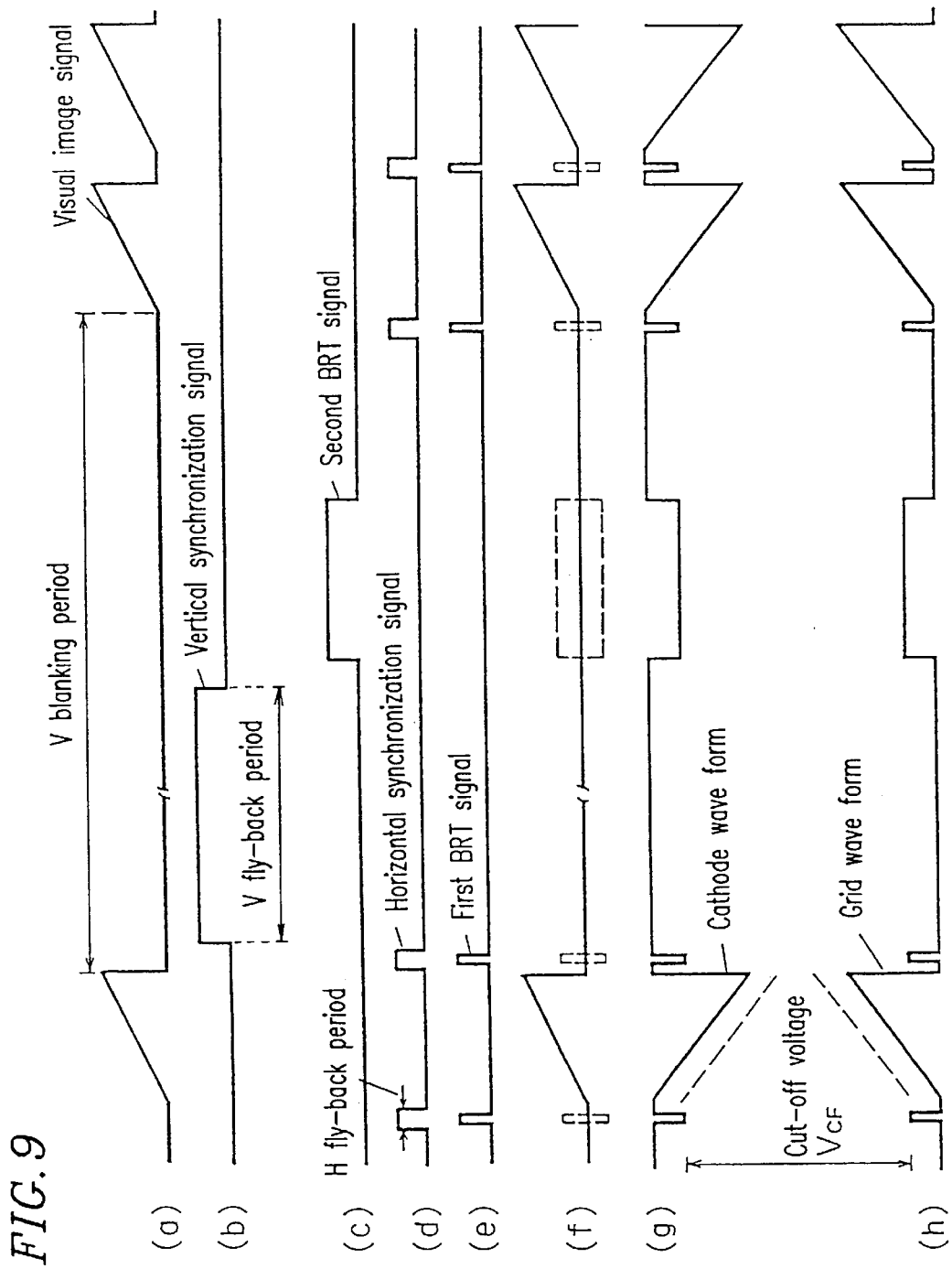
FIGS. 9(a) to (h) are operational wave form diagrams for describing the operation in the first example.

Operation of the visual image signal processing apparatus of the example constituted as above will be described hereinafter with reference to operation wave form diagrams in FIGS. 9(a) to 9(h). The operation wave form diagrams in FIGS. 9(a) to 9(h) are fundamentally similar to those in FIGS. 2(a) to 2(h). FIG. 9(a) illustrates the visual image signal which is supplied to the input terminal 2. FIGS. 9(b) and 9(d) illustrate the vertical synchronization signal and the horizontal synchronization signal, respectively, which are synchronized with polarization and supplied to the input terminal 4. FIG. 9(c) illustrates a second BRT signal in the vertical fly-back period and FIG. 9(c) illustrates a first BRT signal in the horizontal fly-back period. The wave height value of the BRT signal is controlled by the BRT control signal from the input terminal 3. The second BRT signal illustrated in FIG. 9(c) produces a reference signal in a period outside of the V fly-back period of FIG. 9(b). The V fly-back period of FIG. 9(b) is within the V blanking period of FIG. 9(a).

The first and second BRT signals from the BRT reference signal generating unit 7 and the visual image signal are overlaid by the overlaying unit 5. The overlaying unit 5 is constituted of analog switches or the like and the BRT signal illustrated by a broken line in FIG. 9(f) is produced. The signal clamped in the pedestal period of the visual image signal from the overlaying unit 5 is amplified by the amplifier 6 for the cathode and then is clamped by the first clamping unit 8 for the cathode with the wave height value of the first BRT reference signal overlaid in the horizontal fly-back period and supplied to the cathode current detecting unit 9. The cathode current detecting unit 9 detects the cathode current of the second BRT reference signal overlaid in the V blanking period. The visual image output signal of negative polarity illustrated in FIG. 9(g) is applied to the K electrode which is the first electrode of the cathode ray tube. The detection signal which detected the cathode current of the second BRT signal from the cathode current detecting unit 9 is supplied to the second clamping unit 10 and, the result of the comparison with the reference voltage is fed back to the first clamping unit 8 for the cathode. Similarly, the visual image output signal of positive polarity from the amplifier 24 for the grid is also clamped by the first clamping unit for the grid with the wave height value of the first BRT signal overlaid in the horizontal fly-back period. The visual image output signal of positive polarity illustrated in FIG. 9(h) is applied to the $G_1$ electrode of the cathode ray tube. As illustrated in FIGS. 9(g) and 9(h), it becomes possible to perform the closed loop BRT control such that the cut-off voltages $V_{CF}$ of the K voltage and the $G_1$ voltage are always constant. As a state in the case where the BRT is set in the direction of getting brighter is illustrated by a broken line, it can be seen that the voltages of K and $G_1$ operate complementary to each other as a result of the BRT control.

Next, white balance in the case where a visual image output signal of negative polarity is applied to the K electrode and a visual image output signal of positive polarity is applied to the $G_1$ electrode will be described in detail with reference to the light emitting characteristics in FIGS. 10(a) to 10(c). FIG. 10(a) illustrates a light emitting characteristic when the visual image signal is applied to either one of the K or the $G_1$ similar to the conventional art. From FIG. 10(a) where the light emitting characteristics for the K application and the $G_1$ application are illustrated by a broken line and a solid line, respectively, it can be seen that the characteristic is linear when applied to the K electrode and is non-linear when applied to the $G_1$ electrode. FIG. 10(b) illustrates the light emitting characteristic when the visual image signal is applied to both the K and $G_1$ electrodes. From the figure, it can be seen that the non-linear characteristic due to the $G_1$ application appears as in FIG. 10(a).

Moreover, there is a need to control direct current-like voltage when the BRT control is performed. However, since the light emitting characteristic shown in FIG. 10(a) changes between the characteristic for the K application (broken line) and the characteristic for the $G_1$ application (solid line) when the BRT control is performed with either the K or the $G_1$, the light emitting characteristic changes in accordance with the BRT control.

This means that since the light emitting characteristic of the cathode ray tube is non-linear and the light emitting characteristic changes in accordance with the BRT control by performing the parallel drive of the K and the $G_1$, the white balance adjustment becomes very complicated compared to the conventional cathode electrode drive. Consequently, considering the above point, as illustrated in the light emitting characteristic of cathode current versus brightness in FIG. 10(c), it is necessary to perform current feedback type control which detected the beam currents in the vicinity of the black level (cathode current $i_{BRT}$=5 μA) and in the vicinity of the intermediate level (cathode current $i_{CONT}$=100 μA). However, in a method where the BRT control is changed in the similar manner both at the K and $G_1$ electrodes as in the present invention, the light emitting characteristic during the parallel drive is always constant. Therefore, even the feedback control which detected the cathode current in the vicinity of the black level can stabilize color intensity.

Figure 11:
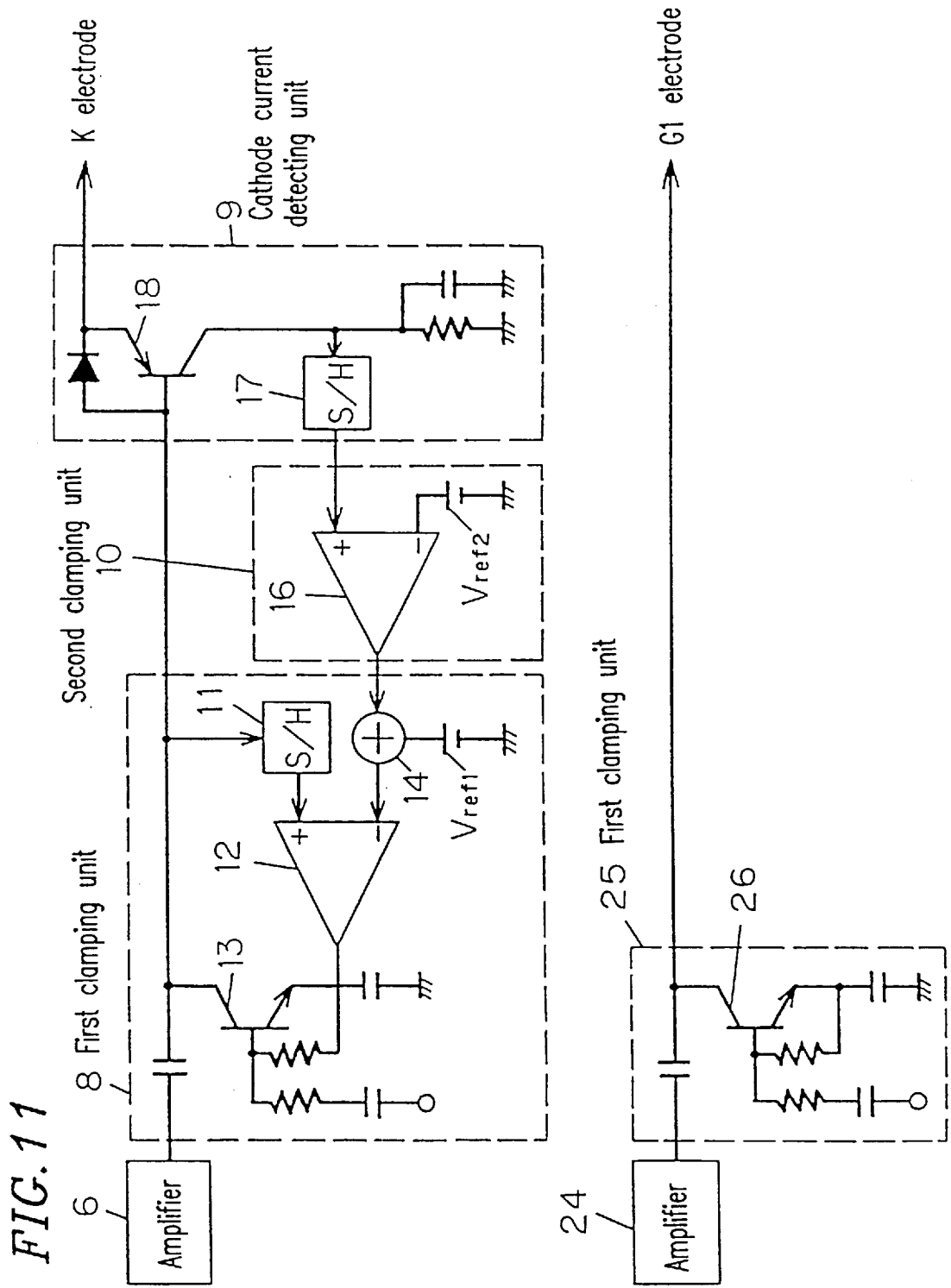
FIG. 11 is a block diagram for describing the brightness control operation in the first example.
Figure 12:
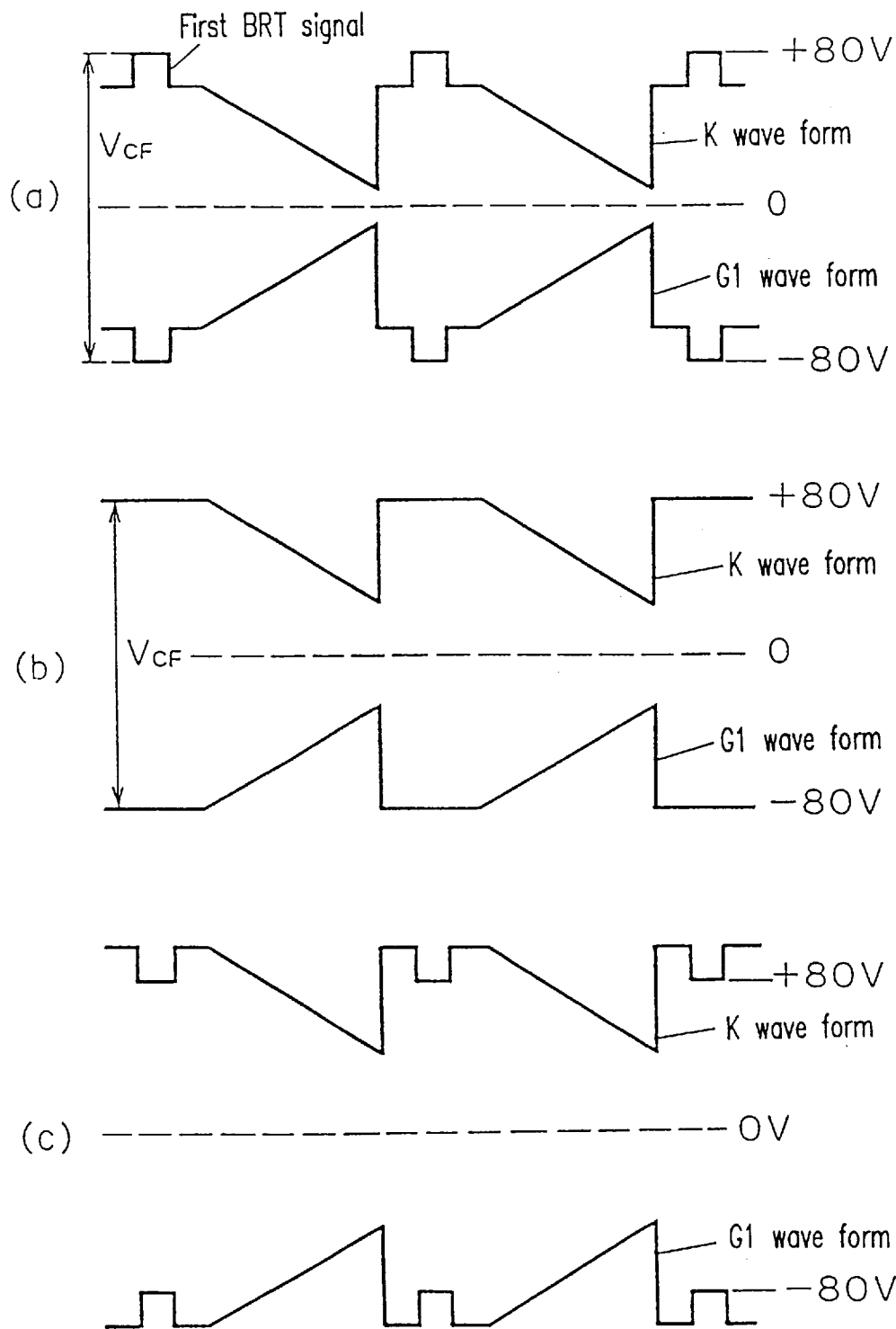
FIGS. 12(a) to (c) are operational wave form diagrams for describing the brightness control operation in the first example.

Next, the clamping operation and the BRT control method will be described in detail with reference to a block diagram in FIG. 11 and wave form diagrams in FIGS. 12(a) to 12(c). Those elements in FIG. 11 which have similar functions as those in FIG. 1 are designated by the same reference numerals.

First, the clamping operation will be described. A visual image output signal of negative polarity from the amplifier 6 for the cathode is pulse-clamped by the first clamping unit 8 for the cathode with the wave height value of the first BRT signal. Similarly, a visual image output signal of positive polarity from the amplifier 24 for the grid is pulse-clamped by the first clamping unit 25 for the grid with the wave height value of the first BRT signal. The wave forms which are applied to the K and the $G_1$ during the BRT control are illustrated in FIGS. 12(a) to 12(c). As FIG. 12(a) illustrates the K wave form and the $G_1$ wave form in the BRT maximum state (max), FIG. 12(b) illustrates those in the BRT typical state (typ) and FIG. 12(c) illustrates those in the BRT minimum state (mim), the BRT control is performed in such a manner that the clamp voltage of the wave height value of the first BRT signal is, for example, +80V for the K wave form and −80V for the $G_1$ wave form. The second clamping operation is similar to that in the first example and, therefore, the description thereof is omitted.

As described above in this example, by applying to the K and $G_1$ electrodes of the cathode ray tube a signal clamped with the signal overlaid with the BRT signal in the fly-back period of the visual image signal and by controlling the clamp voltage of either one of the electrodes by the detection signal which detected the beam current of the brightness reference signal applied to the K electrode, a parallel drive having excellent color intensity tracking can be realized.

Next, the operation in the case where gamma correction is performed based on the BRT signal will be described in detail with reference to a block diagram in FIG. 13.

Figure 13:
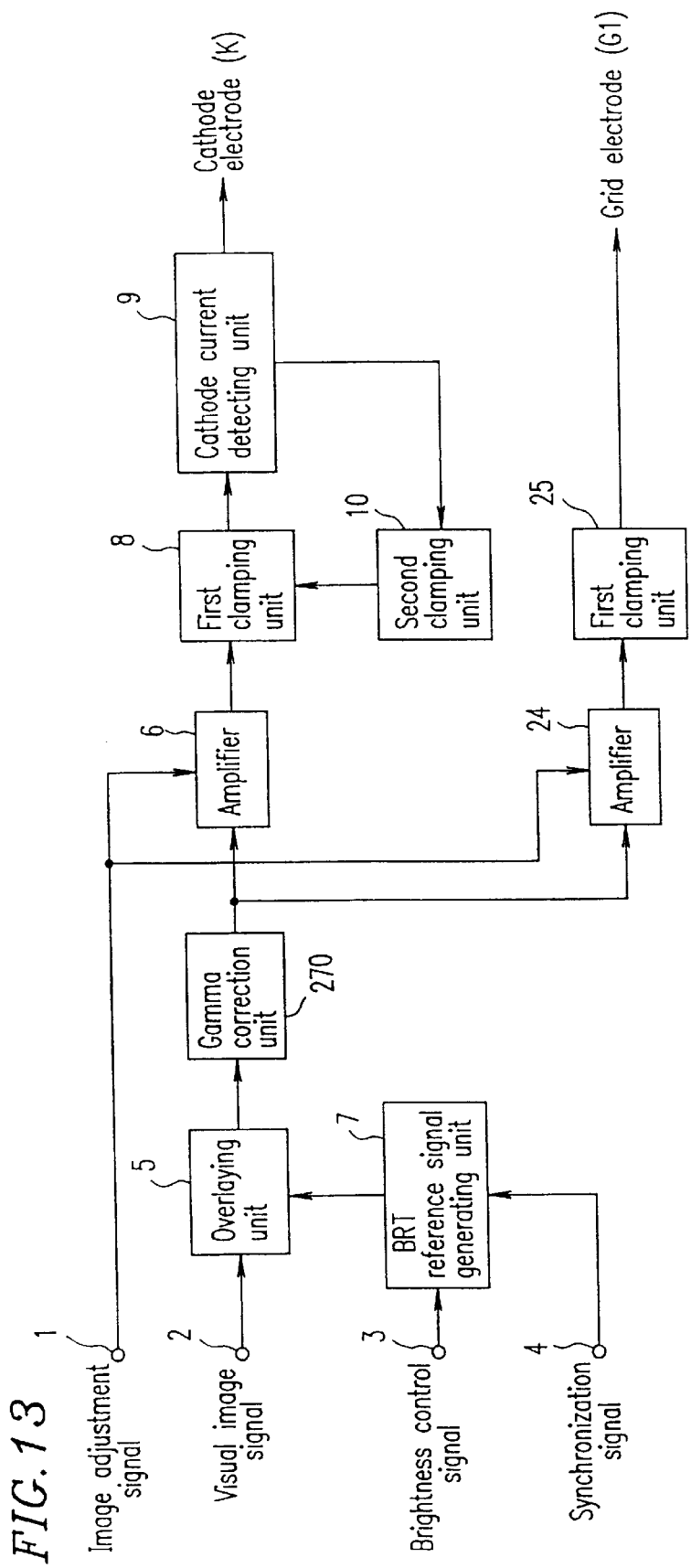
FIG. 13 is a block diagram for describing the gamma correction operation in the first example.

In FIG. 13, reference numeral 270 designates a gamma correction unit which performs gamma correction based on the BRT signal. Those elements which have similar functions as those in the examples in FIGS. 1 to 12 are designated by the same reference numerals and the descriptions thereof are omitted. A signal from the overlaying unit 5 is supplied to the gamma correction unit 270. After clamping in the BRT signal period, the gamma correction is performed by the gamma correction circuit (not shown in the figure) constituted of non-linear amplifiers using the non-linear characteristics of transistors and diodes. Since the clamping operation and the BRT control are similar to those of the example in FIG. 8, the operation of gamma correction will be described here.

Figure 14:
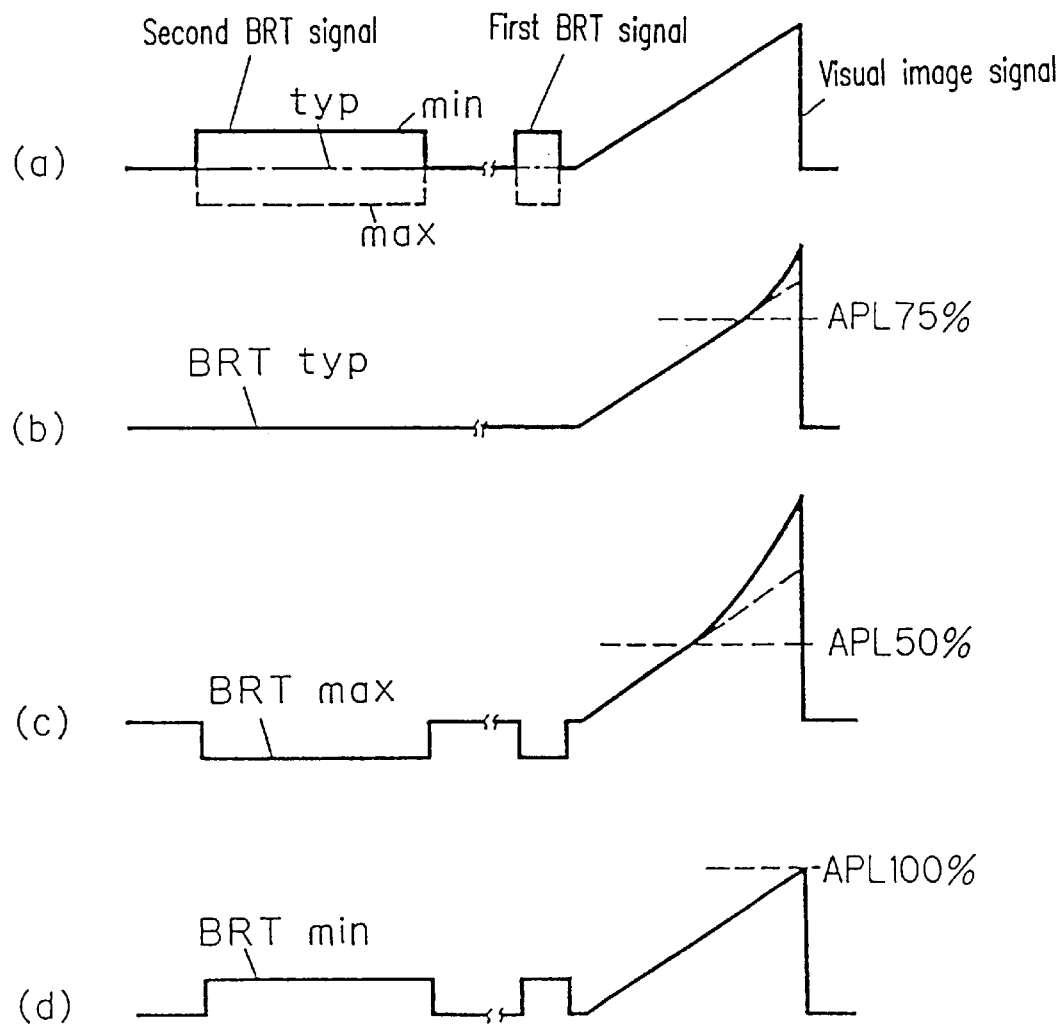
FIGS. 14(a) to (d) are operational wave form diagrams for describing the operation in the first example.

First, gamma correction operation related to the BRT control will be described in detail with reference to wave form diagrams in FIGS. 14(a) to 14(d). A visual image signal overlaid with the BRT signal to be input to the gamma correction unit 25 is illustrated in FIG. 14(a), and output characteristics when the BRT set states are max, typ and min are illustrated in FIGS. 14(b), 14(c) and 14(d), respectively. FIG. 14(b) shows the lamp output wave form for the BRT typical state (typ) where non-linear processing is performed from 75% of the signal average value. FIG. 14(c) shows the lamp output wave form for the BRT maximum state (max) where non-linear processing is performed from 50% of the signal average value. FIG. 14(d) shows the lamp output wave form for the BRT minimum state (min) where non-linear processing is automatically set to be performed from 100% of the signal average value.

Figure 15:
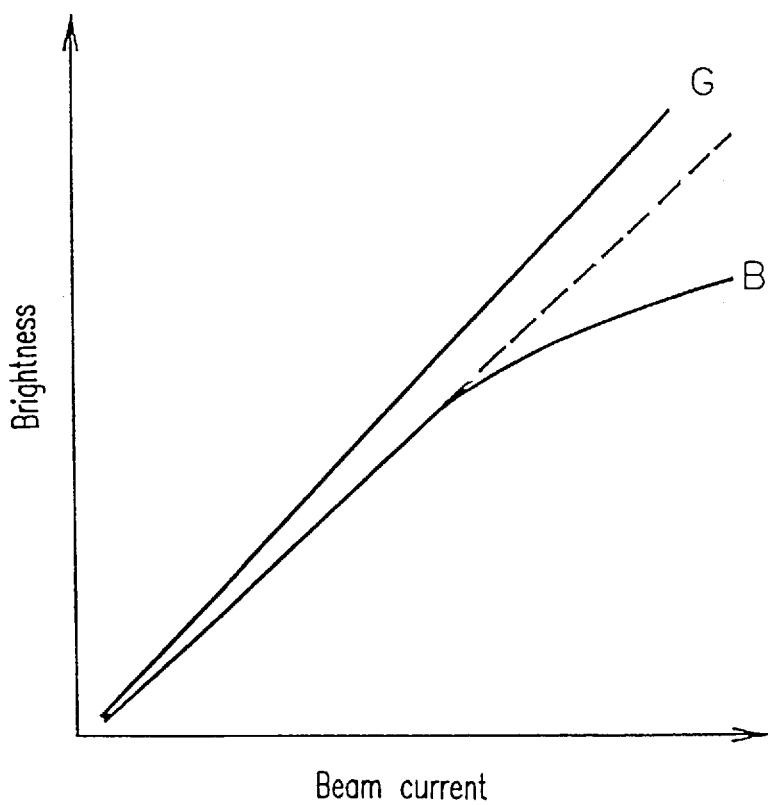
FIG. 15 is a characteristic view for describing the gamma correction operation in the first example.

That is, by overlaying the BRT signal in the visual image signal and performing the gamma correction in accordance with the level of the BRT signal, highly accurate gamma correction can be realized. In particular, as indicated in the light emitting characteristic shown in FIG. 15 of a video projector which performs large screen display using RGB projection tubes, this gamma correction is significantly appropriate in the case where saturation of the light emitting characteristics occurs in a large current region of the B fluorescent body. The gamma-corrected signal from the gamma correction unit 270 is amplified by the amplifier 6 for the cathode and by the amplifier 24 for the grid. Then, the signals are clamped with the wave height value of the BRT signal, and both signals having different polarities and clamp voltages are applied to the K and $G_1$ electrodes.

As described above, since the BRT control is changed similarly for both K and $G_1$ electrodes, the light emitting characteristic becomes always constant even during parallel driving. Therefore, it is possible to use the gamma correction unit both for the K electrode and the $G_1$ electrode, resulting in a small scale circuit and in stabilization of color intensity.

As described above, by performing non-linear processing based on the signal overlaid with the brightness reference signal in the fly-back period of the visual image signal and then applying the signal clamped by this brightness reference signal to the K and $G_1$ electrodes of the cathode ray tube, and by controlling the clamp voltage of either one of the electrodes by the detection signal which detected the beam current of the brightness reference signal to be applied to this K electrode, highly accurate correction can be realized with a single-system gamma correction system having excellent tracking. Moreover, since parallel driving becomes possible, the large amplitude and the broad band width of the visual image output unit can be easily realized.

(Example 2)

Figure 16:
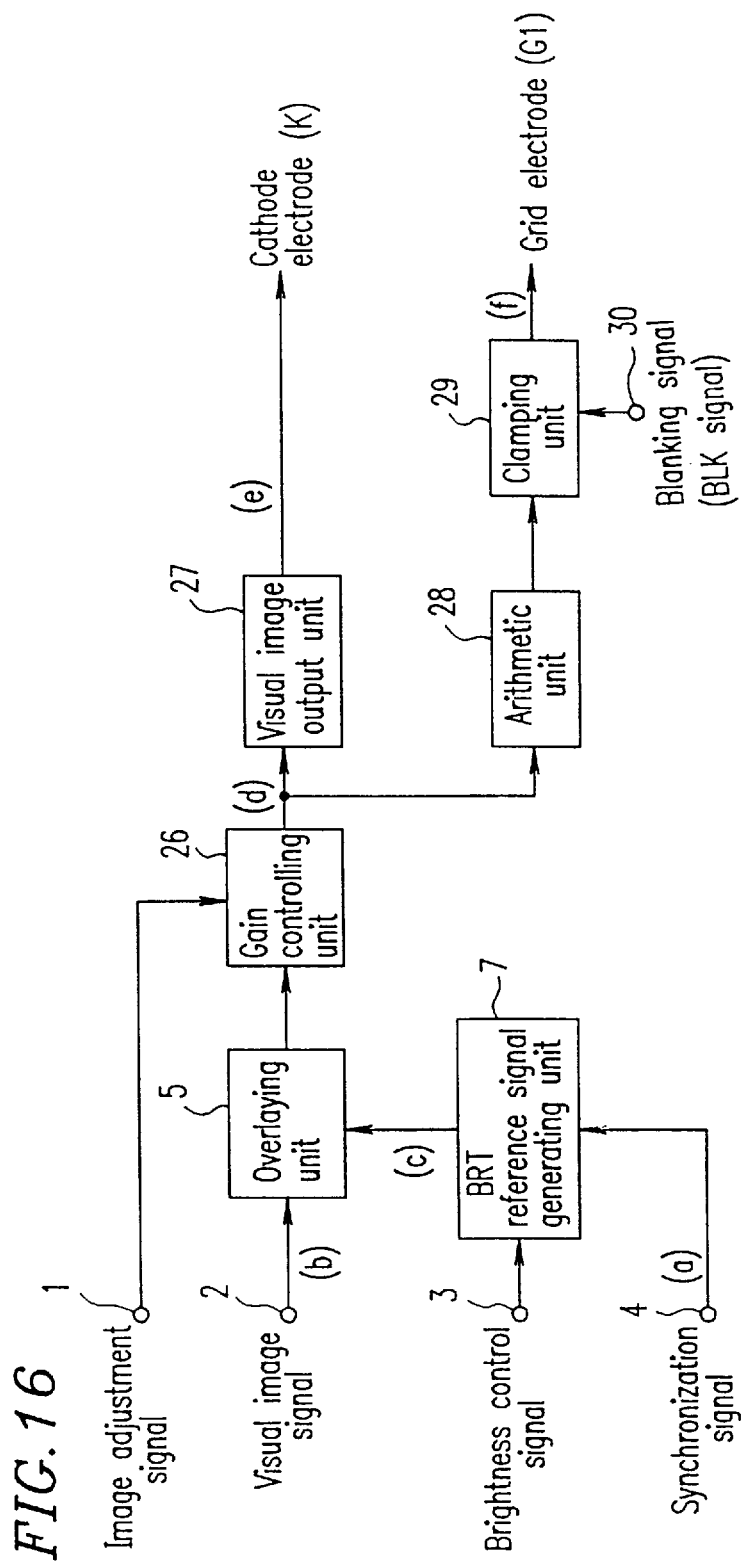
FIG. 16 is a block diagram for a visual image signal processing apparatus according to a second example of the present invention.

Next, a visual image signal processing apparatus according to a second example of the present invention will be described with reference to figures. FIG. 16 illustrates a block diagram for the visual image signal processing apparatus according to the second example of the present invention.

In FIG. 16, reference numeral 26 designates a gain controlling unit which varies the gain of the visual image signal, reference numeral 27 designates a visual image output unit which amplifies the visual image signal up to a level for driving the cathode of the cathode ray tube, reference numeral 28 designates an arithmetic unit which extracts the wave height value of the BRT signal overlaid in the fly-back period of the visual image signal and obtains the brightness control signal by arithmetic operation, and reference numeral 29 designates a clamping unit which clamps the BLK signal from an input terminal 30 based on the control signal from the before-mentioned arithmetic unit 28. The BLK signal from the clamping unit 29 is applied to the $G_1$ electrode of the cathode ray tube. Those elements which have similar functions as those in the first example are designated by the same reference numerals and the descriptions thereof are omitted.

Figure 17:
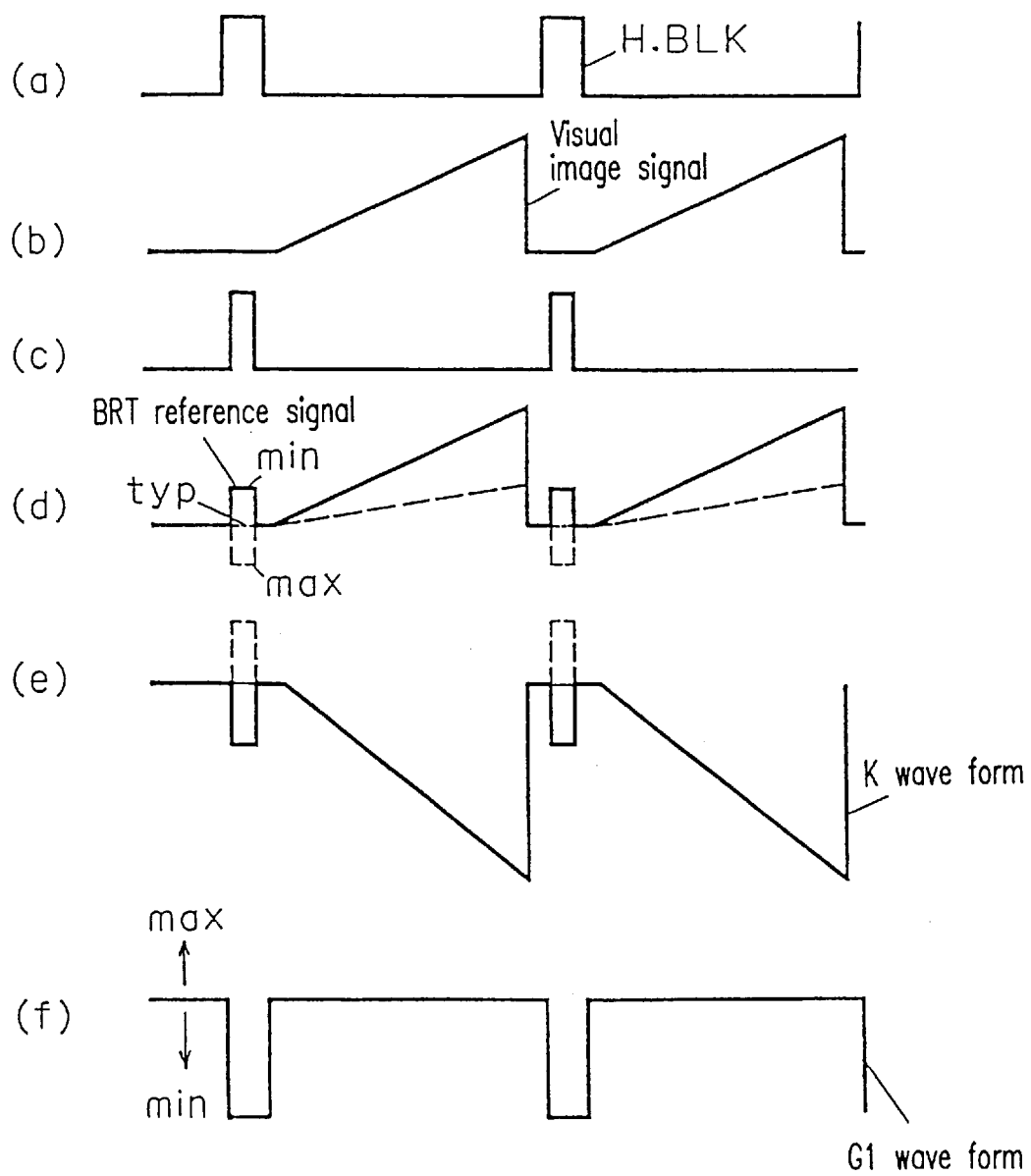
FIGS. 17(a) to (f) are operation wave form diagrams for describing the operation in the second example.

Operation of the visual image signal processing apparatus of the second example constituted as above will be described with reference to operational wave form diagrams in FIGS. 17(a) to 17(f). FIG. 17(b) shows the visual image signal supplied to the input terminal 2, and FIG. 17(a) shows a horizontal synchronization signal (H.BLK signal) which is synchronized with polarization and supplied to the input terminal 4. The BRT reference signal generating unit 7 generates the BRT signal in the horizontal fly-back period shown in FIG. 17(c). The BRT signal in FIG. 17(c) from the BRT reference signal generating unit 7 is overlaid by the overlaying unit 5, and the visual image signal overlaid with the BRT signal shown in FIG. 17(d) is output. The visual image signal from the overlaying unit 5 is supplied to the gain controlling unit 26 constituted of balanced modulator type differential amplifiers or the like and, after gain-controlled as illustrated by a broken line in FIG. 17(d), amplified by the visual image output unit 27. The visual image output signal of negative polarity illustrated in FIG. 17(e) is applied to the K electrode of the cathode ray tube. The visual image signal from the gain controlling unit 26 overlaid with the BRT signal is supplied to the arithmetic unit 28 and, after extracting the BRT signal, a control signal which performs BRT control at the $G_1$ electrode of the cathode ray tube is obtained by arithmetic operation based on this information. The control signal from the arithmetic unit 28 and the BLK signal from the input terminal 30 are supplied to the clamping unit 29. As illustrated in FIG. 17(f), the BRT control is performed by controlling the direct current voltage of the BLK signal. As the operation of the BRT control is described in relation to the K and $G_1$ wave forms with reference to FIGS. 17(a) to 17(f), since the visual image output unit 27 controls only the amplitude of the visual image signal and, therefore, the pedestal voltage is always constant, the large amplitude and the broad band width at the amplifier can be easily realized. By controlling the voltage of the grid clamp, the BRT control can be realized with a simpler configuration. Since the present system differs from that in the first example in that it does not have the cathode current detecting unit, a broad band width is possible.

Figure 18:
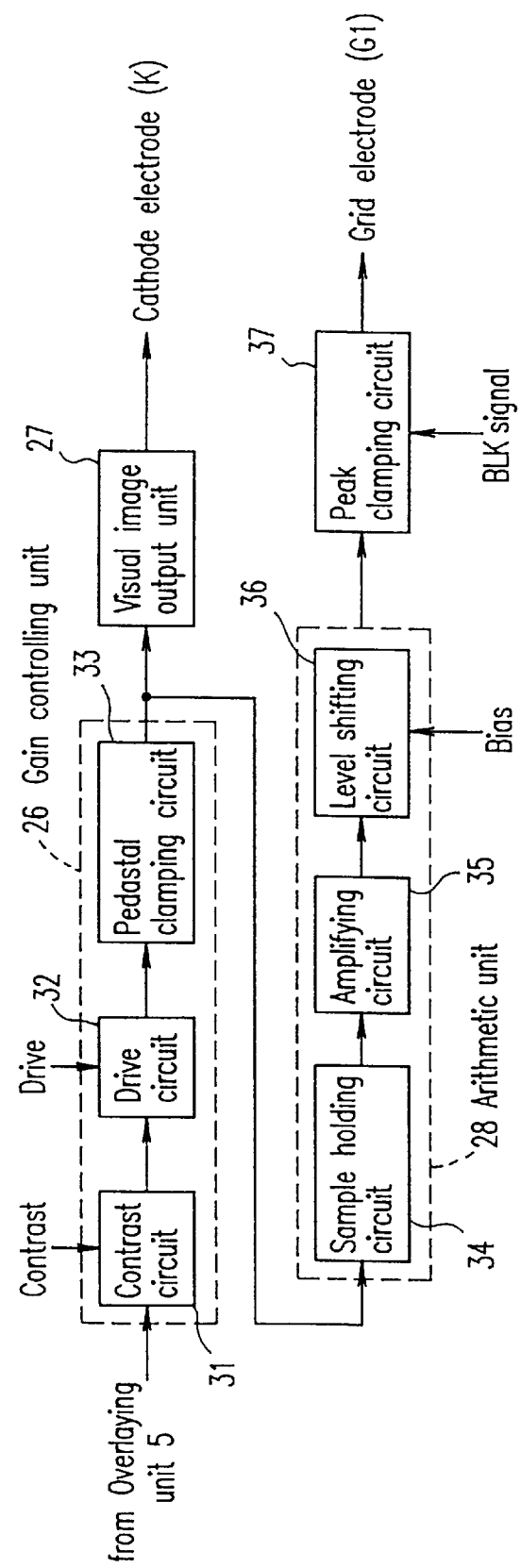
FIG. 18 is a block diagram for describing the brightness control operation in the second example.
Figure 19:
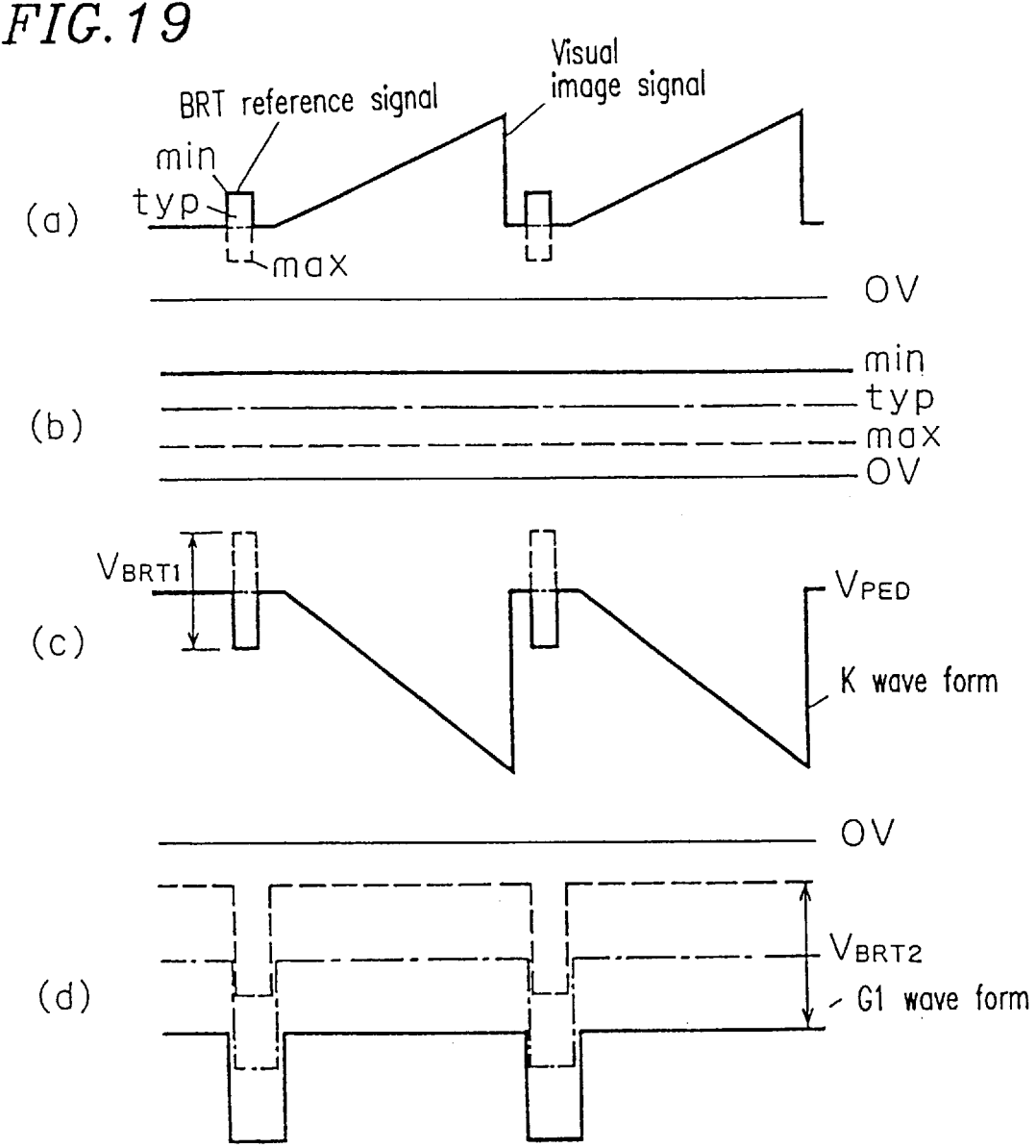
FIGS. 19(a) to (d) are operational wave form diagrams for describing the brightness control operation in the second example.

Next, the BRT control method will be described in detail with reference to a block diagram in FIG. 18 and to wave form diagrams in FIGS. 19(a) to 19(d). Those elements in FIG. 18 which have similar functions as those in FIG. 16 are designated by the same reference numerals. The visual image signal from the overlaying unit 5 is adjusted for image qualities such as contrast and drive. The adjusted signal is then reproduced with direct current in the gain controlling unit 26, which includes a contrast circuit 31, a drive circuit 32 and a pedestal clamping circuit 33. The visual image signal illustrated in FIG. 19(a) is then output. This signal is amplified in the visual image output unit 27, and the visual image output signal illustrated in FIG. 19(c) is applied to the K electrode. The signal in FIG. 19(a) from the pedestal clamping circuit 33 is supplied to the sample holding circuit 34, and the information of the BRT signal in FIG. 19(b) is extracted. This signal is amplified in the amplifying circuit 35 where its gain is set at the amplification ratio of the visual image output unit 27 and the gain of the difference in the light emitting sensitivities during the K application and $G_1$ application described in FIGS. 10(a) to 10(c). For example, the gain is set such that it has a range of change larger than that for the BRT control voltage $V_{BRT1}$ during the K application illustrated in FIG. 19(c). This signal is bias-adjusted for the BRT typical state (typ) in the level shifting circuit 36. Then, by peak clamping the BLK signal in the peak clamping circuit 37, the grid voltage is changed in accordance with the BRT information and the BRT control is performed as illustrated in FIG. 19(d). The BRT control voltage $V_{BRT2}$ during the $G_1$ application has a range of variation which is larger than that during the K application by about 20% to about 30%.

Since light emitting characteristics during the K and $G_1$ applications are predetermined, the gain of the amplifying circuit 35 is fixed, and by performing the cut-off adjustment in the level shifting circuit 36, stable color reproduction and broad band width can be achieved even when the AKB is OFF.

Although detection of the BRT information from the signal from the gain controlling unit 26 was described for purposes of simplification, detection from the visual image output unit 27 can also be performed. Moreover, although the description was given of the case where the BRT signal is provided in the horizontal flyback period, the BRT signal can be provided in the vertical fly-back period.

As described above, by applying to the cathode electrode a signal overlaid with the BRT signal in the fly-back period of the visual image signal, and by obtaining by arithmetic operation the brightness control signal to be applied to the $C_1$ electrode from the detection signal which detected the wave height value of the brightness reference signal to be applied to this K electrode, highly stable color reproduction performance can be easily realized even when the AKB is OFF and the beam current is not detected. Since the current detection unit is no longer necessary, the broad band width can be easily realized.

Next, ON/OFF operation of the AKB by switching the arithmetic signal obtained by arithmetic operation from the beam current detection signal and the wave height value of the BRT signal will be described with reference to a block in FIG. 20.

Figure 20:
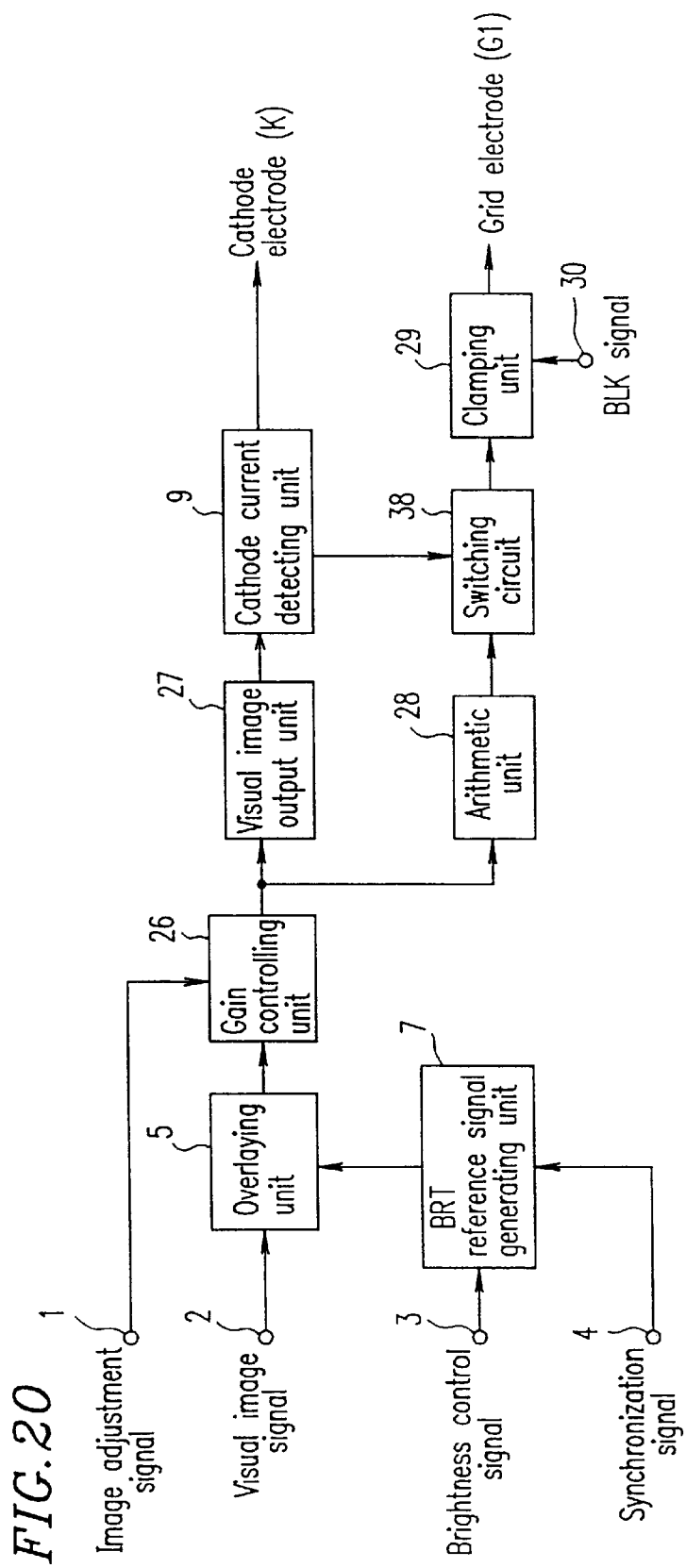
FIG. 20 is a block diagram for describing the control operation during the auto cut-off ON/OFF in the second example.

In FIG. 20, reference numeral 9 designates a cathode current detecting unit which detects cathode current of the BRT signal overlaid to the visual image output signal to be applied to the K electrode, reference numeral 28 designates an arithmetic unit which extracts the BRT signal overlaid in the fly-back period of the visual image signal and obtains the brightness control signal by arithmetic operation. Reference numeral 38 designates a switching circuit for switching between a signal from the before-mentioned cathode current detecting unit 9 and a signal from the before-mentioned arithmetic unit 28, and reference numeral 29 designates a clamping unit which clamps the BLK signal from the input terminal 30 based on the control signal from the before-mentioned arithmetic unit 28. Those elements which have similar functions as those in the first example are designated by the same reference numerals and the descriptions thereof are omitted.

Figure 21:
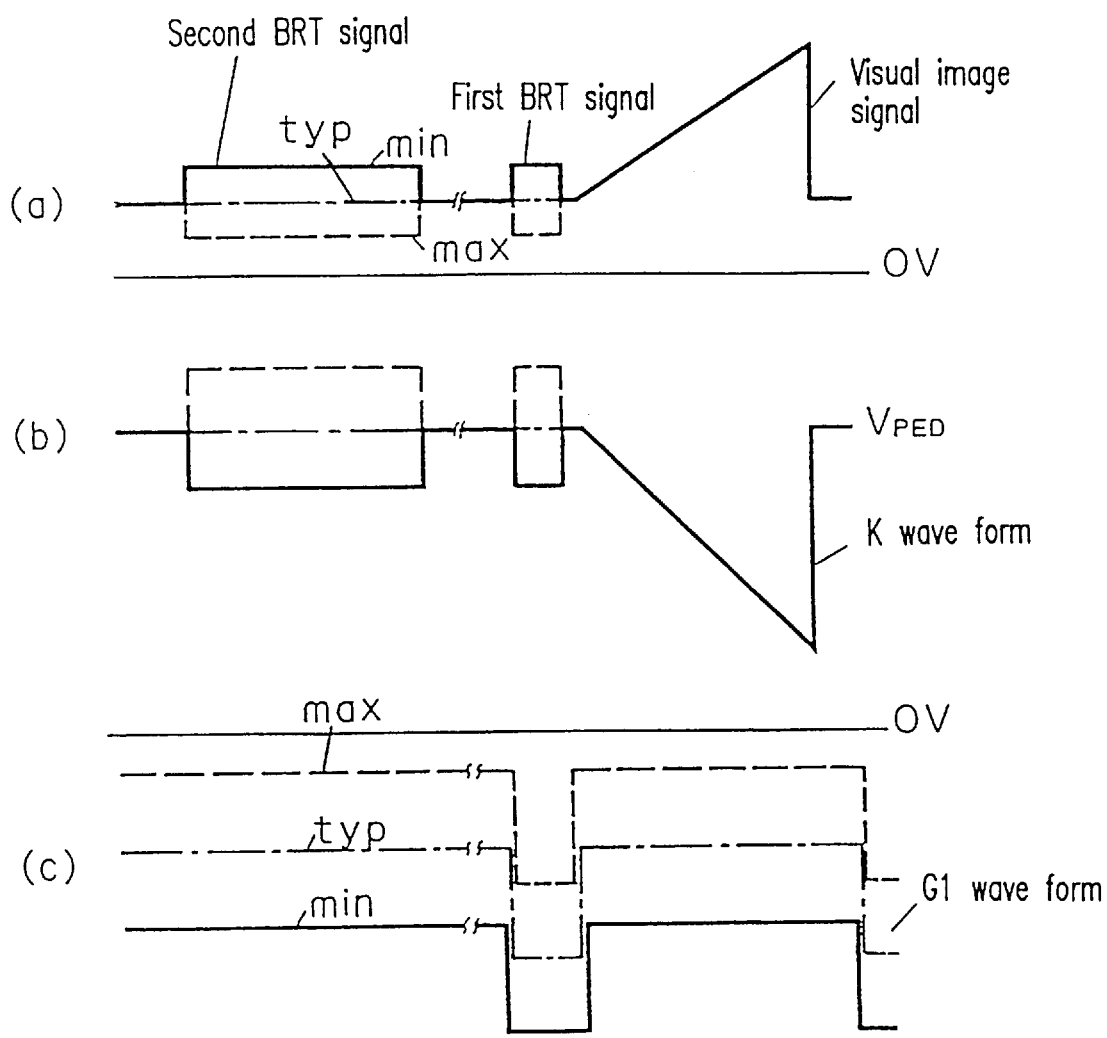
FIGS. 21(a) to (c) are operational wave form diagrams for describing the operation in the second example.

Operation of the visual image signal processing apparatus of this example constituted as above will be described with reference to operational wave form diagrams in FIGS. 21(a) to 21(c). As a BRT signal, the first BRT signal in the horizontal fly-back period shown in FIG. 21(a) is used for wave height value detection. The second BRT signal in the vertical fly-back period is used for cathode current detection down stream. The cathode current detecting unit 9 detects cathode current of the second BRT signal overlaid in the vertical fly-back period, and the visual image output signal of negative polarity illustrated in FIG. 21(b) is applied to the cathode electrode. The signal which detected the cathode current of the second BRT signal from the cathode current detecting unit 9 is compared with the reference voltage and then the output of this comparison is supplied to the clamping unit 29 through the switching circuit 38, thereby performing the closed loop AKB operation and the BRT control.

The first BRT signal in the horizontal fly-back period from the gain controlling unit 26 is supplied to the arithmetic unit 28. After extracting the wave height value of the BRT signal, a control signal for performing the BRT control at the $G_1$ electrode of the cathode ray tube is obtained by arithmetic operation based on this information. The control signal from the arithmetic unit 28 is supplied to the clamping unit 9 through the switching circuit 38, and the open loop BRT control is performed by controlling the direct current voltage of the BLK signal as illustrated in FIG. 21(c).

Figure 22:
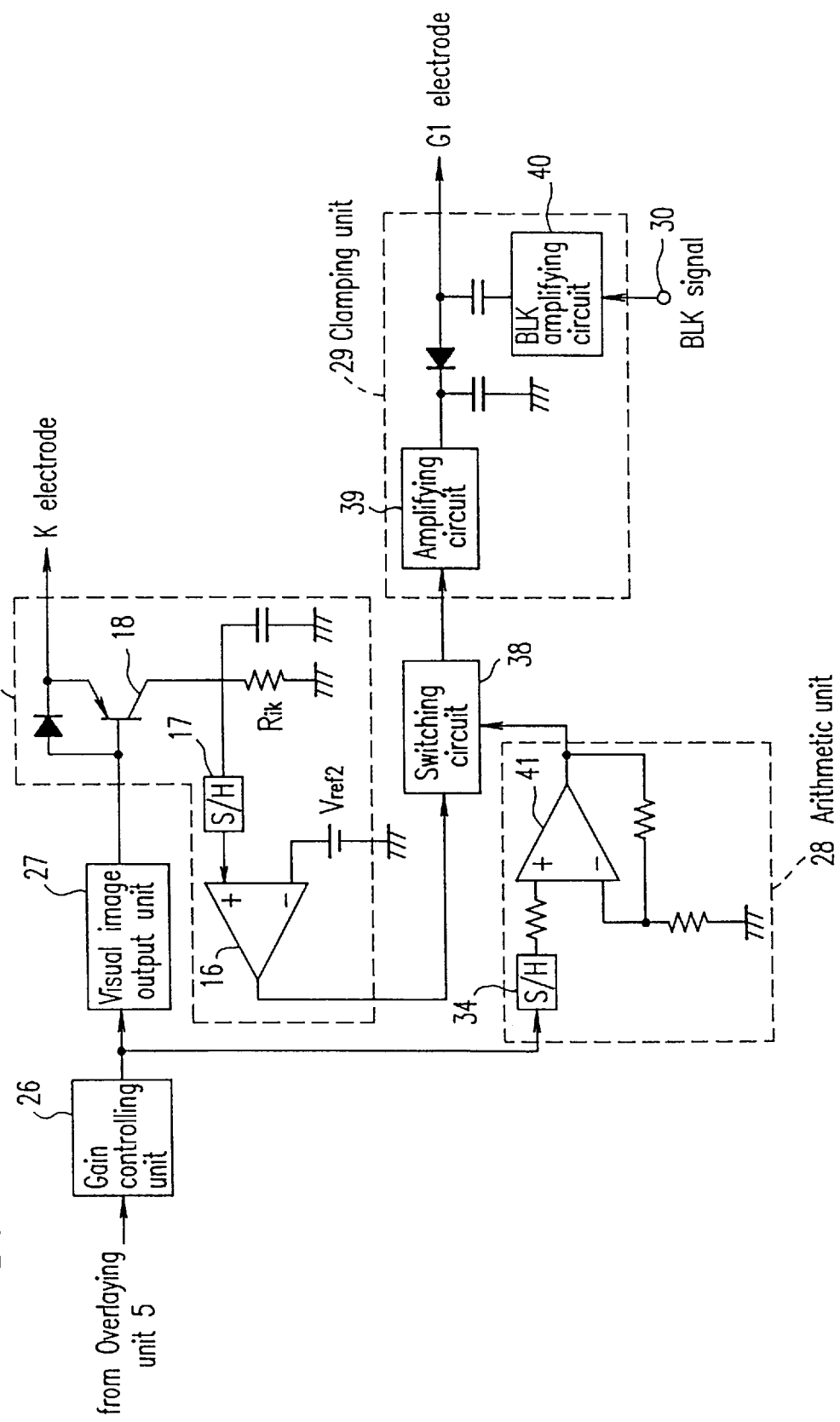
FIG. 22 is a block diagram for describing the brightness control operation in the second example.

Next, a method for ON/OFF control of the AKB will be described in detail with reference to a block diagram in FIG. 22. Those elements in FIG. 22 which have similar functions as those in FIG. 20 are designated by the same reference numerals.

First, operation in the ON state of the closed loop AKB will be described. The visual image output signal of negative polarity from the visual image output unit 27 is supplied to the transistor 18 for cathode current detection, and the cathode current of the second BRT signal is detected. The resistor $R_{ik}$ is a resistor for current/voltage transformation and the current signal is transformed into voltage information. The S/H 17 holds as a sample the wave height value of the second BRT signal of the K voltage illustrated in FIG. 21(b) and extracts the cathode current $i_k$. After comparing this signal with the reference voltage $V_{ref2}$ by the comparator 16, the output of this comparison is supplied to the clamping unit 29 constituted of a peak clamping circuit through the switching circuit 38, and the closed loop BRT control is performed. Therefore, the direct current voltage of the BLK signal to be applied to the $G_1$ electrode is automatically controlled such that the cathode current of the before-mentioned second BRT signal is always constant.

Next, operation in the OFF state of the open loop AKB will be described. The first BRT signal in FIG. 21(a) from the gain controlling unit 26 is supplied to the S/H 34, and the information of the wave height value is extracted. This signal is amplified by the amplifier 41 constituted of operation amplifiers with a gain set to about 1.2 to about 1.3% of the change in the K application BRT in order to correct the difference in light emitting sensitivities between the K application and the $G_1$ application. The signal from the amplifier 41 is amplified by the DC amplifying circuit 39 having the gain of the visual image output unit 27 passed through the switching circuit 38 and then the grid voltage is changed by the peak clamping circuit, thereby performing the open loop BRT control.

By having the before-mentioned configuration, even during the ON/OFF of the AKB, the direct current voltage of the BLK signal to be applied to the $G_1$ electrode as illustrated in FIG. 21(c) can be automatically controlled, thereby performing the BRT control with excellent color reproduction performance.

Although in this example the description is given of the case where the BRT signal from the BRT reference signal generating unit 7 is separated into the first BRT signal in the horizontal fly-back period for wave height value detection and the second BRT signal in the vertical fly-back period for the cathode current detection, the wave height value and the cathode current can be used together with the second BRT signal overlaid in the vertical fly-back period.

As described above in this example, by applying a signal overlaid with the BRT signal in the fly-back period of the visual image signal to the K electrode, and by obtaining by arithmetic operation a brightness control signal to be applied to the $G_1$ electrode based on one of the detection signals which detected the beam current and the wave height value of the BRT signal to be applied to this K electrode, highly accurate color reproduction performance can be realized even when the AKB is OFF.

Next, ON/OFF operation of the AKB will be described in detail with reference to a block diagram in FIG. 23, where a control signal is obtained by arithmetic operation from the detection signal which detected the beam current and the wave height value of the BRT signal.

Figure 23:
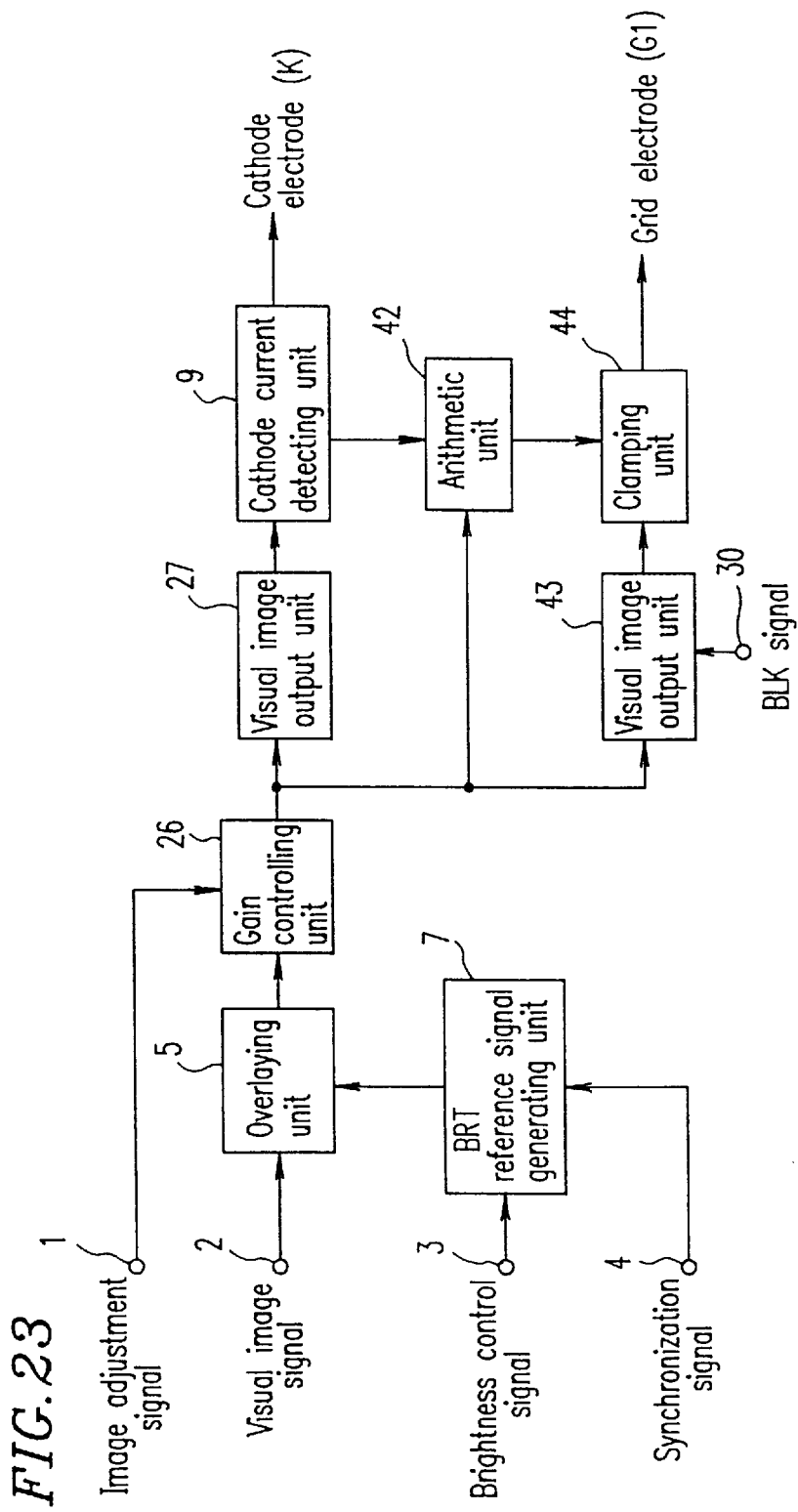
FIG. 23 is a block diagram for describing the operation where the brightness control is performed in accordance with the beam current and the wave height value of the reference signal in the second example.

In FIG. 23, reference numeral 43 designates a visual image output unit which amplifies the visual image signal to a level for driving the $G_1$ grid electrode of the cathode ray tube, and reference numeral 42 designates an arithmetic unit which obtains by arithmetic operation a brightness control signal to be applied to the grid electrode from the detection signal which detected the cathode current and the wave height value of the BRT signal overlaid in the visual image output signal to be applied to the cathode electrode. Reference numeral 44 designates a clamping unit which peak-clamps with the BLK signal in accordance with the control signal from the before-mentioned arithmetic unit 42. Those elements which have similar functions as those in the first example are designated by the same reference numerals and the descriptions thereof are omitted.

Figure 24:
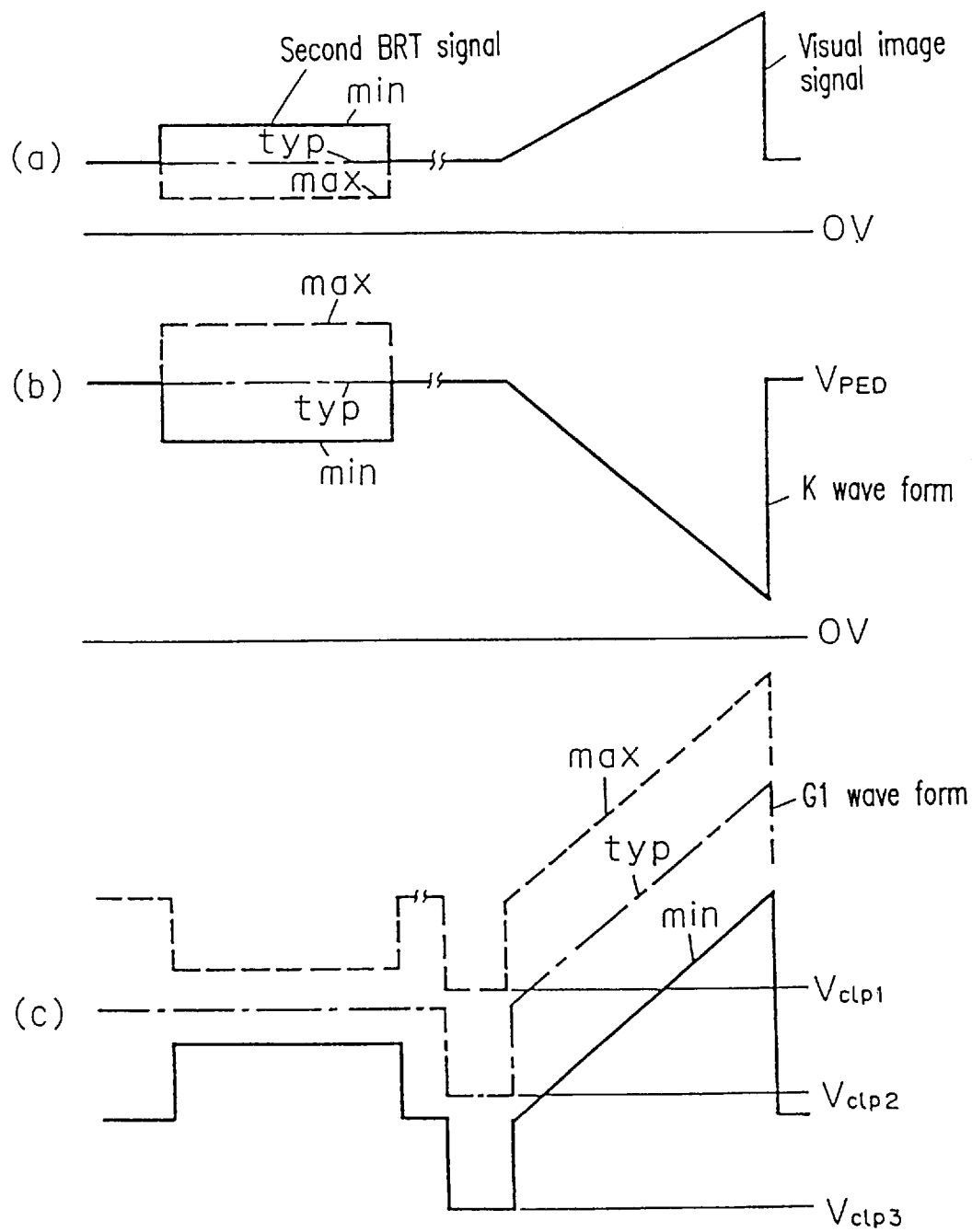
FIGS. 24(a) to (c) are operational wave form diagrams for describing the operation in the second example.

Operation of the visual image signal processing apparatus of this example constituted as above will be described hereinafter with reference to operational wave form diagrams in FIGS. 24(a) to 24(c). As shown in FIG. 24(a), as a BRT signal, the second BRT signal in the vertical fly-back period is used for wave height value detection and for cathode current detection. The cathode current detecting unit 9 detects the cathode current of the second BRT signal overlaid in the vertical fly-back period, and the visual image output signal of negative polarity illustrated in FIG. 24(b) is applied to the K electrode. The signal which detected the cathode current of the second BRT signal from the cathode current detecting unit 9 is compared with the reference voltage and then the output of the comparison is supplied to the arithmetic unit 42.

The visual image signal from the gain controlling unit 26 overlaid with the second BRT signal is BLK-processed in the visual image output unit 43 and then amplified. This signal is applied to the $G_1$ electrode of the cathode ray tube as the visual image output signal of positive polarity illustrated in FIG. 24(c) through the clamping unit 44. Moreover, the second BRT signal from the gain controlling unit 26 is supplied to the arithmetic unit 42 and, after extracting the wave height value of the BRT signal, a control signal which performs the BRT control at the $G_1$ electrode of the cathode ray tube is obtained by arithmetic operation based on this wave height value and the information of the cathode current from the before-mentioned cathode current detecting unit 9. The control signal from the arithmetic unit 42 is supplied to the clamping unit 44 constituted of peak clamping circuits, and the BRT control is performed by controlling the direct current voltage of the BLK signal as illustrated in FIG. 24(c).

Figure 25:
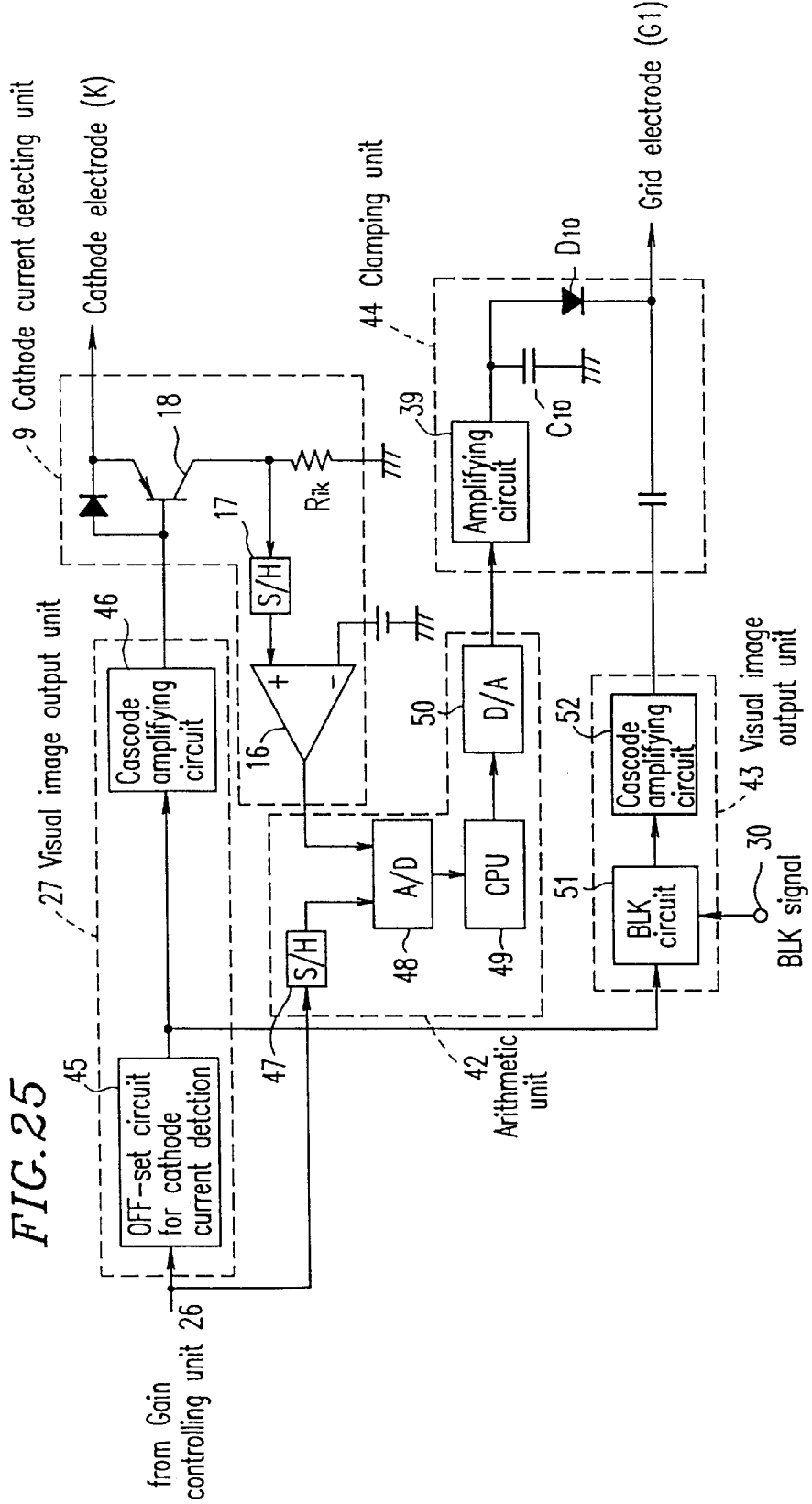
FIG. 25 is a block diagram for describing the brightness control operation in the second example.

Next, an arithmetic method for producing a BRT control signal will be described in detail with reference to a block diagram in FIG. 25. Those elements in FIG. 25 which have similar functions as those in FIG. 23 are designated by the same reference numerals. As described in the first example in conjunction with FIGS. 4(a) to 4(e), as to the signal from the gain controlling unit 26, since the cathode current detection value is several $\mu A$, the wave height value of the second BRT signal includes an off-set component in the direction of the current flows (getting brighter). Therefore, the off-set component is added to the signal from the gain controlling unit 26 in the off-set circuit 45 for cathode current detection, which is then supplied to the cascode amplifying circuit 46. The wave height value detection signal of the second BRT signal from the S/H 47 and the AKB control signal from the comparator 16 are processed in a time-sharing manner and then supplied to the A/D 48. Based on this information, the CPU 49 performs arithmetic operation in order to improve color reproduction performance when the AKB is OFF.

First, a signal having a characteristic of BRT voltage versus output signal as illustrated by a solid line in FIG. 26(a) is output from the comparator 16 in the ON state of the closed loop AKB. This output of the comparison is held in the A/D 48, the CPU 49 and the D/A 50. By peak-clamping with the wave height value of the BLK signal of the visual image output signal of positive polarity and with the wave height value of the BLK signal of direct current voltage having the same input/output characteristic and holding these data, the BRT control can be performed with the BRT voltage versus $G_1$ clamp voltage characteristic illustrated in FIG. 26(b) such that the cathode current of the second BRT signal is always constant.

Next, in the OFF state of the open loop AKB, a signal obtained by processing in a time sharing manner the wave height value detection signal from the S/H 47 and the AKB control signal from the comparator 16 during the closed loop control is supplied to the A/D 48 and transformed into a digital signal. The CPU 49 detects the present condition (indicated by the black circle) from the BRT voltage versus output voltage characteristic when the AKB is ON as illustrated by a solid line in FIG. 26(*a*) and, then, obtains by arithmetic operation a characteristic when the AKB is OFF as illustrated by a broken line in FIG. 26(*a*) based on this information. The signal thus obtained is transformed into an analog signal by the D/A 50 and then amplified by the amplifying circuit 39 to obtain a BRT voltage versus $G_1$ clamp voltage characteristic illustrated by a broken line in FIG. 26(*b*).

Although the description is given in this example of the case where the detection signal during ON/OFF states of the AKB is input to the A/D 48 for arithmetic operation processing, the output signal from the comparator 16 can be supplied directly to the amplifying circuit 39 when the AKB is ON so that a closed loop is formed.

Next, a method of arithmetic operation when performing an initial adjustment at a manufacturing plant or setting the adjustment in the field will be described. First, in the initial adjustment, a BRT voltage versus output voltage characteristic when the AKB is ON and the BRT is varied as illustrated by solid line (1) in FIG. 26(*c*) is memorized. Next, in setting the adjustment, since the cut-off chronologically changes due to a variety of factors, output voltage in the BRT setting condition (indicated by the black circle ●) when the AKB is ON is measured, and based on this information, a characteristic illustrated by broken line (2) is obtained by arithmetic operation. By performing the BRT control when the AKB is OFF based on this arithmetic signal, stable color reproduction performance can be realized.

Although the description is given in this example of the case where parallel driving is performed, it is also effective in the case where the visual image signal is applied only to the cathode electrode as in the first example.

As described above in this example, by applying a signal overlaid with the BRT signal in the fly-back period of the visual image signal to the K electrode, and by obtaining by arithmetic operation the brightness control signal to be applied to the $G_1$ electrode based on the detection signal which detected the beam current and the wave height value of the BRT signal to be applied to this K electrode, highly stable color reproduction performance can be realized even when the AKB is OFF.

(Example 3)

Figure 27:
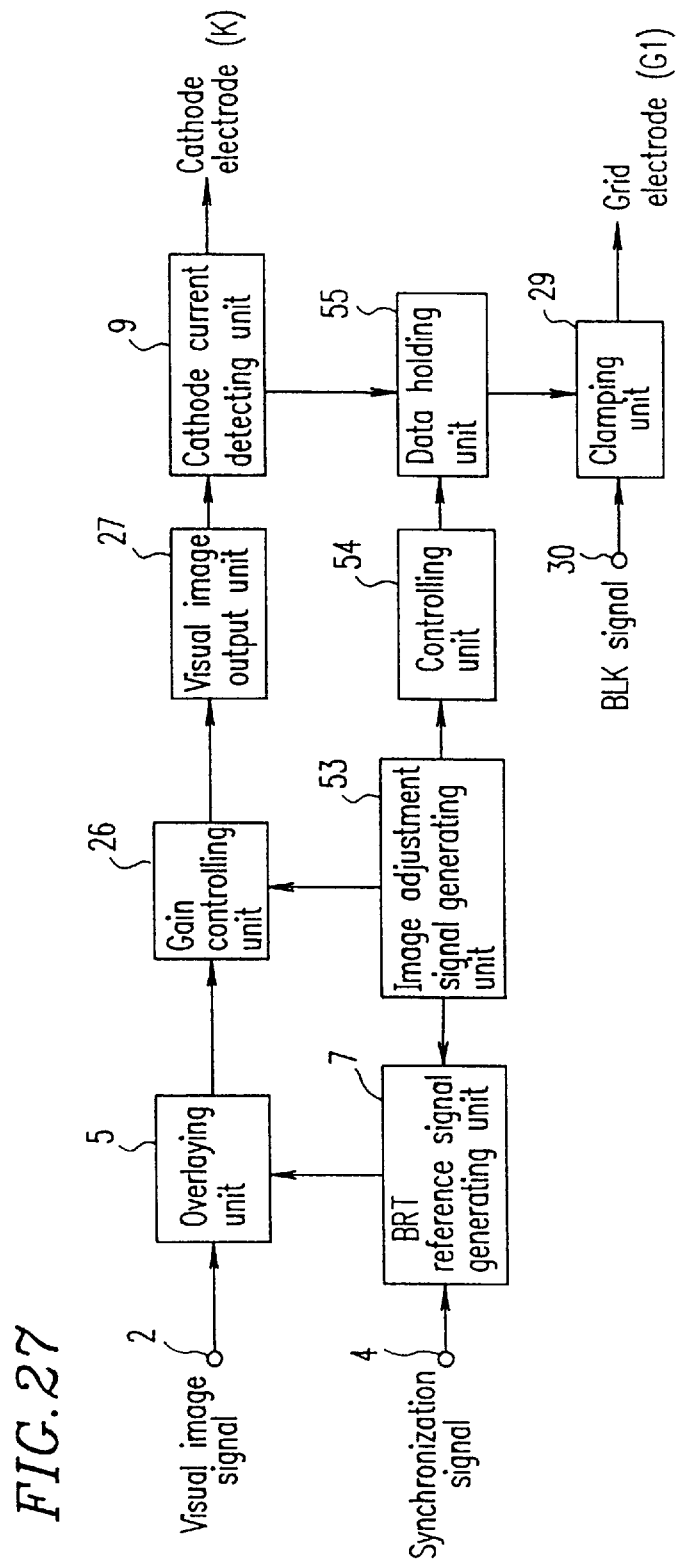
FIG. 27 is a block diagram for a visual image signal processing apparatus according to the third example of the present invention.

Next, a visual image signal processing apparatus according to a third example of the present invention will be described with reference to the figures. FIG. 27 is a block diagram for the visual image signal processing apparatus in the third example of the present invention.

In FIG. 27, reference numeral 9 designates a cathode current detecting unit which detects cathode current of the BRT signal overlaid in the visual image output signal to be applied to the K electrode, reference numeral 55 designates a data holding unit which holds detection data from the before-mentioned cathode current detecting unit 9, and reference numeral 29 designates a clamping unit which clamps the BLK signal from the input terminal 30 based on the control data from the before-mentioned data holding unit 55. Reference numeral 53 designates an image adjustment signal generating unit which generates image adjustment signals such as contrast or brightness, and reference numeral 54 designates a controlling unit for controlling the AKB operation based on the signal from the before-mentioned image adjustment signal generating unit 53. Those elements which have similar functions as those in the first and second examples are designated by the same reference numerals and the descriptions thereof are omitted.

Figure 28:
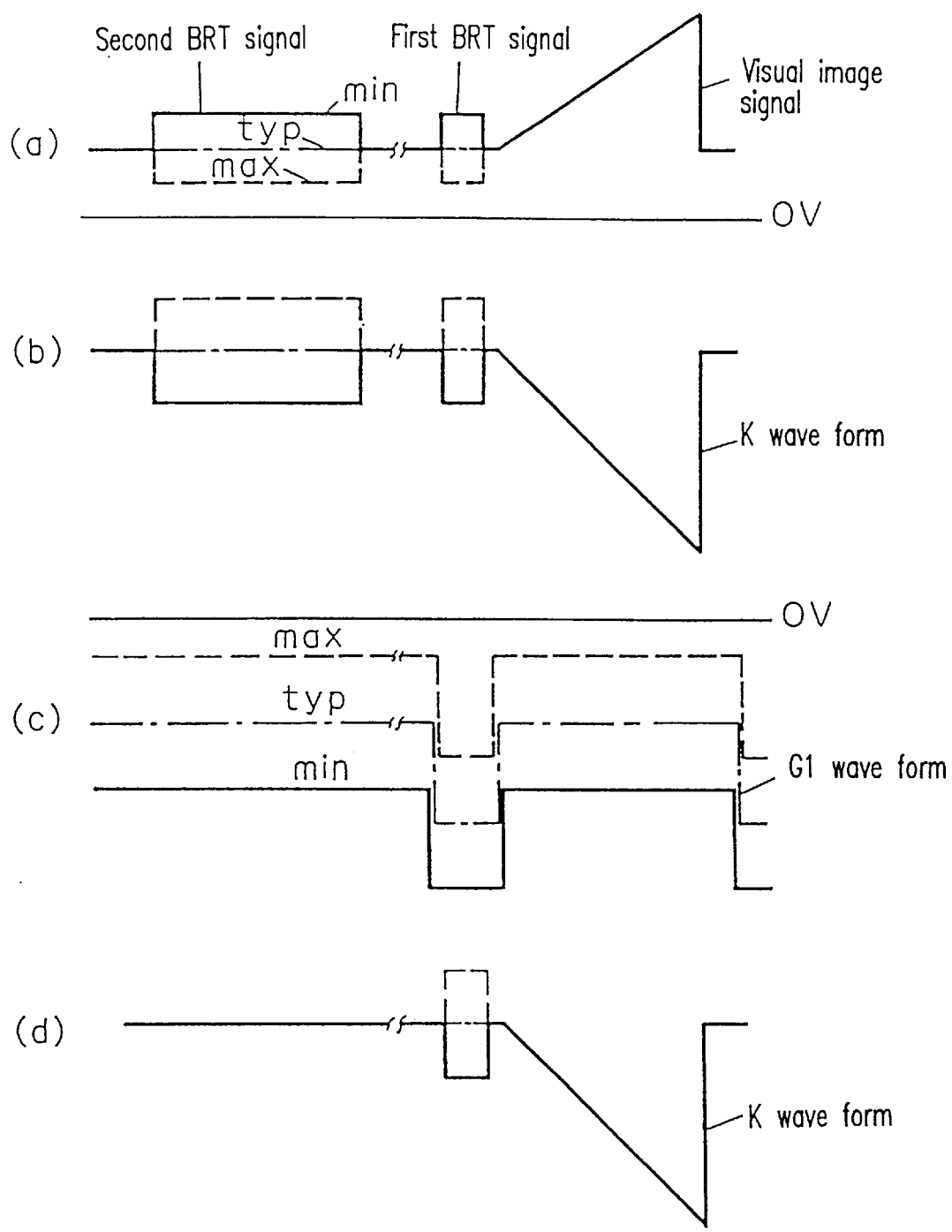
FIGS. 28(a) to (d) are operational wave form diagrams for describing the operation in the third example.

Operation of the visual image signal processing apparatus of the third example constituted as above will be described with reference to operational wave form diagrams in FIGS. 28(*a*) to 28(*d*). As a BRT signal, the first BRT signal and the second BRT signal in the horizontal fly-back period and the vertical fly-back period, respectively, are used as illustrated in FIG. 28(*a*). The cathode current detecting unit 9 detects the cathode current of the second BRT signal overlaid in the vertical fly-back period and applies the visual image output signal shown in FIG. 28(*b*) to the K electrode. The signal which detected the cathode current of the second BRT signal from the cathode current detecting unit 9 is compared with the reference voltage and then the output of this comparison is held in the data holding unit 55. The signal is then supplied to the clamping unit 29 and a closed loop AKB operation is performed.

A signal from the image adjustment signal generating unit 53 is supplied to the controlling unit 54 for controlling the AKB operation. The closed loop AKB is turned ON only when image adjustment such as contrast, brightness and gain/bias is performed. Otherwise, the control signal held in the before-mentioned data holding unit 55 is supplied to the clamping unit 29 and the direct current voltage of the BLK signal is controlled as illustrated in FIG. 28(*c*) so that the BRT control is performed. Therefore, when the AKB is OFF, as the K wave form is illustrated in FIG. 28(*d*), the second BRT signal for the cathode current is turned OFF so that the signal for detection does not stand out.

Next, a method for ON/OFF control of the AKB will be described in detail with reference to a block diagram in FIG. 29. Those elements in FIG. 29 which have similar functions as those in FIG. 27 are designated by the same reference numerals.

An image adjustment signal from the image adjustment operating unit 60 of a remote controller or an operation board is supplied to the CPU 57. When the image adjustment is not performed, data held during the before-mentioned ON state of the AKB are read out without any modification and the open loop BRT control is performed.

First, an output of the comparator 16 in the ON state of the AKB is held in the data holding unit 55 constituted of the A/D 56, the CPU 57, the memory 58, the D/A 59 and the like. This direct current voltage held as described above and having the same input/output characteristics is supplied to the clamping unit 29. The direct current voltage of the BLK signal of the $G_1$ wave form is controlled as illustrated in FIG. 28(*c*) so that the AKB operation is performed.

Next, in the OFF state of the AKB, the data held during the before-mentioned ON state of the AKB are read out without any modification so that the open loop BRT control is performed.

That is, the AKB is turned ON only when the state of image adjustment changes. Otherwise, the BRT control is performed with the held data. Therefore, stable color reproduction performance can be realized even when the AKB is OFF.

Next, a method for controlling transitional response during the ON/OFF of the AKB will be described in detail with reference to light emitting characteristic diagrams in FIGS. 30(*a*) and 30(*b*). The signal in FIG. 28(*a*) from the gain controlling unit 26 is supplied to the S/H 34, and the information of the wave height value of the second BRT signal is extracted. The signal which is obtained by processing in a time sharing manner the wave height value detection signal from the S/H 34 and the AKB control signal from the comparator 16 is supplied to the A/D 56 and transformed into a digital signal. The CPU 57 predicts the direction of convergence based on the information of the wave height value of the fast-responding BRT signal. By making a convergence in that direction in a short time without transitional response, sudden transitional response when changing from OFF to ON is inhibited.

Generally, the transitional response when the power source is engaged and the AKB is turned ON is as illustrated by a solid line in FIG. 30(a) where it becomes bright for an instant and then is stabilized. A phenomenon such as this is called a transitional phenomenon. Moreover, as in FIG. 30(b) where the transitional response is illustrated in the case where contrast or brightness is changed during the stabilized state of the set, a similar transitional phenomenon occurs. As to this phenomenon, by performing a control which predicts the direction and amount of the convergence using the wave height value detection signal of the BRT signal, the transitional response during sudden change is inhibited as illustrated by a broken line in FIGS. 30(a) and 30(b). By predicting the output voltage of the comparator 16 from the BRT voltage on the abscissa in FIG. 26(a) and, after performing a rough adjustment by providing control to the vicinity of the converging point when the AKB is OFF, by performing fine adjustment by the closed loop control during the ON state of the AKB, the ON/OFF transition of the AKB can be realized without disordering the image even during the sudden change.

Figure 31:
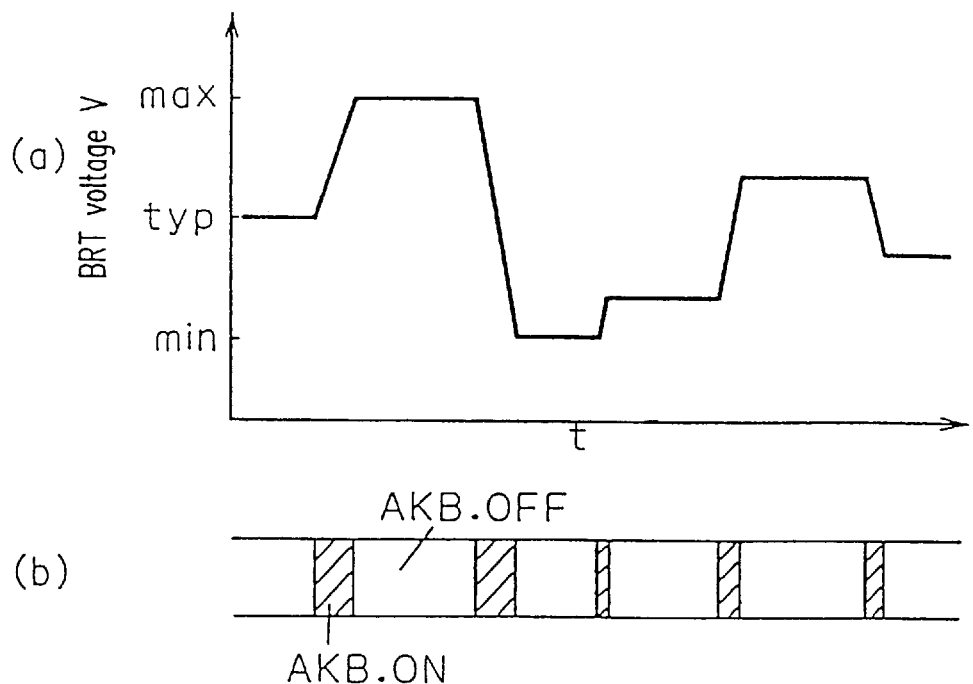
FIG. 31(a) is a characteristic view and FIG. 31(b) is an operational view, both for describing the auto cut-off operation in the third example.

Although the description is given in this example of the case where ON/OFF of the AKB is performed by extracting the change in the image adjustment signal such as contrast, brightness and gain/bias and the like, since the control of the AKB is originally for cut-off adjustment, it can easily be performed by detecting the wave height value of the BRT signal which contains all the information. The AKB operation during the BRT change is illustrated in FIGS. 31(a) and 31(b). FIG. 31(a) is a change diagram where the abscissa represents time and the ordinate represents the BRT voltage. As the AKB operation is illustrated in FIG. 31(b), the AKB is turned ON only when the BRT signal changes (indicated by the shaded portion) and the AKB is otherwise turned OFF in the stabilized state.

Figure 32:
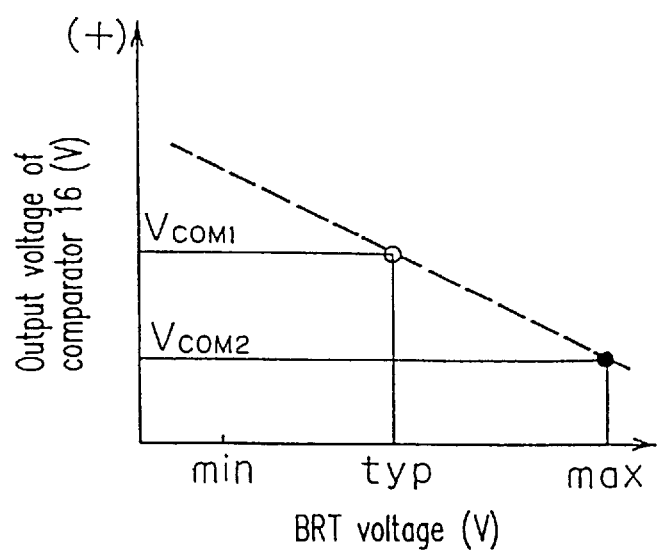
FIG. 32 is a characteristic view for describing the converging operation of the auto cut-off in the third example.

Next, the converting operation will be described in detail with reference to a characteristic diagram in FIG. 32. In FIG. 32, the abscissa represents the BRT voltage which detected the wave height value of the BRT signal, and the ordinate represents the output voltage of the comparator 16. It can be seen from the figure that the output voltage of the comparator 16 changes linearly with respect to the BRT voltage. When the BRT setting condition is changed from the typical state (typ: indicated by a white circle ○) to the maximum state (max: indicated by a black circle ●) in FIG. 32, the AKB control signal from the comparator 16 is automatically changed from $V_{CCM1}$ to $V_{COM2}$ in accordance with the information of the wave height value detection signal (BRT voltage) from the before-mentioned S/H 17. Then the closed loop AKB operation which detected the cathode current is performed. As described above, by performing rough adjustment with the fast-responding voltage information and then performing fine adjustment with relatively slow responding current information, the correction range for the closed loop control becomes significantly small and the transitional response illustrated in FIGS. 30(a) and 30(b) due to a sudden change can be considerably inhibited, thereby resolving the disordering of the image during the ON/OFF transition of the AKB.

Similarly, in the case where the power source is engaged as illustrated in FIG. 30(a), the AKB is OFF immediately after the power source engagement. By detecting proper BRT voltage and turning the AKB ON after performing the AKB control signal based on this information, the transitional response during the power source engagement can be considerably inhibited.

Although the description was given in this example of the case where the cathode electrode driving was performed, it is also effective in the case where the parallel driving is performed as in the first example.

As described above, in this example, by applying to the K electrode a signal overlaid with the BRT signal in the fly-back period of the visual image signal, and by performing the brightness control by detecting the beam current of the BRT signal to be applied to this K electrode only when the image adjustment is performed and by changing the applied voltage to be applied to the $G_1$ electrode by the signal which held this detection signal, the ON/OFF control of the AKB can easily be realized without disordering the image. Therefore, in a regular image, highly stable color reproduction performance can easily be realized with no signal for detection standing out. In particular, this is a significantly effective means in a multi-scanning projection type display which uses a CRT in a large current region and performs large amplitude and broad band width driving.

(Example 4)

Figure 33:
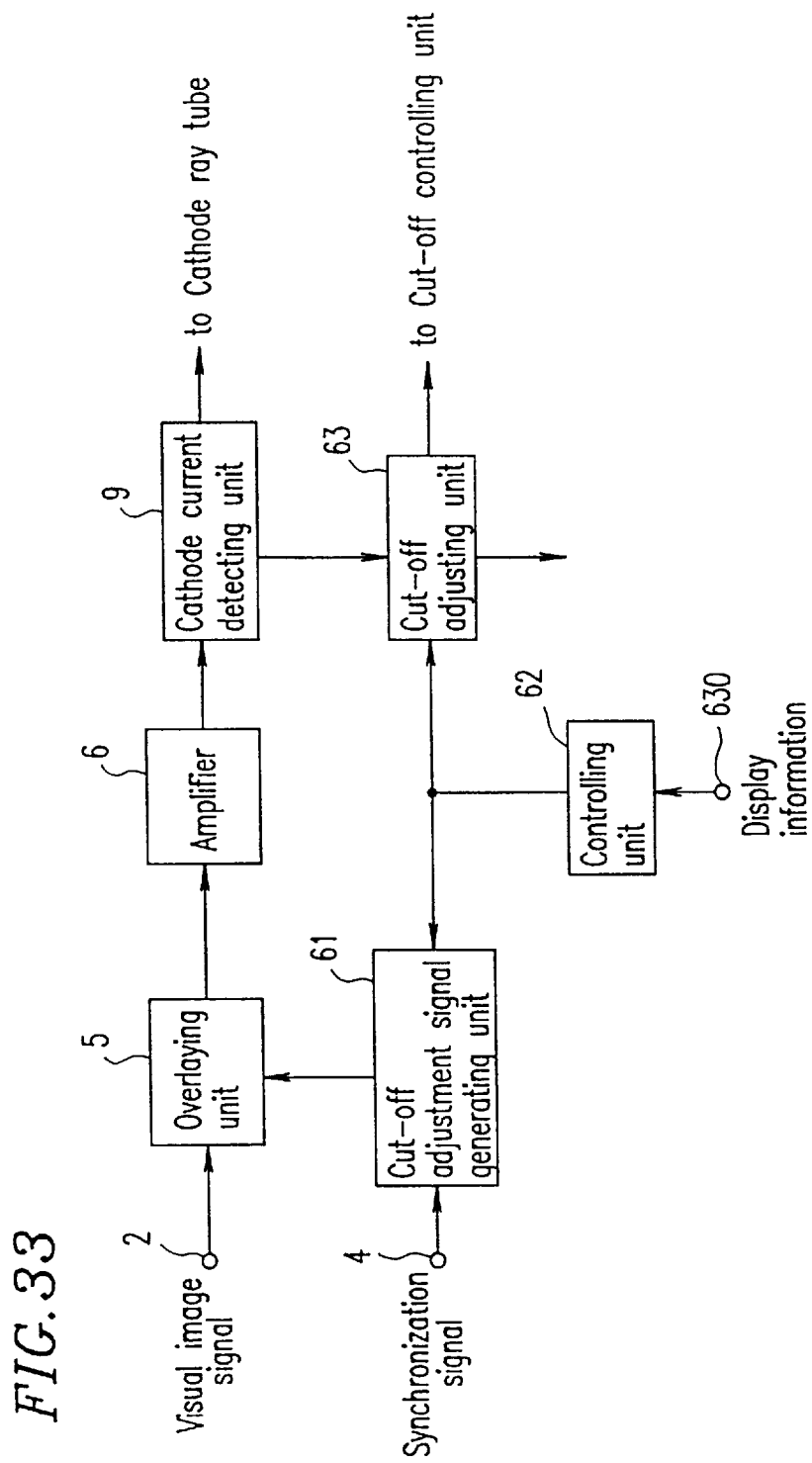
FIG. 33 is a block diagram for a visual image signal processing apparatus according to a fourth example of the present invention.

Next, a visual image signal processing apparatus according to a fourth example of the present invention will be described with reference to the figures. FIG. 33 is a block diagram for the visual image signal processing apparatus of the fourth example of the present invention.

In FIG. 33, reference numeral 61 designates a cut-off adjustment signal generating unit which generates a cut-off adjustment signal (hereinafter referred to as AKB signal) in the vertical fly-back period, and reference numeral 9 designates a cathode current detecting unit which detects the cathode current of the AKB signal overlaid in the visual image output signal to be applied to the cathode ray tube and calculates a control signal. Furthermore, reference numeral 63 designates a cut-off adjusting unit which performs a cut-off adjustment of the cathode ray tube based on the control signal from the before-mentioned cathode current detecting unit 9, reference numeral 630 designates an input terminal to which display information to be displayed on the cathode ray tube is supplied, and reference numeral 62 designates a controlling unit which controls the AKB operation in accordance with the condition of the display to be displayed on the cathode ray tube from the input terminal 630. Those elements which have similar functions as those in the first, second and third examples are designated by the same reference numerals and the descriptions thereof are omitted.

Figure 34:
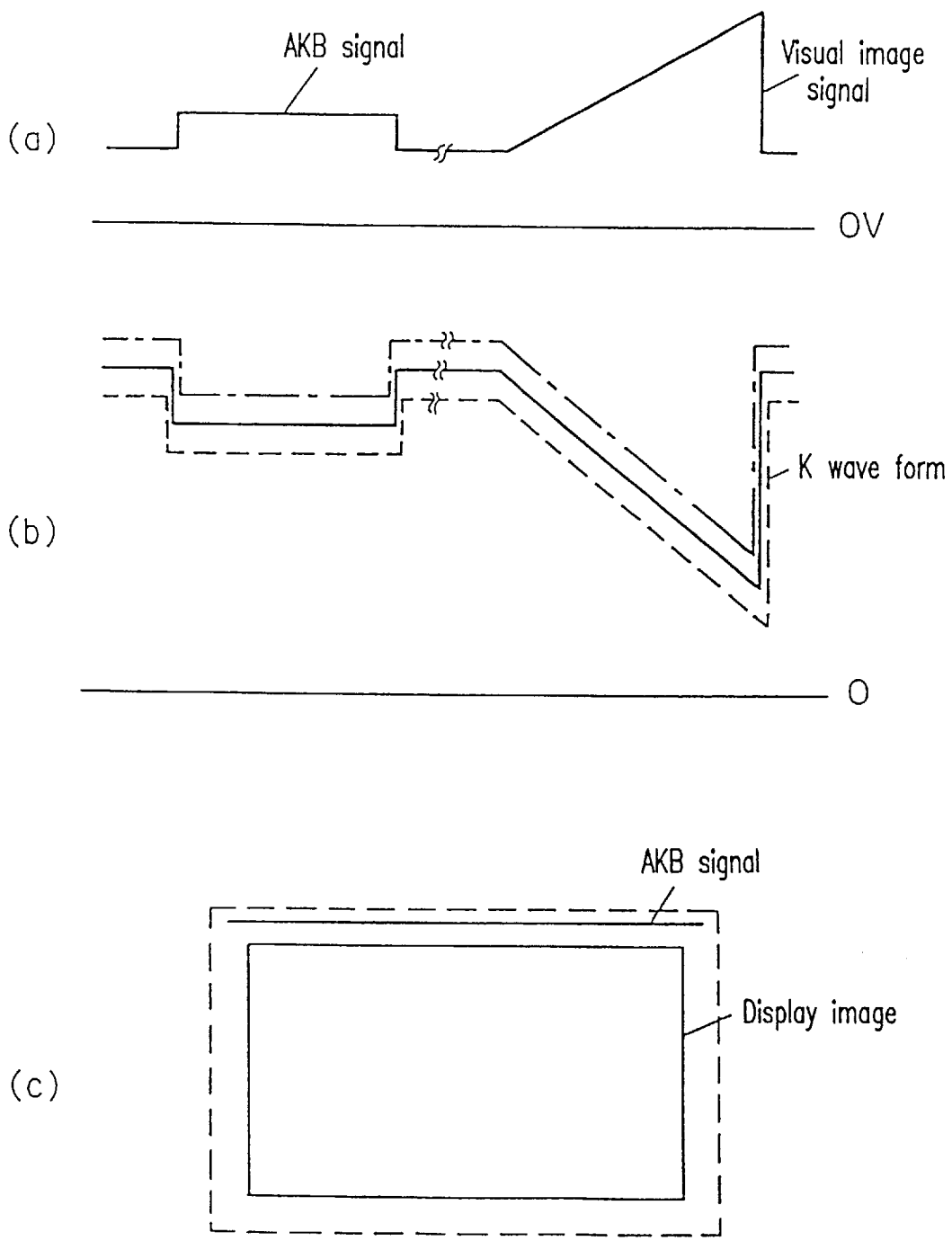
FIGS. 34(a) and (b) are operational wave form diagrams for describing the operation in the fourth example, and (c) is a characteristic view illustrating a display image of the AKB signal in the fourth example.

Operation of the visual image signal processing apparatus of the fourth example constituted as above will be described with reference to operational wave form diagrams in FIGS. 34(a) to 34(c). As a signal for cut-off adjustment, the AKB signal in the vertical fly-back period is used as illustrated in FIG. 34(a). The cathode current detecting unit 9 detects the cathode current of this AKB signal, and the visual image output signal of negative polarity is applied to the K electrode as illustrated in FIG. 34(b). The signal which detected the cathode current from the cathode current detecting unit 9 is compared with the reference voltage and the control signal is calculated. This control signal is supplied to the cut-off adjusting unit 63 and the AKB operation is performed. As in a display image of the AKB signal illustrated in FIG. 34(*c*), the AKB signal is in the over-scan region at the top of the image.

An image scene or display information such as image adjustment condition, brightness and image size from the input terminal 630 is supplied to the controlling unit 62 for controlling the AKB operation, and feedback control of the AKB operation is performed in accordance with the display condition. Otherwise, the hold control signal is supplied to the cut-off adjusting unit 63, and the direct current voltage of K wave form as illustrated in FIG. 34(*b*) is controlled so as to perform the AKB operation. Therefore, when the AKB is OFF, the AKB signal illustrated in FIG. 34(*a*) is turned OFF and the signal for detection does not stand out.

Figure 35:
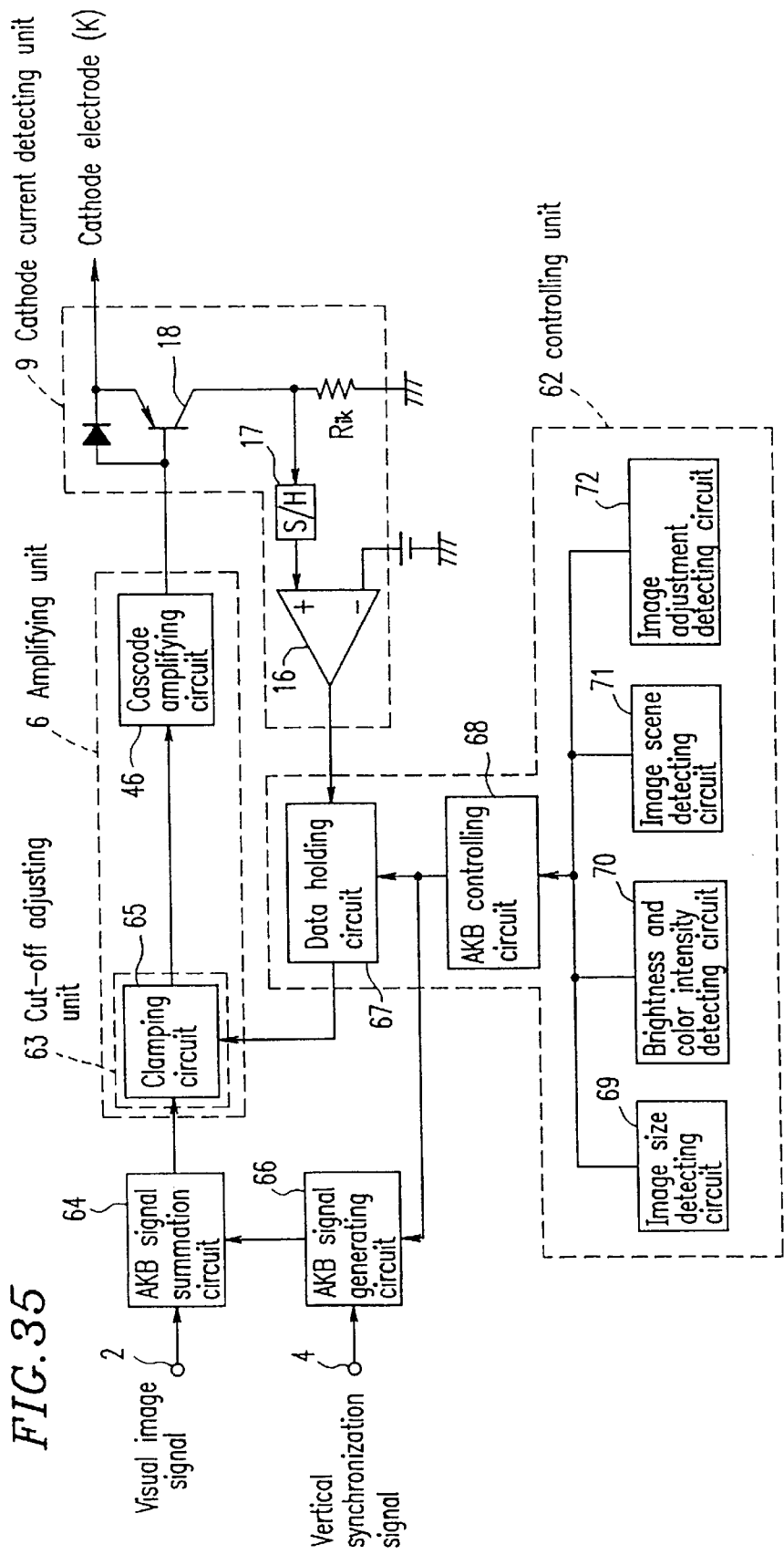
FIG. 35 is a block diagram for describing the auto cut-off operation in the fourth example.

Next, the ON/OFF operation of the AKB will be described in detail with reference to a block diagram in FIG. 35. Those elements in FIG. 35 which have similar functions as those in FIG. 33 are designated by the same reference numerals. As to a means for cut-off control of this example, although the description is given of the case where the cut-off adjustment is performed by controlling the direct current voltage to be applied to the cathode electrode, the cut-off operation can be performed for other grid electrodes.

Figure 29:
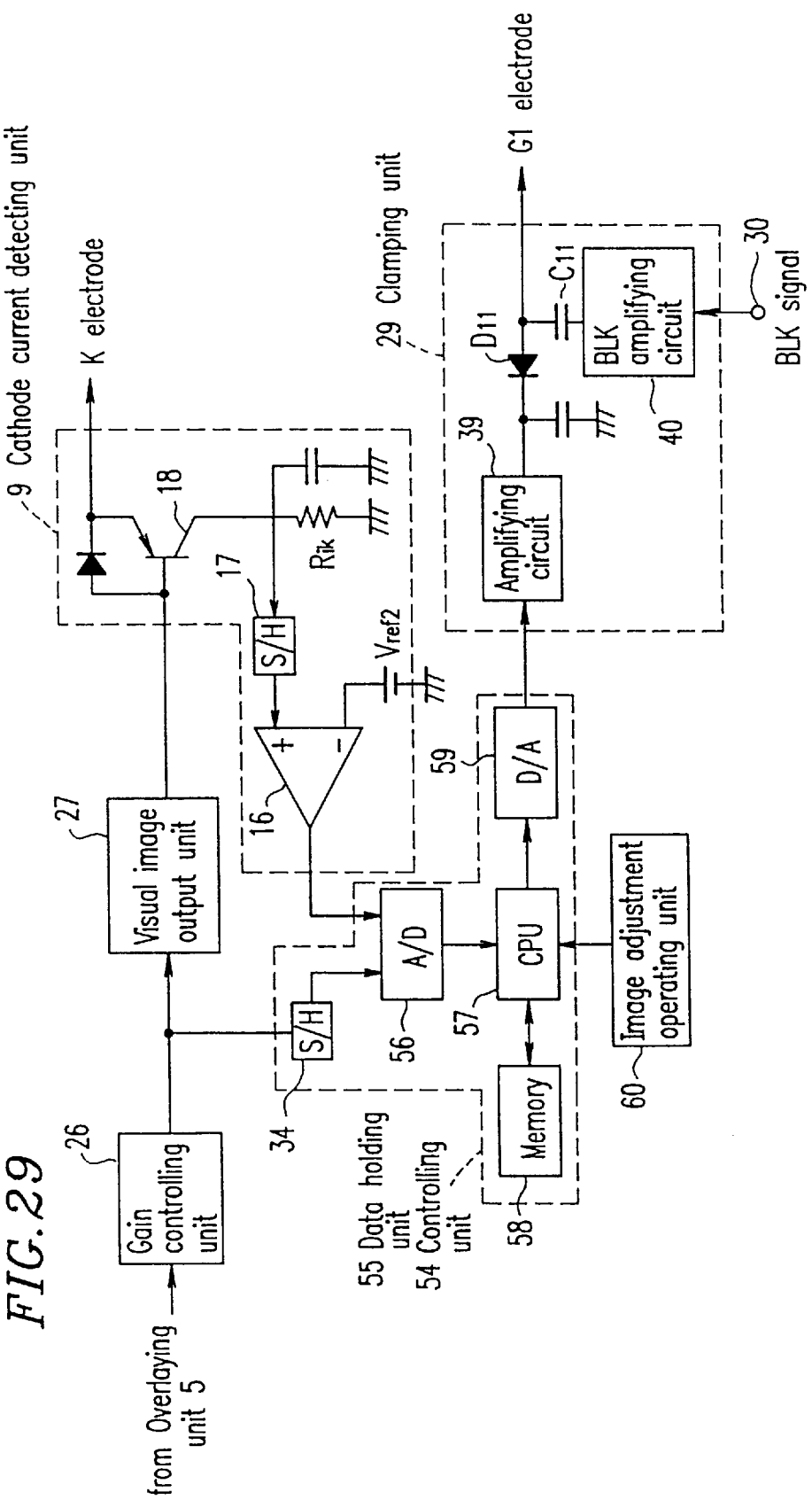
FIG. 29 is a block diagram for describing the brightness control operation in the third example.

First, the output voltage from the comparator 16 in the ON state of the closed loop AKB is held in the data holding circuit 67 constituted of the A/D, the CPU, the memory, the D/A and the like as described in the third example with FIG. 29. This direct current voltage which is held and has the same input/output characteristics is supplied to the clamping circuit 65. The pedestal voltage of the K wave form is controlled so as to perform the AKB operation as illustrated in FIG. 34(*b*). As described above, the closed loop AKB operation is performed by changing the clamp voltage in such a manner that the cathode current of the AKB signal is always constant.

Next, operation in the OFF state of the AKB will be described. When the AKB is OFF, data held during the before-mentioned ON state of the AKB are read without any modification so as to perform an open loop AKB control. Moreover, this AKB operation is controlled by the AKB controlling circuit 68 in accordance with the signals which detected the display condition from the image size detecting circuit 69, the brightness and color intensity detecting circuit 70, the image scene detecting circuit 71 and the image adjustment detecting circuit 72.

Figure 36:
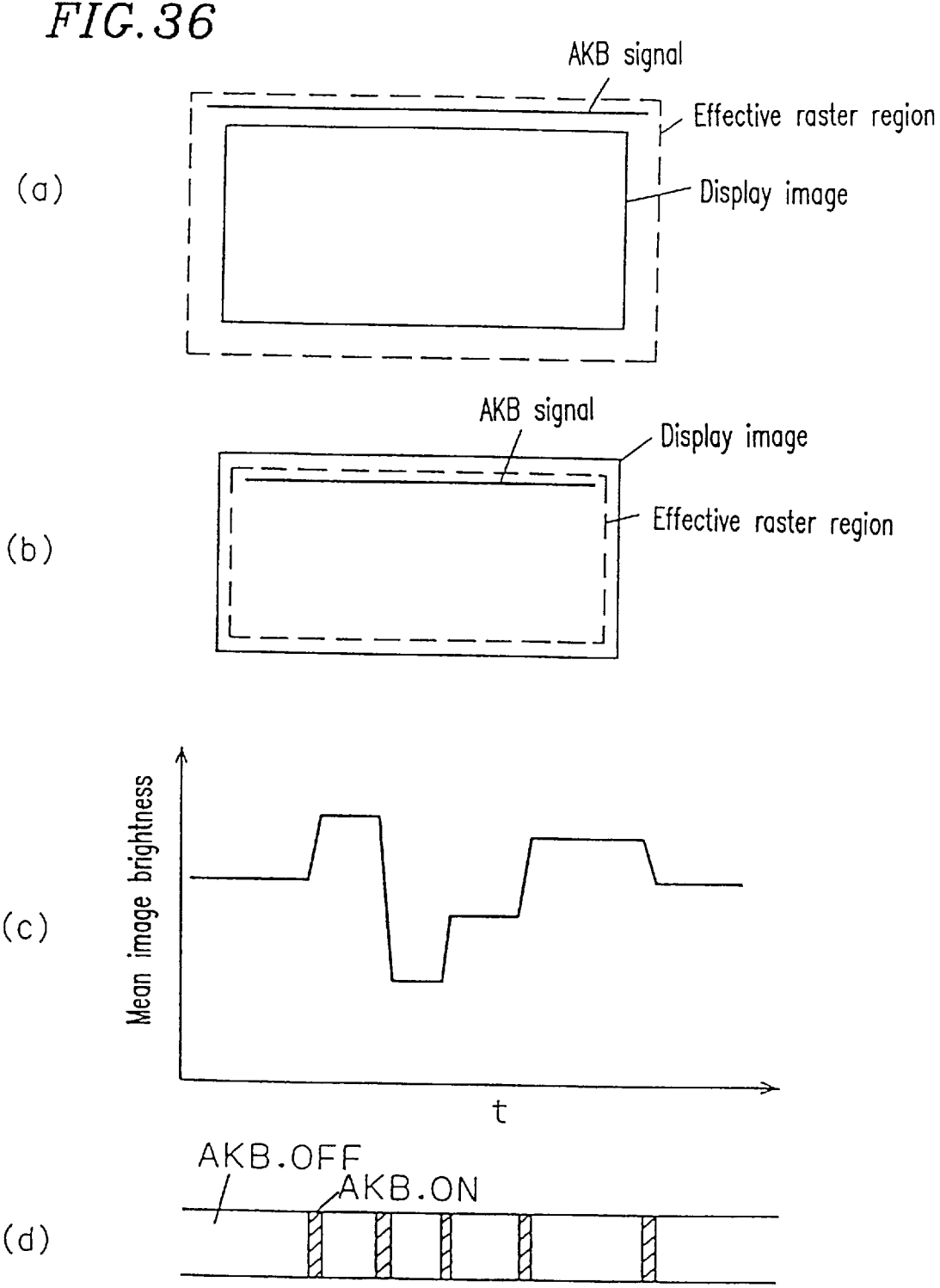
FIGS. 36(a) and (b) are characteristic views illustrating a display image, (c) is a characteristic view and (d) is a characteristic view illustrating the AKB operation, all for describing the auto cut-off operation in the fourth example.

Next, a controlling method during the ON/OFF transition of the AKB will be described in detail with reference to display image diagrams and light emitting characteristics diagrams in FIGS. 36(*a*) to 36(*d*). Conditions of the AKB signals are illustrated in FIG. 36(*a*) for over-scanning and in FIG. 36(*b*) for under-scanning. Since the effective raster region is larger than the display image in FIG. 36(*a*), the AKB signal for detection does not stand out outside the display image. However, if the effective raster region is smaller than the display image as illustrated in FIG. 36(*b*), the AKB signal exists within the display image and, therefore, stands out. The apparatus is controlled such that when it is over-scanning as in FIG. 36(*a*), the detection and adjustment are performed whenever necessary, and when it is under-scanning as in FIG. 36(*b*), the detection and adjustment are performed in accordance with the display information.

FIG. 36(*c*) is a change diagram where the abscissa represents time and the ordinate represents means image brightness. The AKB operation corresponding to the above change diagram is illustrated in FIG. 36(*d*). The AKB is controlled such that it is turned ON only when the image adjustment condition such as image scene, contrast, brightness and the like, and the brightness or color intensity change (indicated by the shaded portion). Otherwise, the AKB is turned OFF.

Next, ON/OFF control of the AKB in accordance with the display condition will be described in detail. Image size information from the polarization circuit, image size data for amplitude adjustment and the like are supplied to the image size detecting circuit 69. Based on this information, it is determined whether or not the signal for detection is provided on the display image, and the control of the AKB operation is performed accordingly.

Detection signals from the photo sensor disposed on the periphery of the image, control signals calculated at the cathode current detecting unit 9 and the like are supplied to the brightness and color intensity detecting circuit 70. Based on this information, the AKB operation is controlled when the brightness and the color intensity change. It is also possible to automatically perform the converging operation when exceeding a predetermined acceptable range, using this information.

A visual image signal for driving the cathode ray tube, beam current and the like are supplied to the image scene detecting circuit 71. The scene change is detected in accordance with this information, and the AKB operation is controlled when the scene changes. The scene change of the visual image signal can be performed by detecting finite differences between frames of images or by using a determining signal which performs signal determination by detecting a switching signal when the signal is switched, the scanning frequency or the number of scanning lines.

A variety of control signals for image adjustment such as contrast, brightness, gain, bias and the like are supplied to the image adjustment detecting circuit 72. The AKB operation is controlled in accordance with this information when image adjustment conditions change. The AKB can also be controlled when key control is performed on the operation panel or on a remote controller.

Next, a converging operation of the cut-off adjustment will be described in detail with reference to characteristic diagrams in FIGS. 37(*a*) to 37(*d*). FIGS. 37(*a*) to 37(*d*) illustrate the control when cut-off errors become gradually large as time passes due to, for example, the drift of the driving system, a chronological change of the cathode ray tube or the like. FIGS. 37(*a*) and 37(*b*) illustrate the error and the control signal in the case where the converging operation is performed rapidly, and FIGS. 37(*c*) and 37(*d*) illustrate the same in the case where the converging operation is performed slowly. As illustrated in FIG. 37(*a*), when the error exceeds the acceptable range and the closed loop control is rapidly performed at the time indicated by an arrow, the control signal stored during the ON state of the AKB is output and supplied to the cut-off adjustment unit. The control signal then is as illustrated in FIG. 37(*b*) where it changes stepwise, holding the value of the ON state of the AKB when the AKB is OFF. As described above, when the closed loop control is rapidly performed, the brightness of the image observed on the screen of the display apparatus changes rapidly. Therefore, when performing the adjustment while a regular visual image such as a TV image is being displayed, the converging operation thereof likely will stand out. Therefore, in such cases, a slow feedback control is performed as illustrated in FIGS. 37(*c*) and 37(*d*). In this case, by gradually increasing the error data from zero to the stored value, the control signal gradually becomes large as illustrated in FIG. 37(d). By doing this, the error gradually changes as illustrated in FIG. 37(c), and the converging operation becomes unlikely to stand out on the display image.

The control and converging methods of the AKB operation described above vary depending on the display configuration. For example, the over-scanning region cannot be seen on a direct view type display or a projection type display using a transmission type screen. However, although the over-scanning region can be distinguished from the display image by the screen frame in a projection type display using a reflection type screen, the image in the over-scanning region is in principle projected. Therefore, it goes without saying that because of different display configurations, priority of detection among display conditions such as image size, brightness, color intensity, image scene, image adjustment and the like changes the controlling method. Moreover, since an image display of television method or the like uses over-scanning display and a character display of a computer terminal or the like uses under-scanning display, the controlling method varies depending on the source of the signal. The first priority is the image size information and either the adjustment on whenever-necessary-basis or the periodic adjustment is set. The second priority and the rest include the detection information such as image scene, image adjustment, and brightness and color intensity depending on the usage, and the AKB control is performed accordingly.

As described above, according to this example, by driving the cathode ray tube for display with the visual image signal overlaid with the cut-off adjustment signal in the fly-back period, and by performing the cut-off adjustment of the cathode ray tube with the detection signal which detected the beam current of this adjustment signal in accordance with the display condition, ON/OFF of the AKB can be easily realized without the signal for detection standing out.

(Example 5)

Figure 38:
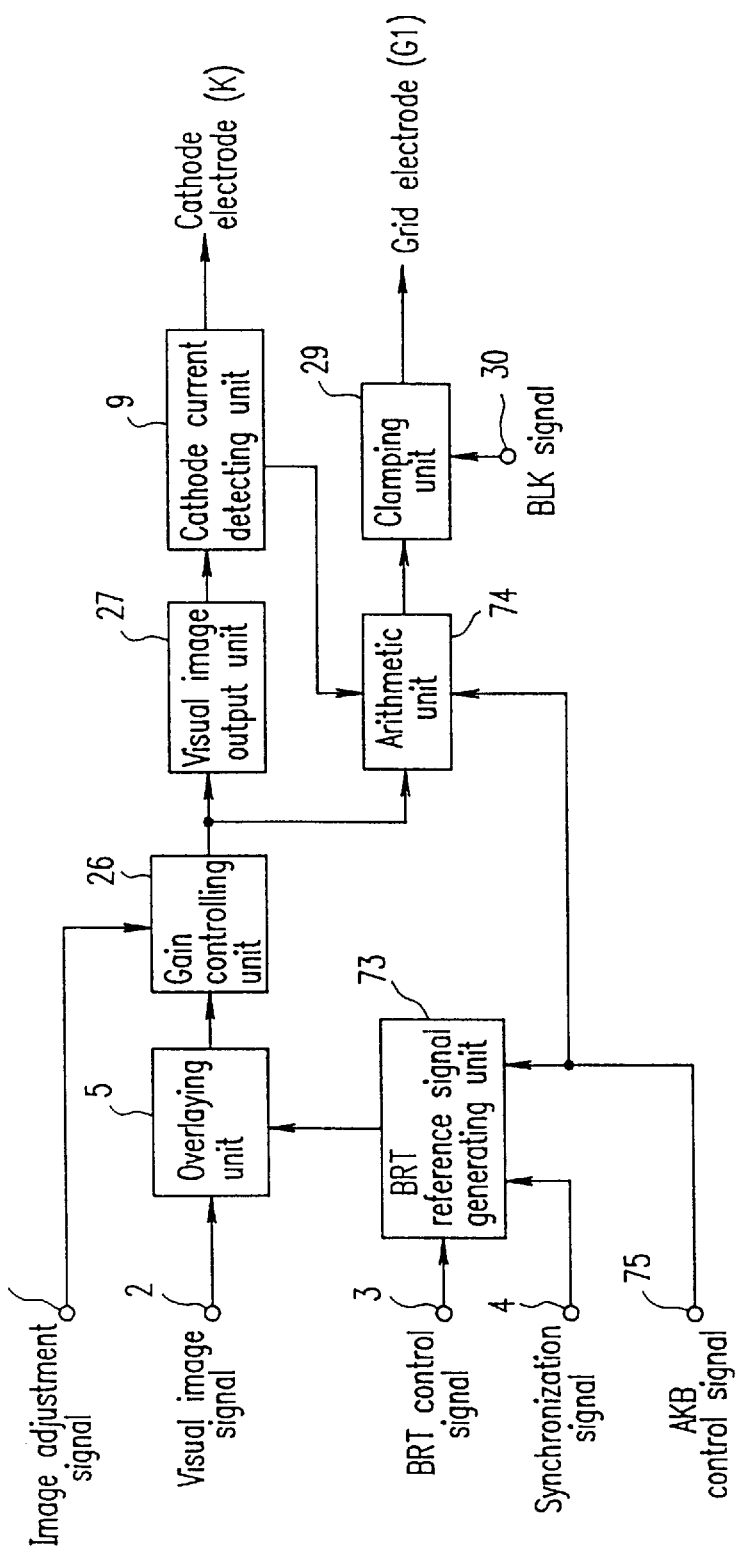
FIG. 38 is a block diagram for a visual image signal processing apparatus according to a fifth example of the present invention.

Next, a visual image signal processing apparatus according to a fifth example of the present invention will be described with reference to the figures. FIG. 38 is a block diagram of the visual image signal processing apparatus according to the fifth example of the present invention.

In FIG. 38, reference numeral 75 designates an input terminal to which the AKB control signal for controlling the AKB operation is supplied, reference numeral 73 designates a BRT reference signal generating unit which generates a BRT signal based on the AKB control signal from the input terminal 75, and reference numeral 9 designates a cathode current detecting unit which detects the cathode current of the BRT signal to be applied to the K electrode. Reference numeral 74 designates an arithmetic unit which obtains by arithmetic operation a brightness control signal from the BRT signal overlaid in the fly-back period of the visual image signal and the cathode current from the before-mentioned cathode current detecting unit 9, and reference numeral 29 designates a clamping unit which clamps the BLK signal from the input terminal 30 based on the control signal from the before-mentioned arithmetic unit 74. Those elements which have similar functions as those in the first, second, third and fourth examples are designated by the same reference numerals and the descriptions thereof are omitted.

Figure 39:
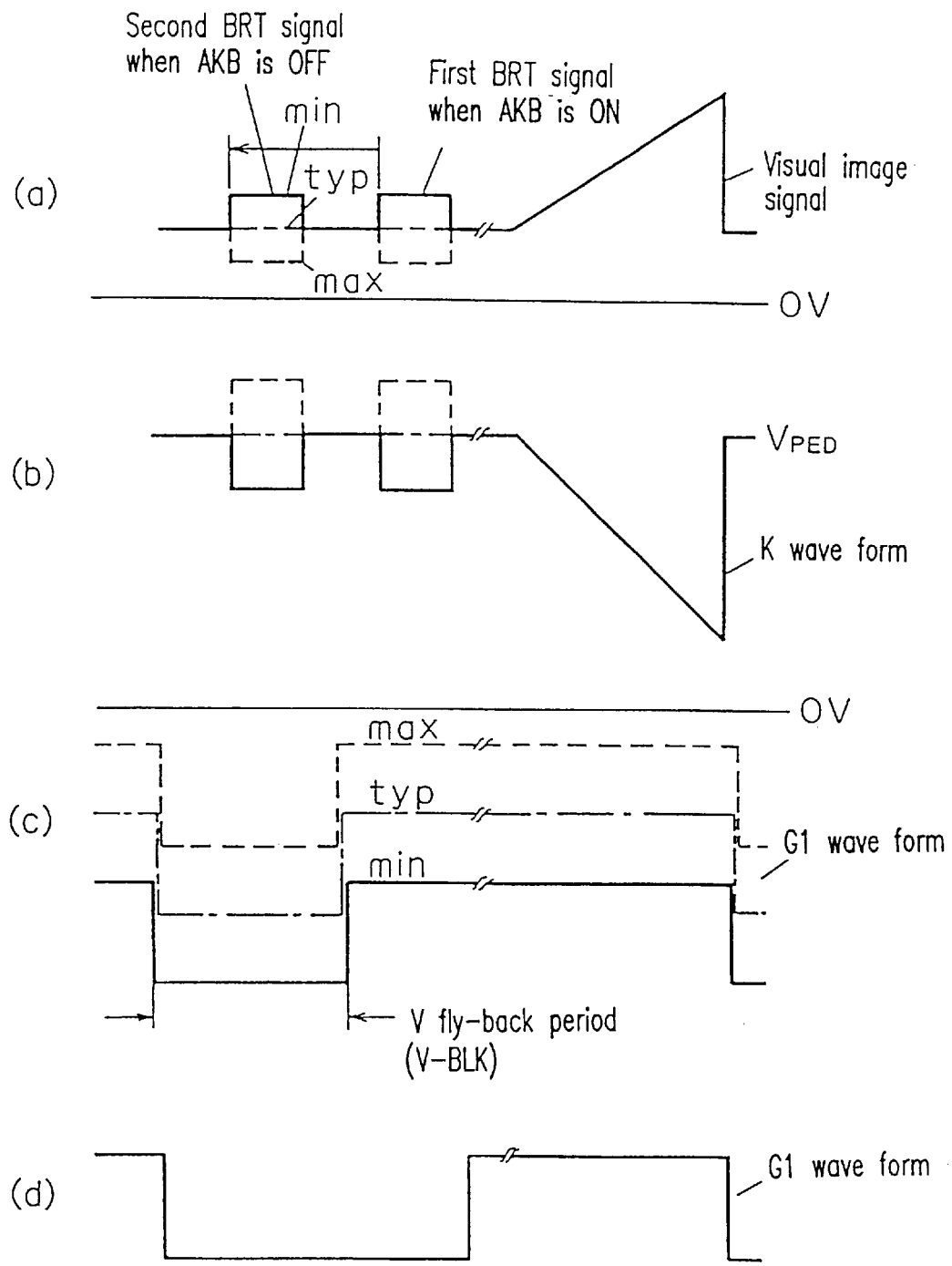
FIGS. 39(a) and (d) are operational wave form diagrams for describing the operation in the fifth example.

Operation of the visual image signal processing apparatus according to the fifth example constituted as above will be described with reference to operational wave form diagrams in FIGS. 39(a) to 39(d). As illustrated in FIG. 39(a), the BRT signal is overlaid outside the V-BLK period when the AKB is ON. When the AKB is OFF, the first and second BRT signals having different phases are switchingly overlaid within the V-BLK period.

First, the operation when the AKB is ON will be described. The cathode current detecting unit 9 detects the cathode current of the first BRT signal, and the visual image output signal of negative polarity illustrated in FIG. 39(b) is applied to the cathode electrode. The signal which detected the cathode current of the first BRT signal from the cathode current detecting unit 9 is compared with the reference voltage. This output voltage is supplied to the clamping unit 29 through the arithmetic unit 74, and the BRT control and the cut-off adjustment are automatically performed by controlling the direct current voltage of the BLK signal as illustrated in FIG. 39(c).

Next, when the AKB is OFF, the timing of generating the BRT signal is controlled at the BRT reference signal generating unit 73 based on the AKB control signal from the input terminal 75, and the BRT signal is shifted to a location of the second reference signal within the V-BLK period as illustrated in FIG. 39(a). The visual image signal overlaid with the second BRT signal from the gain controlling unit 26 is supplied to the arithmetic unit 74. A detection signal which detected the wave height value of the second BRT signal and a control signal which performs the BRT control at the $G_1$ electrode of the cathode ray tube based on the control signal from the before-mentioned cathode current detecting unit 9 are obtained by arithmetic operation. Therefore, even in the OFF state of the AKB, BRT control similar to that in the ON state is performed as illustrated in FIG. 39(c).

A simple method for shifting the phase of the first and second BRT signals is as follows. By starting a shift register at the rise and fall of the polarization type vertical fly-back signal (V-BLK) illustrated in FIG. 39(c), the first BRT signal outside the V-BLK period and the second BRT signal within the V-BLK period are generated. This can be easily realized, for example, by supplying the horizontal synchronization signal to the clock input terminal of the shift register and by switching the polarity of the V-BLK signal to be supplied to the data input terminal. Moreover, if another method is used where the period for the V-BLK signal is set to be broad as illustrated in FIG. 39(d) and the blanking of the first BRT signal is performed, the shifting of the phase can be done with only the first BRT signal. The AKB control signal to be supplied to the input terminal 75 is formed using a signal manually set from a control board or a determining signal which detected the frequency or the number of scanning lines. For example, the AKB is generally set to the ON state for image display such as that of a television method and to the OFF state for character display such as a computer terminal.

Next, a method for ON/OFF control of the AKB will be described in detail with reference to a block diagram in FIG. 40. Those elements in FIG. 40 which have similar functions as those in FIG. 38 are designated by the same reference numerals.

First, the output voltage from the comparator 16 in the ON state of the AKB is supplied to the clamping unit 29 constituted of peak clamping circuits through the switching circuit 76 (a-side). Then, the closed loop BRT control is performed by changing the grid voltage in such a manner that the cathode current of the before-mentioned first BRT signal is always constant.

Next, the wave height value detection signal of the BRT signal from the amplifier 41 in the OFF state of the AKB and the signal obtained by processing in a time sharing manner the output signal from the comparator 16 during the before-mentioned ON state of the AKB are supplied to the A/D 48 and transformed into a digital signal. The CPU 49 detects a present control voltage $V_{CONT1}$ from the BRT voltage versus an output voltage characteristic when the AKB is ON (indicated by ●) illustrated by a broken line in FIG. 41(a) and then from this information, obtains by arithmetic operation the control voltage $V_{CONT2}$ when the AKB is OFF (indicated by ○). The obtained signal is transformed into an analog signal by the D/A 50, and after switching the flow of this signal by the switching circuit 76 (b-side), the signal is amplified by the amplifying circuit 39, thereby obtaining the BRT voltage versus $G_1$ clamping voltage characteristic illustrated by a broken line in FIG. 41(b).

Figure 41:
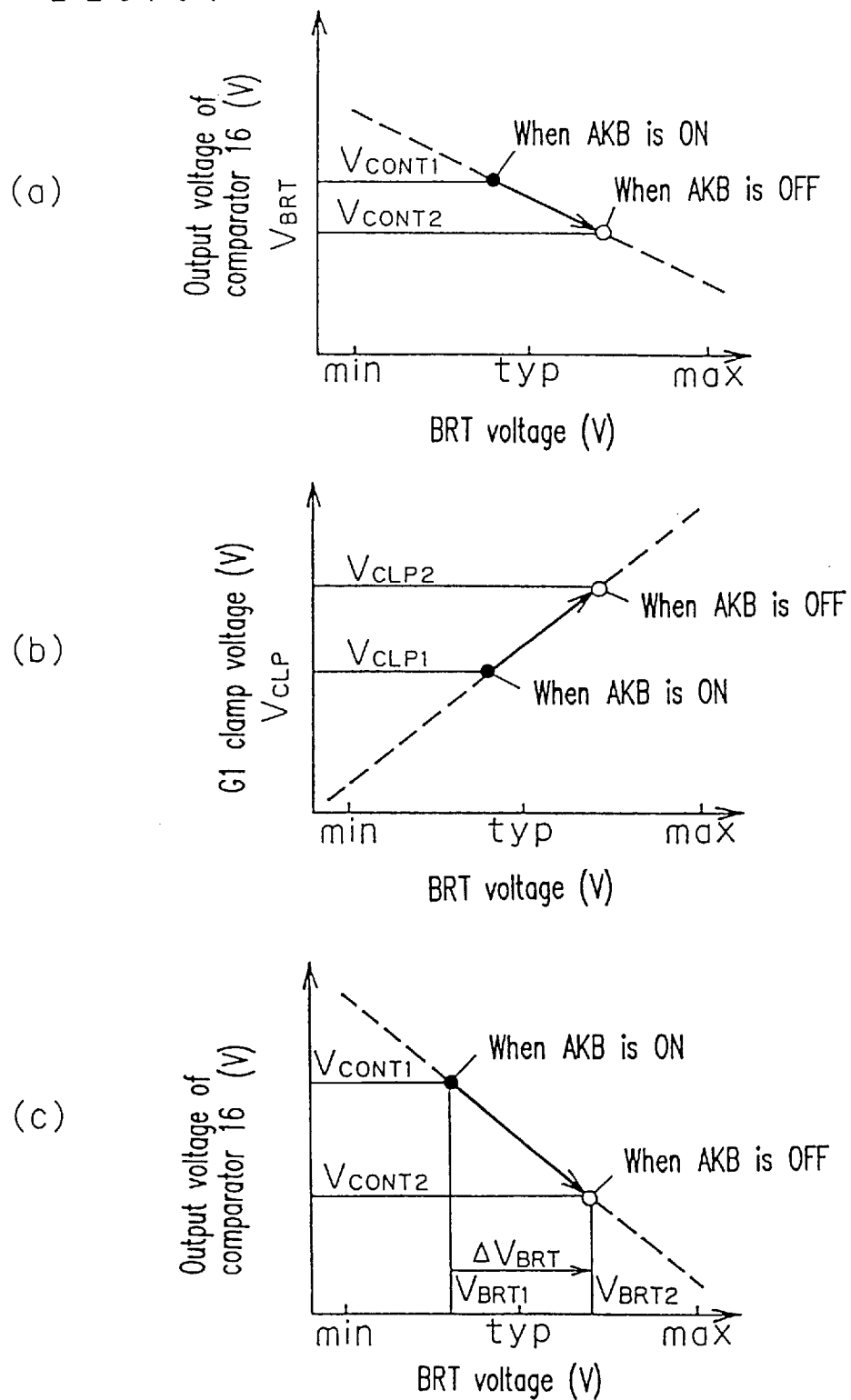
FIGS. 41(a) to (c) are characteristic views for describing the arithmetic operation in the fifth example.

Next, a method for arithmetic operation when setting the adjustment in the field will be described. In setting the adjustment in the field, the AKB is compulsorily set to the ON state (indicated by ●) during the engagement of the power source in the set, and data for the BRT voltage $V_{BRT1}$ and the output voltage $V_{CONT1}$ during adjustment are stored in memory as illustrated in FIG. 41(c). Later, the AKB is turned OFF (indicated by ○) when necessary, and the output voltage $V_{CONT2}$ when the AKB is OFF is obtained from the following formula (1) from the data stored during the adjustment.

$$V_{CONT2} = V_{CONT1} + (k \times \Delta V_{BRT}) \qquad (1)$$

where $\Delta V_{BRT}$ is $(V_{BRT1} - V_{BRT2})$, a change in BRT, and k is a difference in sensitivity during the $G_1$ application, which is about 1.2 to about 1.3.

Figure 40:
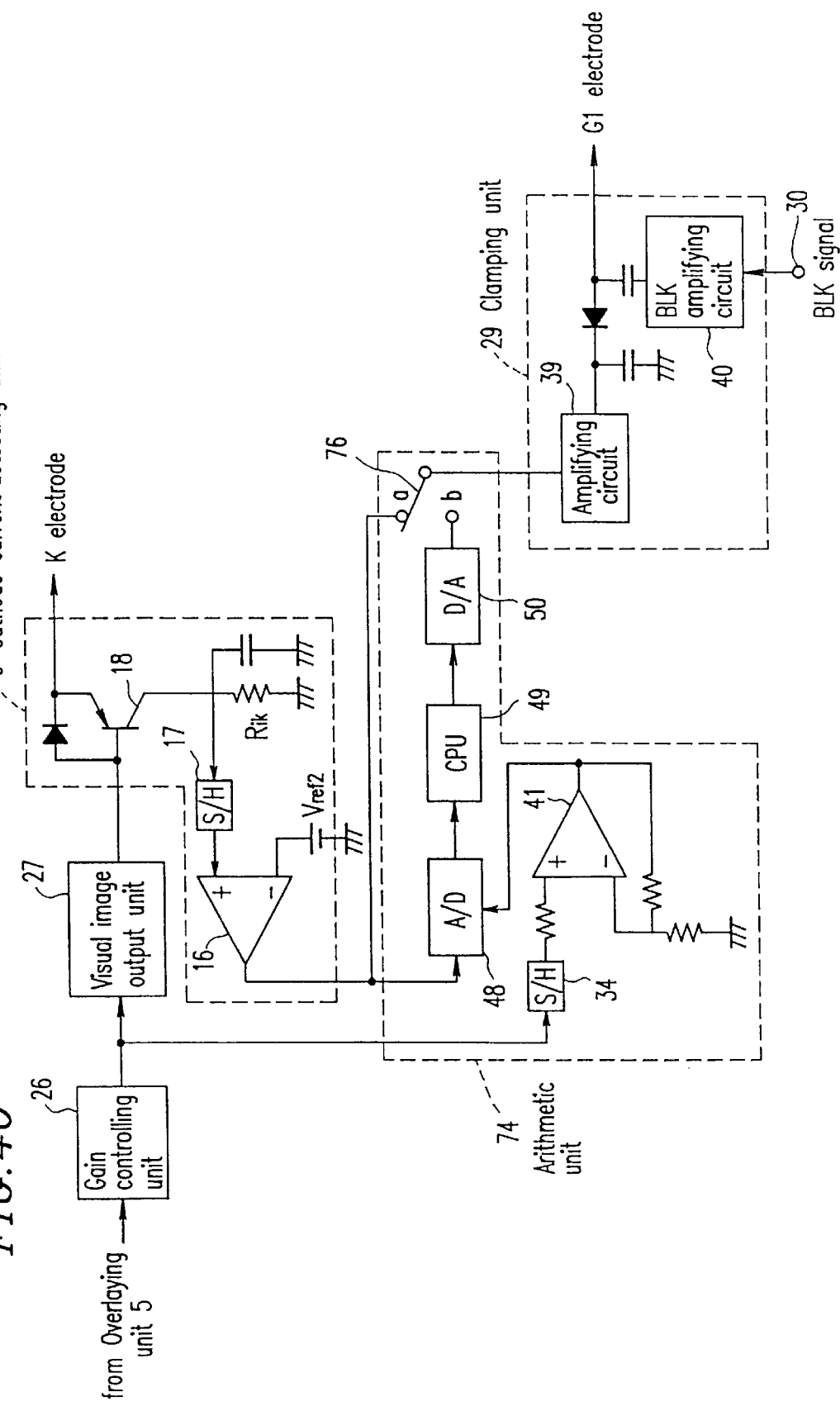
FIG. 40 is a block diagram for describing the brightness control operation in the fifth example.

In order to realize formula (1) with simple additions and subtractions, an amplifying circuit constituted of operation amplifiers 41 described in FIG. 40 is provided so that the sensitivities during the K and $G_1$ applications are almost the same. Therefore, formula (1) is transformed into formula (2) as follows.

$$V_{CONT2} = V_{CONT1} + \Delta V_{BRT} \qquad (2)$$

Since this makes it possible to effectively use the dynamic ranges of the A/D and the D/A, the arithmetic operation can be realized by multi-purpose 8-bit digital processing. Furthermore, since processing by complex arithmetic operation in the digital processing system becomes unnecessary, error in the arithmetic operation is small and highly accurate control can be realized.

As described above, even when the AKB is OFF, by performing the arithmetic processing based on the information during the ON state, stable color reproduction performance can be realized.

Although the description was given in this example of the case where the visual image signal is applied only to the cathode electrode, it is also effective in the parallel driving described in the first example.

As described above in this example, by performing automatic white balance adjustment by driving the cathode ray tube with the visual image signal overlaid with the brightness reference signal in the fly-back period, and by blanking the reference signal after the adjustment and by obtaining by arithmetic operation the brightness control signal with the detection signal which detected the wave height value of the reference signal before the blanking, highly stable color reproduction performance can be realized even in the OFF state of the AKB.

(Example 6)

Figure 42:
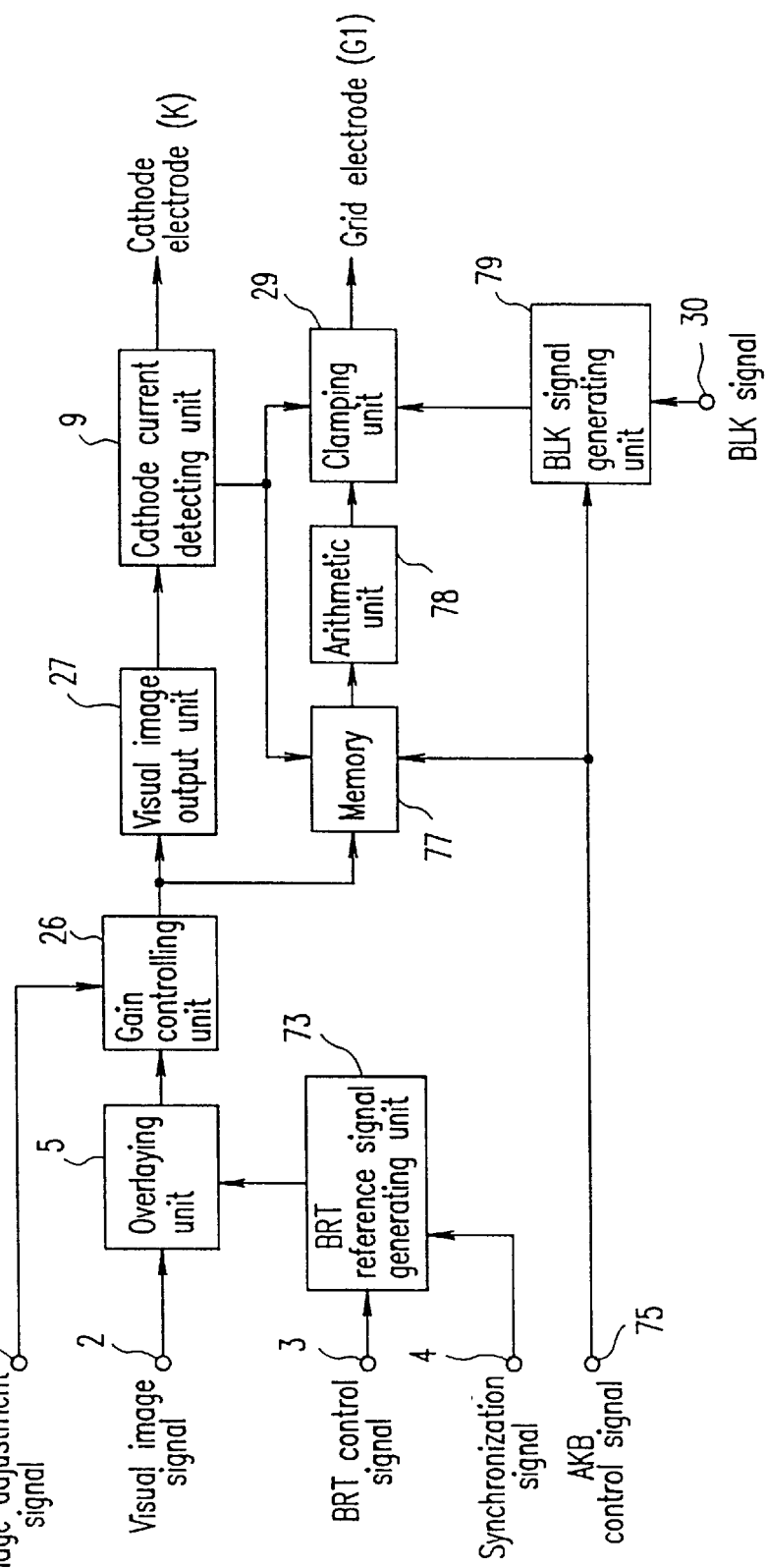
FIG. 42 is a block diagram for a visual image processing apparatus according to a sixth example of the present invention.

Next, a visual image signal processing apparatus according to a sixth example of the present invention will be described with reference to the figures. FIG. 42 illustrates a block diagram for the visual image signal processing apparatus according to the sixth example of the present invention.

In FIG. 42, reference numeral 75 designates an input terminal to which the AKB control signal for controlling the AKB operation is supplied, reference numeral 73 designates a BRT reference signal generating unit which generates the BRT signal, and reference numeral 9 designates a cathode current detecting unit which detects the cathode current of the BRT signal overlaid in the visual image output signal to be applied to the K electrode. Reference numeral 77 designates a memory which stores the BRT signal overlaid in the fly-back period of the visual image signal, the cathode current from the before-mentioned cathode current detecting unit 9 and the AKB control signal from the input terminal 75, reference numeral 78 designates an arithmetic unit which obtains by arithmetic operation the brightness control signal from respective data from the before-mentioned memory 77, and reference numeral 79 designates a BLK signal generating unit which generates the BLK signal based on the AKB control signal from the input terminal 75. Those elements which have similar functions as those in the first, second, third, fourth and fifth examples are designated by the same reference numerals and the descriptions thereof are omitted.

Operation of the visual image signal processing apparatus of the sixth example constituted as above will be described with reference to operational wave form diagrams in FIGS. 43(a) to 43(d).

Figure 43:
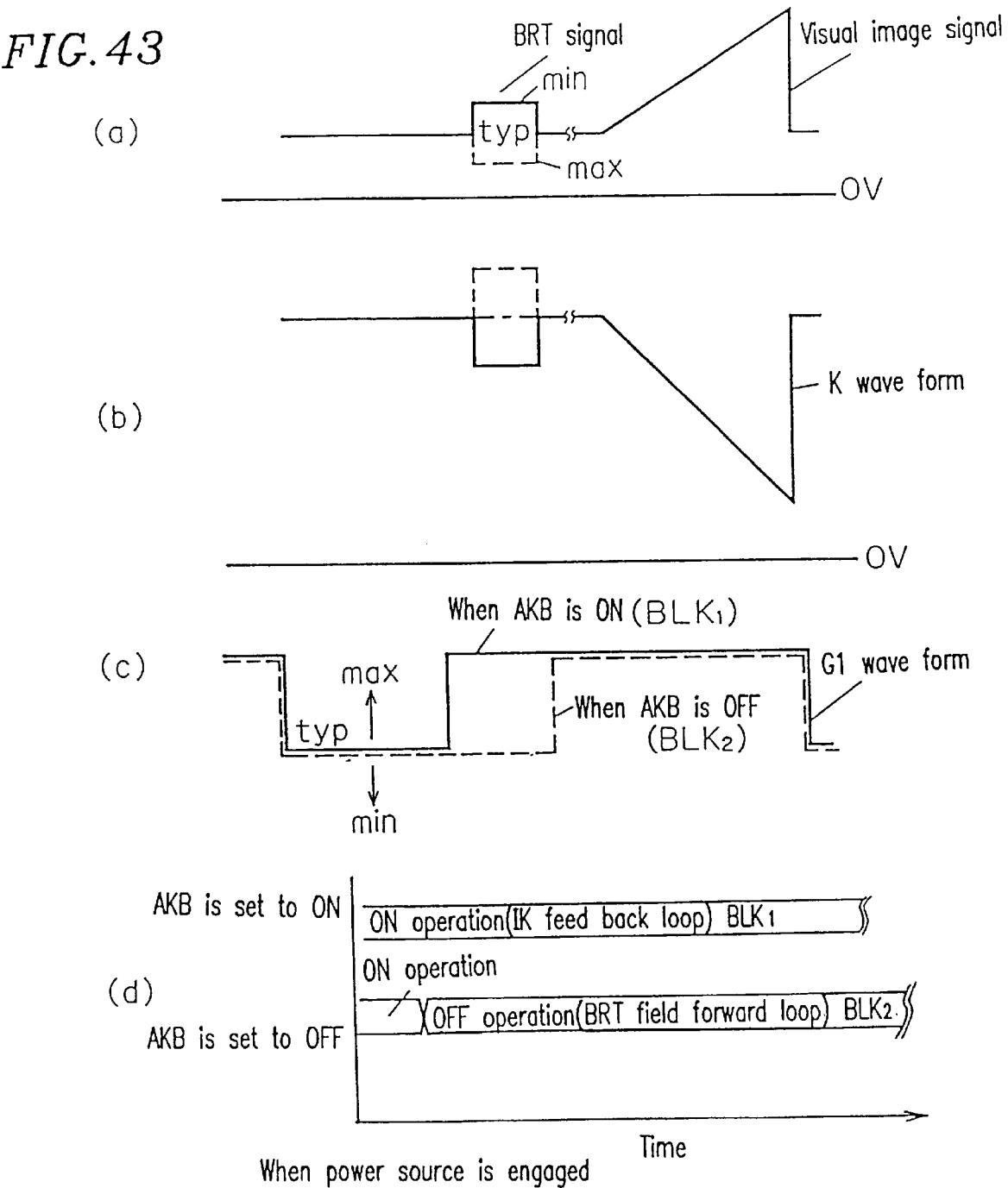
FIGS. 43(a) to (d) are operational wave form diagrams for describing the operation in the sixth example.

First, the operation when the AKB is ON will be described. As illustrated in FIG. 43(a), the BRT signal is overlaid in the vertical fly-back period. The cathode current detecting unit 9 detects the cathode current of this BRT signal, and the visual image output signal of negative polarity illustrated in FIG. 43(b) is applied to the cathode electrode. The signal which detected the cathode current of the BRT signal from the cathode current detecting unit 9 is compared with the reference voltage. Then, this output signal is supplied to the clamping unit 29 and, as illustrated by a solid line in FIG. 43(c), the direct current voltage of the $BLK_1$ signal is controlled so that the BRT control and the cut-off adjustment are automatically performed. Furthermore, as illustrated in the operational diagram in FIG. 43(d) where the AKB is set to the ON state, the closed loop operates continuously immediately after the power source is engaged.

Next, when the AKB is OFF, the pulse width of the BLK signal is controlled at the BLK signal generating unit 79 by the AKB control signal from the input terminal 75, and as illustrated by a broken line in FIG. 43(c), the $BLK_2$ signal is generated to perform blanking on the BRT signal. The wave height value data of the BRT signal from the gain controlling unit 26, the control data during the ON state from the cathode current detecting unit 9, and the setting data for setting the operational mode of the AKB from the input terminal 75 are supplied to the memory unit 77 for storage. Each data stored in the memory 77 are supplied to the arithmetic unit 78, and the control signal for performing the BRT control at the $G_1$ electrode of the cathode ray tube is obtained by arithmetic operation based on the control data of the AKB operation, the wave height value of the BRT signal and the control signal during the closed loop operation. As illustrated in the operational diagram during the OFF setting in FIG. 43(d), various data are taken in by compulsorily having the ON operation operating during the power source engagement and then the AKB is turned OFF and BRT control similar to that in the ON state is performed as illustrated in FIG. 43(c).

Figure 44:
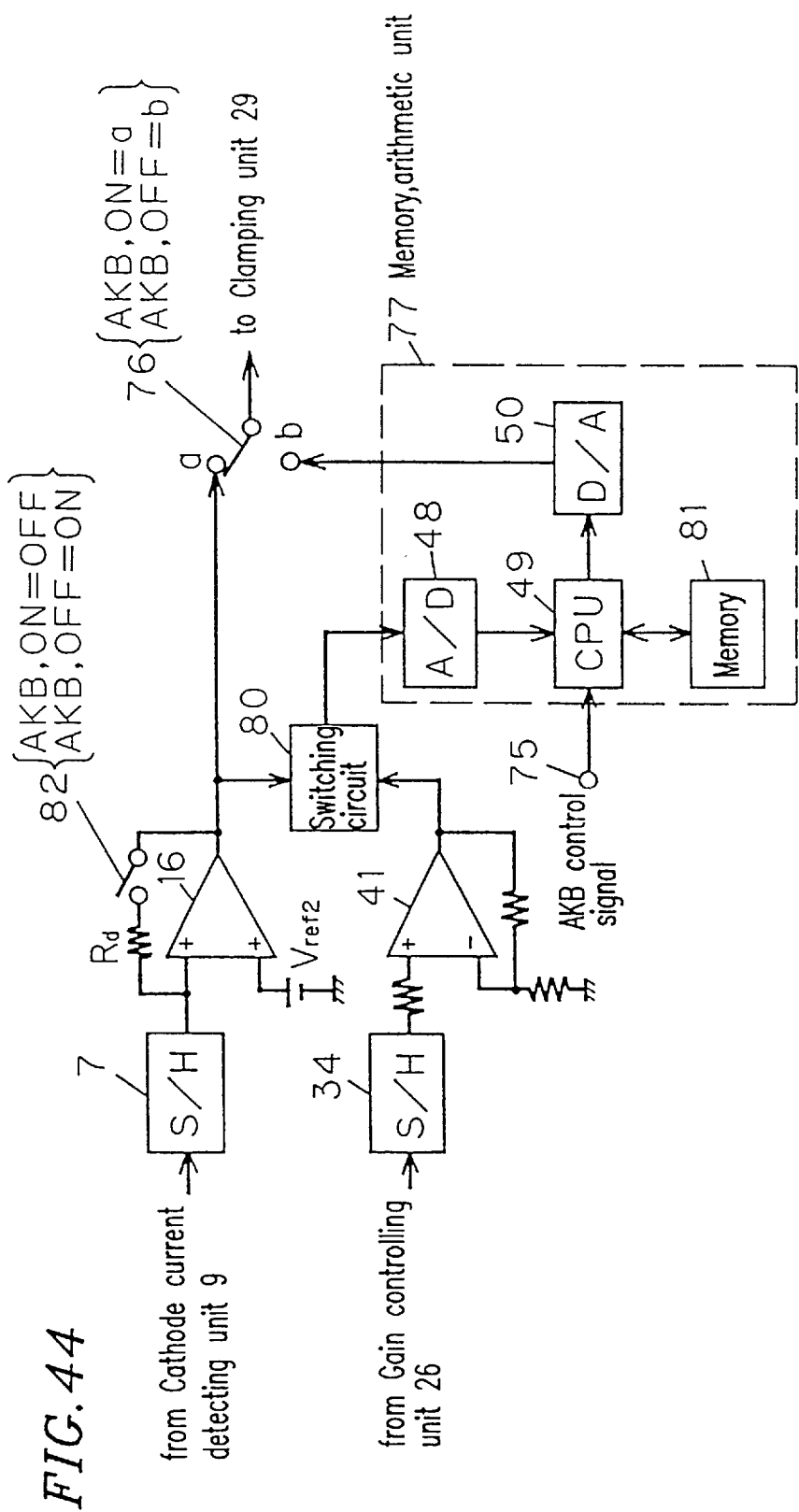
FIG. 44 is a block diagram for describing the brightness control operation in the sixth example.

Next, a data management method for ON/OFF control of the AKB will be described in detail with reference to a block diagram in FIG. 44 and characteristic and operational diagrams in FIGS. 45(a) to 45(c). Those elements in FIG. 44 which have similar functions as those in FIG. 42 are designated by the same reference numerals.

First, when the AKB is ON (indicated by ●), the comparative output $V_{CONT3}$ is supplied to the clamping unit 29 through the switching circuit 76 (a-side), and the closed loop BRT control is performed by changing the grid voltage in such a manner that the cathode current of the before mentioned BRT signal is always constant. The output signal $V_{CONT3}$ from the comparator 16 and the wave height value signal $V_{BRT3}$ of the BRT signal from the amplifier 41 illustrated in FIG. 45(a) are processed in a time sharing manner in the switching circuit 80, and the respective data are stored in the memory 81 through the A/D 48 and the CPU 49. Moreover, the AKB control signal is supplied to the CPU 49, and the AKB setting signal is also stored in the memory 81 together with the respective data mentioned before.

Figure 45:
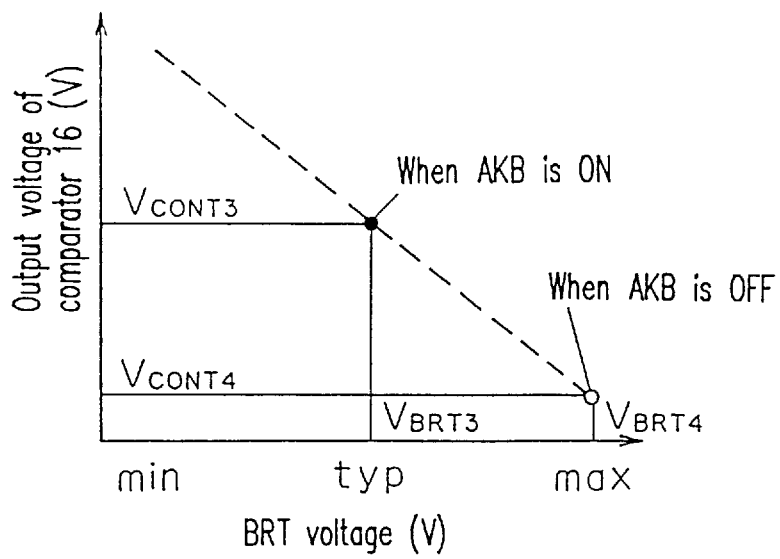
FIG. 45(a) is a characteristic view for describing the arithmetic operation in the sixth example. (b) illustrates the memory summary in the case where an image is received in a conventional television mode with the AKB being ON, and (c) illustrates the memory summary in the case where the image in the form of a computer signal is received.

Next, when the AKB is OFF (indicated by ○), based on data stored in the memory 81 when the AKB is ON, the control voltage $V_{CONT3}$ when the AKB is ON (indicated by ●) is detected from the BRT voltage versus output voltage characteristic when the AKB is ON illustrated by a broken line in FIG. 45(a). Then the control voltage $V_{CONT6}$ when the AKB is OFF (indicated by ○) is obtained by arithmetic operation from this information. This obtained signal is transformed into an analog signal by the D/A 50 and then this signal is switched by the switching circuit 76 (b-side) and supplied to the clamping unit 29 for the BRT control to be performed. FIG. 45(b) illustrates the memory summary in the case where an image is received in a conventional television mode with the AKB being ON, and FIG. 45(c) illustrates the memory summary in the case where the image of a computer signal is received. As illustrated in FIGS. 45(b) and 45(c), the control voltage $V_{CONT4}$=64 when the AKB is OFF is obtained from $V_{BRT3}$ and $V_{CONT3}$ when the AKB is ON as mentioned before. The detailed arithmetic method is the same as in the fifth example and the description thereof is omitted. The writing of data to the memory 81 is automatically performed when turning off the power source of the remote controller, when switching the signal, when escaping from the adjustment mode and the like, as in the case of the last memory function.

Figure 46:
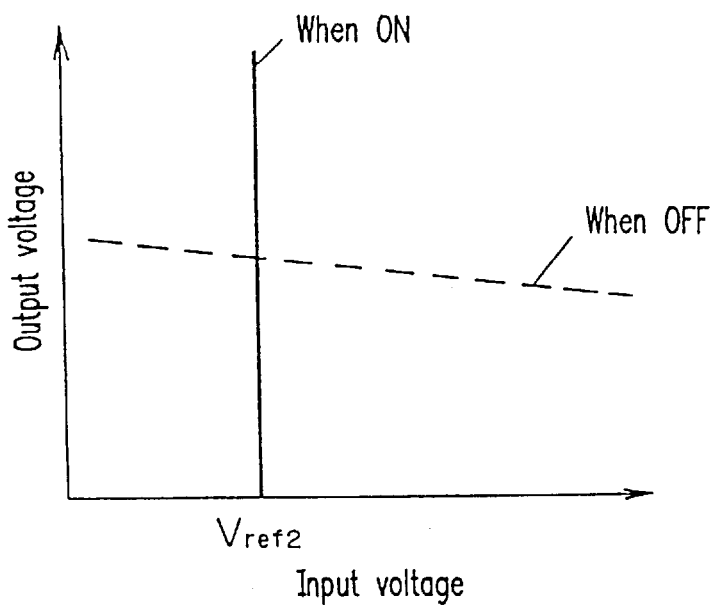
FIG. 46 is a characteristic view for describing the transitional response improvement operation during switching in the sixth example.

Moreover, as a method for improving the transitional response when the AKB is ON/OFF, the gain of the comparator 16 is switched. As shown in FIG. 46 which illustrates the input/output diagram of the comparator 16, the transitional response is improved by setting the gain high when the AKB is ON as illustrated by a solid line in the figure and by setting the gain low when the AKB is OFF by turning the damping resistor Rd on as illustrated by a broken line in the figure, thereby inhibiting a sudden change in brightness during switching and performing a stable ON/OFF.

As described above in this example, by performing the automatic white balance adjustment by driving the cathode ray tube by the visual image signal overlaid with the brightness reference signal in the fly-back period, and by storing in a memory the operational setting of the automatic adjustment, the wave height value of the reference signal and the control signal during the beam current detection and by obtaining by arithmetic operation the adjustment operational function and the brightness control signal after the adjustment from the stored signals, a highly stable color reproduction performance can be always realized regardless of the ON/OFF of the AKB.

(Example 7)

Figure 47:
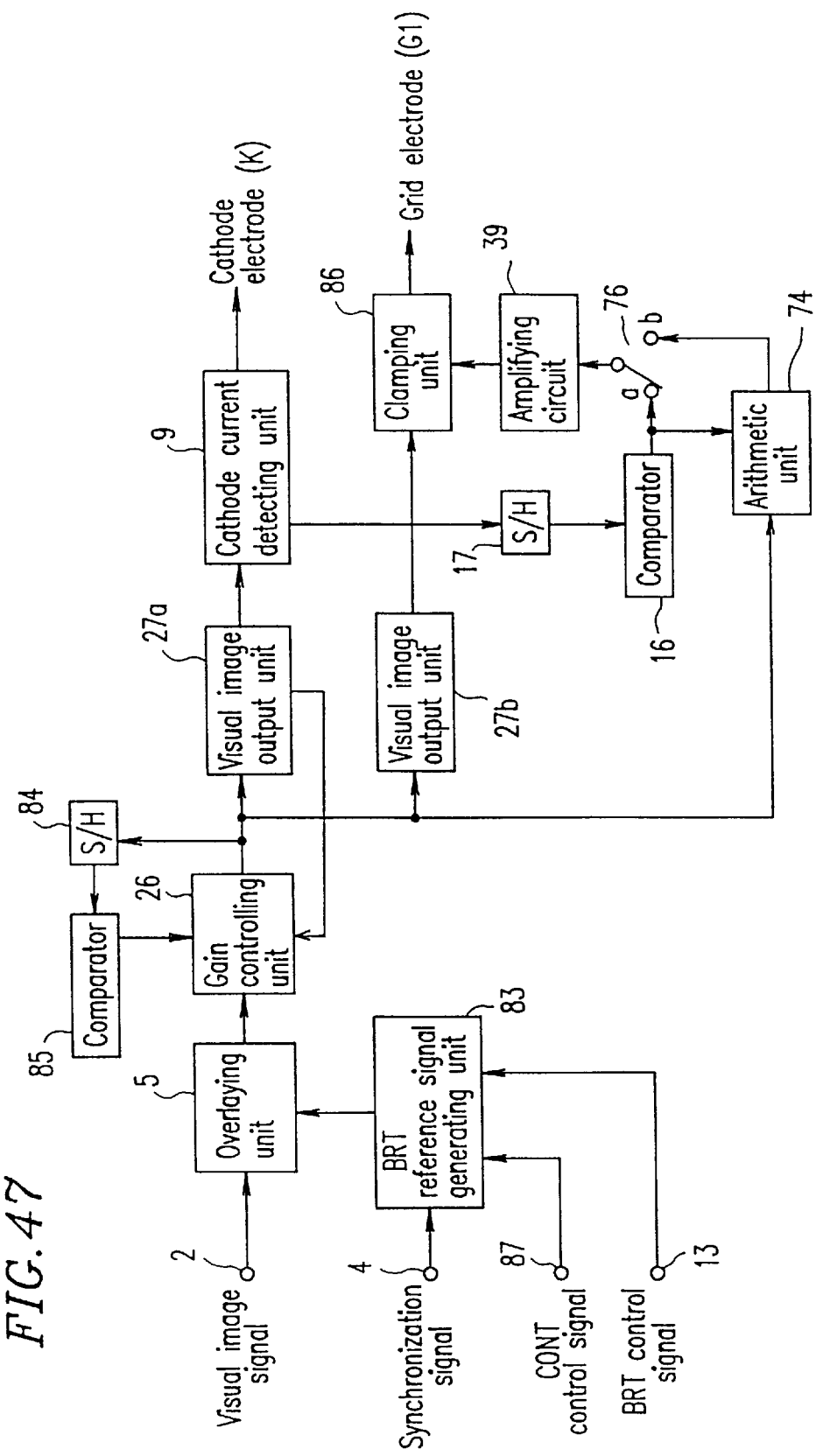
FIG. 47 is a block diagram for a visual image signal processing apparatus according to a seventh example of the present invention.

Next, a visual image signal processing apparatus according to a seventh example of the present invention will be described with reference to the figures. FIG. 47 illustrates a block diagram for the visual image signal processing apparatus according to the seventh example of the present invention.

In FIG. 47, reference numeral 83 designates a reference signal generating unit which generates a BRT signal and a CONT signal, reference numeral 87 is an input terminal for supplying a CONT control signal for controlling the contrast, and reference numeral 84 designates an S/H unit which performs sample holding on the wave height value of the contrast reference signal. Reference numeral 85 designates a comparator which performs a comparison between the wave height value of the contrast reference signal and the black level reference signal and outputs an amplitude value of the contrast reference signal. Reference numerals 27a and 27b designate visual image output units which amplify the visual image signal to a level for driving the cathode of the cathode ray tube, and reference numeral 86 designates a clamping unit which clamps the visual image output signal of positive polarity from the visual image output unit 27b. Those elements which have similar functions as those in the first, second, third, fourth, fifth and sixth examples are designated by the same reference numerals and the descriptions thereof are omitted.

Operation of the visual image signal processing apparatus of the seventh example constituted as above will be described with reference to operational wave diagrams in FIGS. 48(a) to 48(i). FIG. 48(a) illustrates a visual image signal to be supplied to the input terminal 2, and FIG. 48(b) illustrates a vertical synchronization signal synchronized with the polarization to be supplied to the input terminal 4.

The reference signal generating unit 83 produces the BRT signal in the vertical fly-back period illustrated in FIG. 48(c) and the CONT signal in the horizontal fly-back period illustrated in FIG. 48(d). The wave height value of the BRT signal is controlled by the BRT control signal from the input terminal 13, and the wave height value of the CONT signal is controlled by the CONT controlling signal from the input terminal 87. The BRT signal and the CONT reference signal from the reference signal generating unit 83 and the visual image signal are summed up in the overlaying unit 5. The visual image signal overlaid with each reference signal is output as illustrated in FIG. 48(a).

The signal from the overlaying unit 5 is gain-controlled in the gain controlling unit 26. The signal from the gain controlling circuit 26 is transformed into direct current voltage by sample-holding the level of the CONT signal at the S/H 84 with the S/H pulse illustrated in FIG. 48(g). The signal from the S/H 84 is supplied to the comparator 85 and compared with the GAIN reference voltage. The before-mentioned comparison output is supplied to the gain controlling unit 26, and feedback control on contrast is performed so that the wave height value of the CONT signal is always of a constant amplitude.

Figure 48:
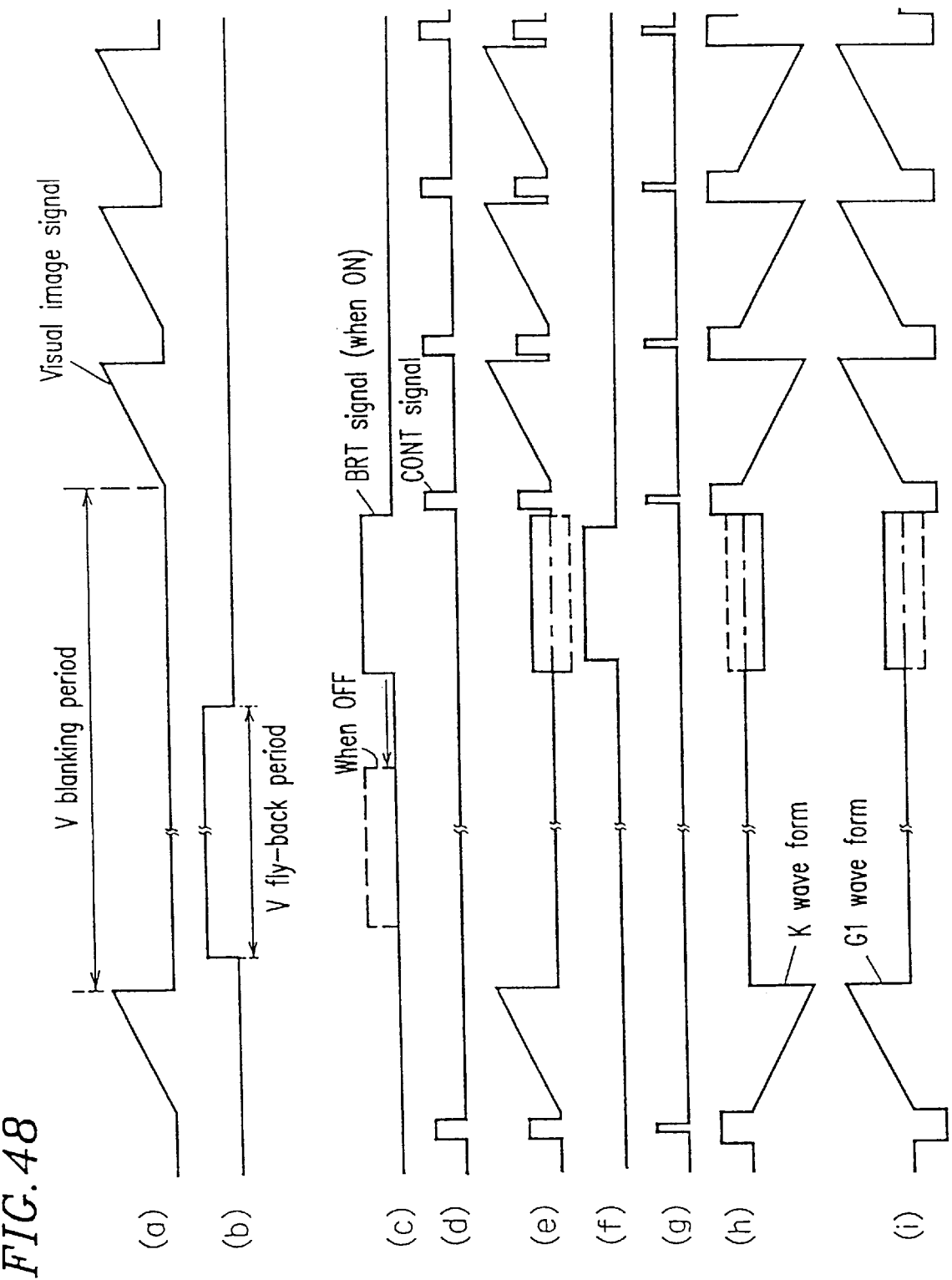
FIGS. 48(a) to (i) are operational wave form diagrams for describing the operation in the seventh example.

The signal from the gain controlling unit 26 is supplied to the cathode current detecting unit 9 through the visual image output unit 27a, and the beam current of the BRT signal overlaid in the vertical fly-back period is detected, and the visual image output signal of negative polarity in FIG. 48(*h*) is applied to the K electrode. The signal from the visual image output unit 27*a* is fed back to the gain controlling unit 26 and the feedback clamp is performed, and the driving system is stabilized and the fluctuation in color intensity during the open loop BRT control is inhibited.

First, operation of the BRT control when the AKB is ON will be described. The signal transformed into current/voltage from the cathode current detecting unit 9 is transformed into the direct current voltage by sample-holding the level of the BRT signal at the S/H 17 with the S/H pulse in FIG. 48(*f*). The signal from the S/H 17 is supplied to the comparator 16 and compared with the BIAS reference voltage, and the comparison output is supplied to the amplifying circuit 39 and the clamping unit 86 through the switching circuit 76 (a-side). The amplifying circuit 39 generates voltage for controlling the cut-off of the cathode ray tube. The controlling voltage from the amplifying circuit 39 and the visual image output signal of positive polarity from the visual image output unit 27*b* are supplied to the clamping unit 86, and are peak-clamped so that the wave height value of the BLK signal of the visual image output signal of positive polarity is set at the controlling voltage from the voltage controlling unit 12, and the visual image output signal in FIG. 48(*i*) is applied to the $G_1$ electrode. As described above, by performing the direct current reproduction of the closed loop with the cathode current of the BRT signal, the BRT control where the level of the BRT reference signal is always a constant black level is performed.

In the operation of the BRT control when the AKB is ON, as described in the second, third, fourth, fifth and sixth examples, the BRT signal is shifted to the V fly-back period as illustrated by a broken line in FIG. 48(*c*) and obtained by the arithmetic unit 74 from the wave height value of the BRT signal and the control signal when the AKB is ON. The open loop BRT control is performed by putting this arithmetic signal through the switching circuit 76 (b-side).

As described above, in the voltage feedback type CONT control, fluctuation or tracking among RGB is taken in the circuit system, and in the current feedback type closed loop BRT control, correction of all the chronological changes of the driving system, the cathode ray tube or the like is performed. Since the open loop BRT control in the state of this stable condition becomes possible, stable color reproducibility can be realized even when the AKB is OFF.

Figure 49:
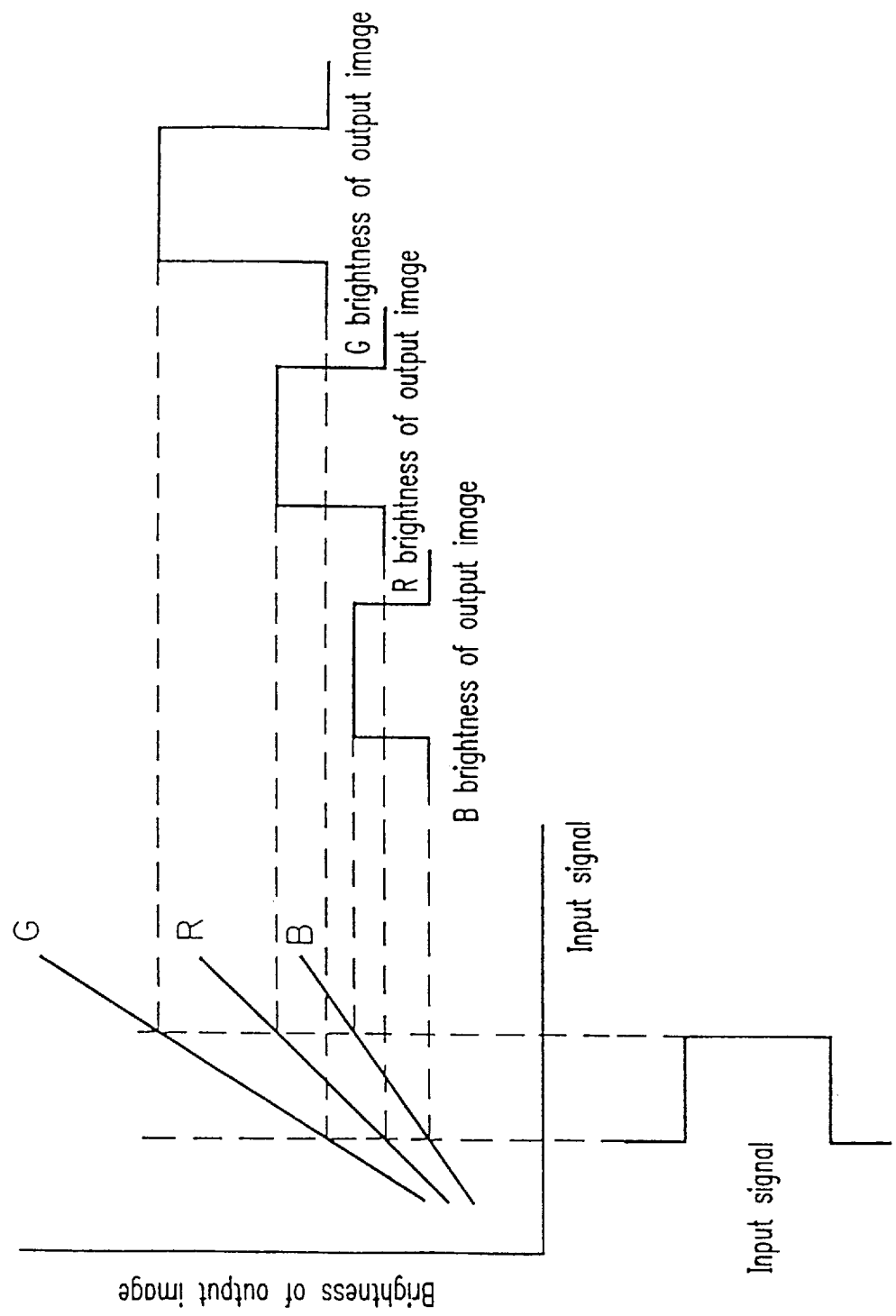
FIG. 49 is a characteristic view illustrating a relationship between the input signal and the brightness of the output image for describing the white balance adjustment operation in the seventh example.
Figure 50:
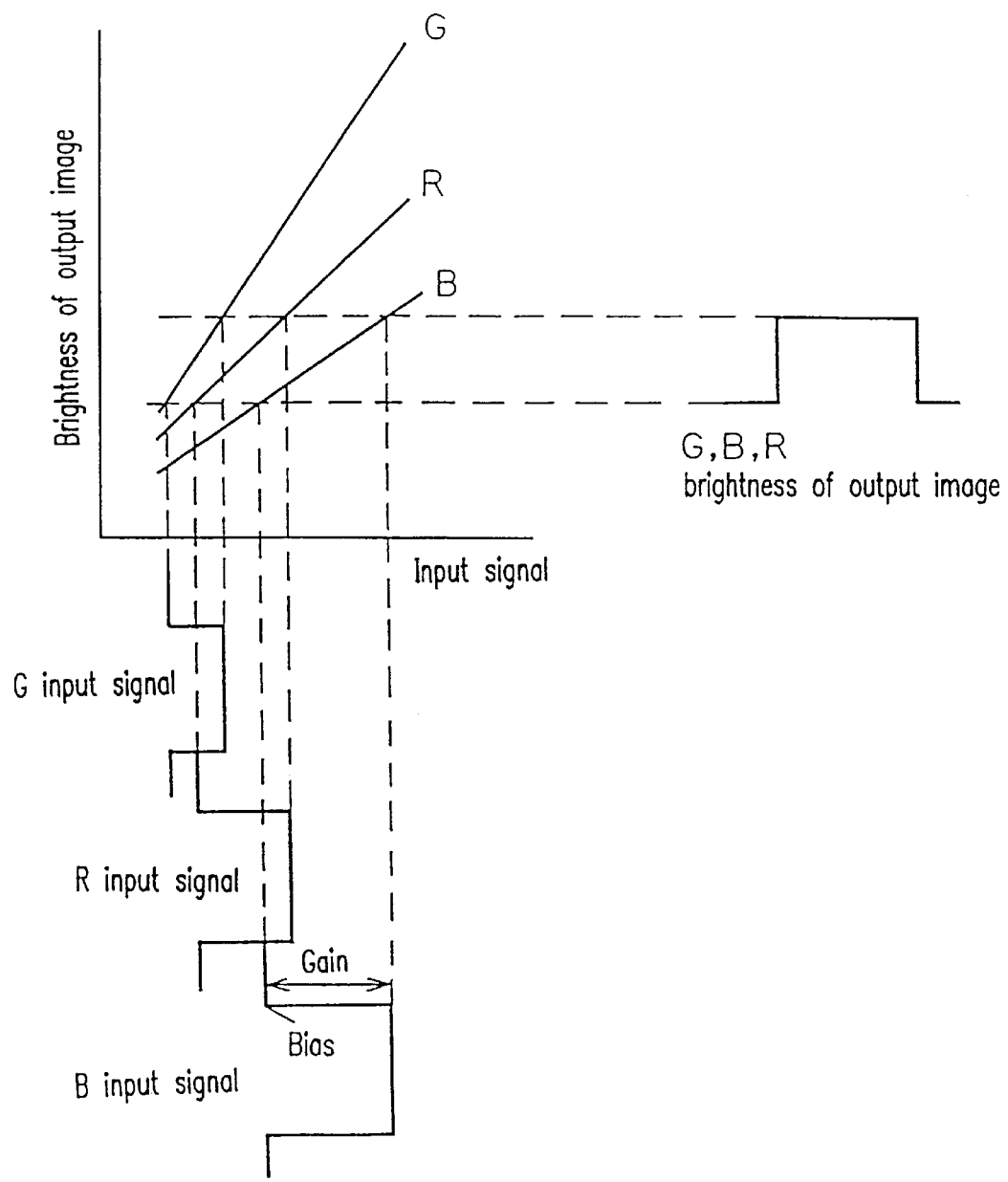
FIG. 50 is a characteristic view illustrating a relationship between the gain and the bias for describing the white balance adjustment operation in the seventh example.
Figure 51:
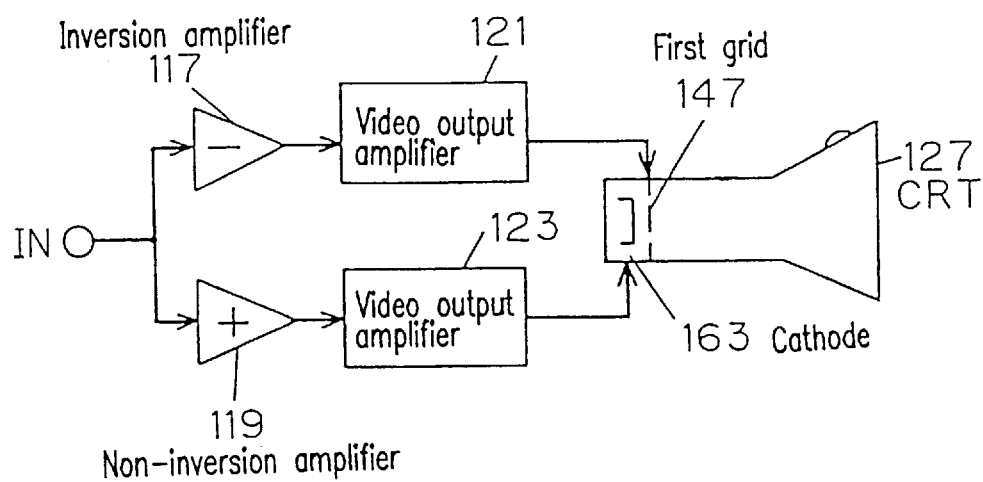
FIG. 51 is a block diagram for a conventional visual image signal processing apparatus.
Figure 52:
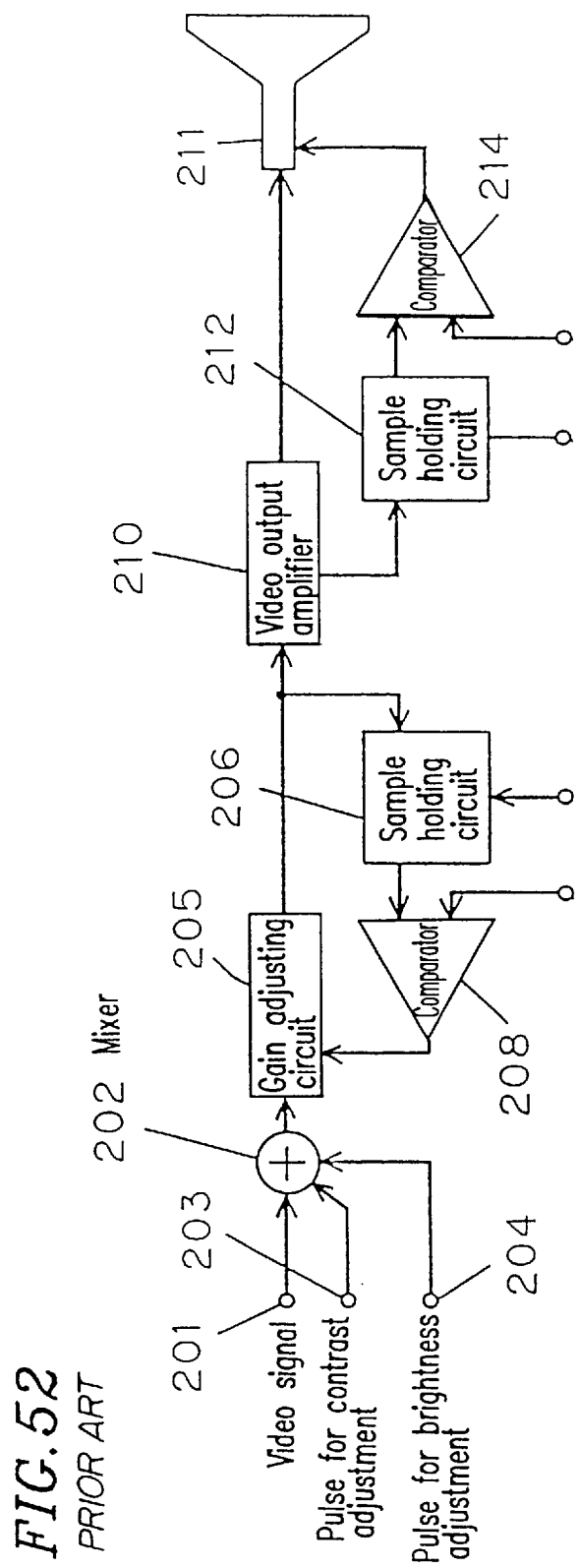
FIG. 52 is a block diagram for another conventional visual image signal processing apparatus.
Figure 53:
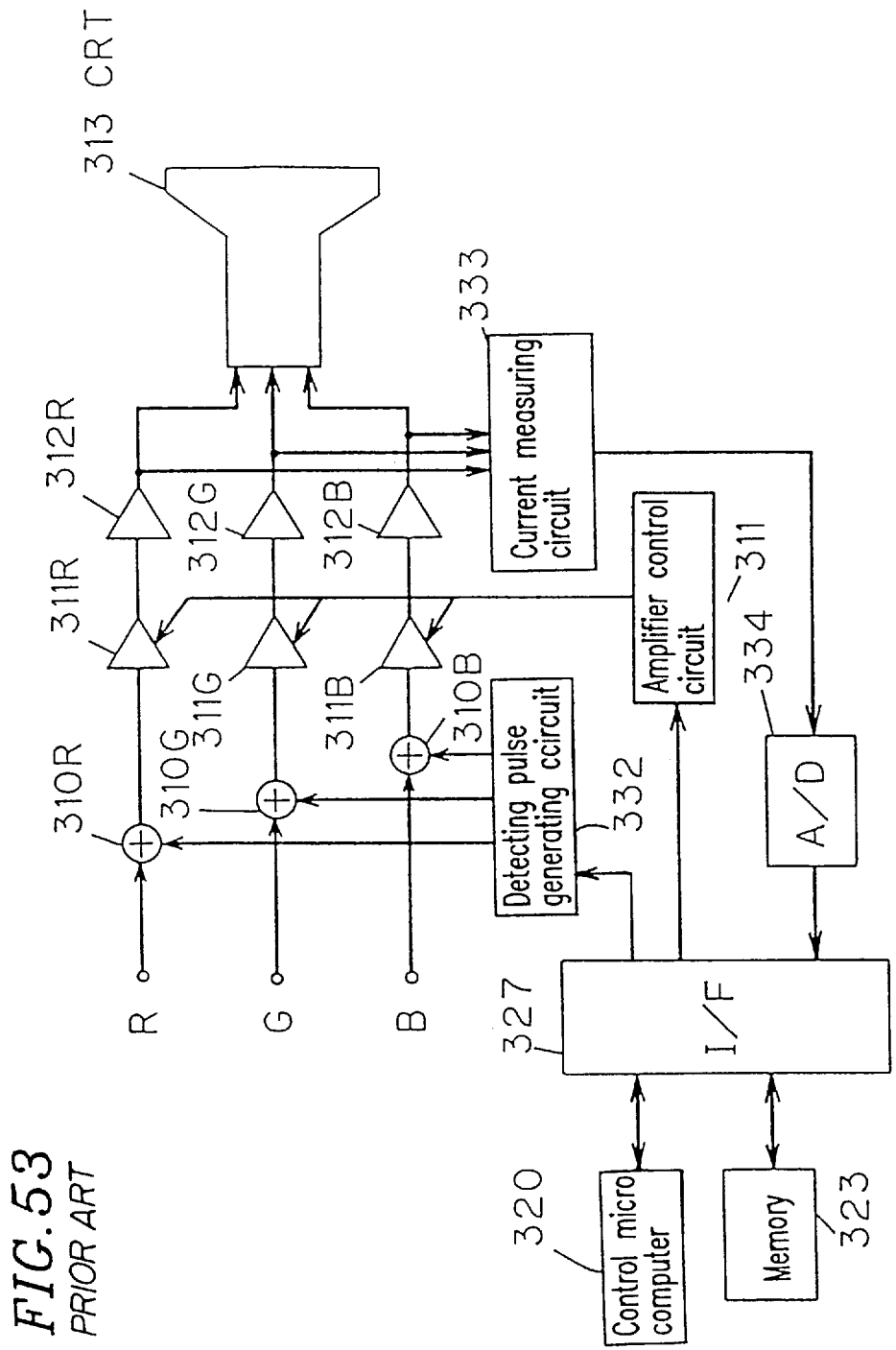
FIG. 53 is a block diagram for still another conventional visual image signal processing apparatus.

Next, the case where the white balance adjustment is performed will be described. The white balance adjustment is to correct color balance for every gradation attributed to the light emitting characteristics of the cathode ray tube. Since the light emitting characteristics of the cathode ray tube are generally not uniform among RGB and a relationship between an input signal and brightness of an output image differs as illustrated in FIG. 49, even if the same signal is input, the brightness of the image differs for RGB, respectively. Therefore, in order to make the brightness of the display image uniform, it is necessary to adjust the gain of the visual image signal and the $G_1$ voltage for RGB, respectively as illustrated in FIG. 50. This adjustment is called the gain of the white balance adjustment and the bias adjustment.

In the case where the low light in the vicinity of black of the bias adjustment is adjusted, the white balance adjustment of a low light level in the vicinity of black is performed by displaying a test signal of 0% or 25% of the black level signal and by changing the bias (BIAS) reference voltage of the comparator 16. Moreover, in the case where a high light level in the vicinity of white of the gain adjustment is to be corrected, the correction can be realized by displaying a test signal of 75% or 100% of the white level signal and by changing the gain (GAIN) reference voltage of the comparator 85 and then adjusting the white balance in the vicinity of white.

As described above, by applying a signal overlaid with the brightness reference signal and the contrast reference signal in the fly-back period of the input visual image signal to the cathode and the grid electrodes of the cathode ray tube, and by obtaining by arithmetic operation the brightness control signal to be applied to the grid electrode based on the detection signal which detected the beam current and the wave height value of the brightness reference signal, parallel driving having excellent color intensity tracking can be realized even if the AKB is off.

Although a visual image signal processing for a color television receiver is described in the present example, the present invention can also be used for other types of visual image signal processing such as a light writing type liquid crystal light valve. Moreover, although the description is given in this example of the case where the reference signal is overlaid in the fly-back period, other periods can be used if it is not affected by the visual image signal. Moreover, although the description is given in this example of the case where the signal is applied to the cathode electrode and the first grid electrode using the cathode ray tube, other configurations where signals are applied to other electrodes is possible. Moreover, although the description is given in this example of the case where the BRT control is performed by controlling the direct current voltage applied to the cathode electrode or the first grid electrode, the direct current voltage can be applied to the second grid electrode or other electrodes. Moreover, although the description is given in this example of the case where the cathode current of each reference signal is detected from the applied signal applied to the cathode electrode, the detection of beam current from the signal applied to other electrodes can be performed. Moreover, although the description is given in this example of the case where the BRT control signal and the auto cut-off detection signal are used for the same purpose, they can be provided separately. Moreover, although the description is given in this example of the case where the automatic white balance adjustment is performed by overlaying the reference signal, automatic adjustments such as image phase, static convergence or the like can be performed together.

Moreover, although the description is given in the first example of the case where the voltage/current feedback type control is performed on the visual image signal applied to the cathode electrode, it can be performed for other electrodes. Moreover, although the description is given in this example of the case where the data storage is digitally performed, it also can be performed by analog processing. Moreover, although the description is given in this example of the case where the voltage/current feedback control is performed on the visual image signal applied to the cathode electrode during the parallel driving, it can be performed for other electrodes. Moreover, although the description is given in this example of the case where a non-linear amplifying circuit is used as the gamma correction circuit, a polygonal line approximate circuit with several other points can be used.

Moreover, although the description is given in the second example of the case where the wave height value of the BRT signal is detected from the visual image signal from the gain controlling unit, the detection can be performed from any signal if the signal is already adjusted for the image.

Moreover, although the description is given in the third example of the case where arithmetic operation is performed from the wave height value of the BRT signal and the cathode current, the arithmetic operation can be performed using a variety of other signals such as image adjustment signal, the beam current or the like. Moreover, although the description is given in this example of the case where the direction and the amount of convergence are obtained from the wave height value of the BRT signal, they can be obtained using other signals.

Moreover, although the description is given in the fourth example of the case where the display condition is detected from the image size, brightness and color intensity, the image scene, image adjustment and the like, the detection can be performed using other signals if the change in the display condition can be extracted from the signals. Moreover, although the description is given in this example of the case where only the cut-off adjustment is performed, it can be performed with the BRT adjustment as in the first, second and third examples.

Moreover, although the description is given in the fifth example of the case where the luminescent line of the reference signal is turned ON/OFF using the blanking signal for erasing the fly-back line, it can be turned ON/OFF using other signals.

Moreover, although the description is given in the sixth example of the case where data are stored according to the last memory function, they can be stored in memory in other periods.

Moreover, although the description is given in the seventh example of the case where the feedback control is performed by overlaying the contrast reference signal and the brightness reference signal in the horizontal fly-back period and in the vertical fly-back period, respectively, the signals can be overlaid in other periods.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A visual image signal processing apparatus, comprising:

an overlaying unit for overlaying a brightness reference signal at a predetermined position in a fly-back period of an input visual image signal;

an output unit for applying an output from said overlaying unit to a cathode electrode of a cathode ray tube;

an arithmetic unit for obtaining, by arithmetic operation performed on said brightness reference signal overlaid in said input visual image signal, a control signal controlling a brightness; and a clamping unit for controlling a voltage applied to a grid electrode of said cathode ray tube in accordance with said control signal.

2. A visual image signal processing apparatus according to claim 1, wherein said predetermined position is in a vertical fly-back period of said input visual image signal.

3. A visual image signal processing apparatus according to claim 1, further comprising a detecting unit for detecting at least one of a wave height value of said brightness reference signal overlaid in said input visual image signal and a beam current flowing based on said brightness reference signal overlaid in said input visual image signal.

4. A visual image signal processing apparatus according to claim 1, wherein said arithmetic unit obtains by arithmetic operation said control signal based on said brightness reference signal overlaid in said input visual image signal and a light emitting characteristic of said cathode ray tube.

5. A visual image signal processing apparatus according to claim 1, wherein:

said arithmetic unit obtains by arithmetic operation said control signal based on a wave height value of said brightness reference signal overlaid in said input visual image signal, said visual image signal processing apparatus further comprising;

a detecting unit for detecting a beam current flowing based on said brightness reference signal overlaid in said input visual image signal; and a switching circuit for supplying to said clamping unit one of an output from said arithmetic unit and an output from said detecting unit.

6. A visual image signal processing apparatus according to claim 1, further comprising:

a detecting unit for detecting a beam current flowing based on said brightness reference signal overlaid in said input visual image signal, wherein;

said arithmetic unit obtains by arithmetic operation said control signal based on a wave height value of said brightness reference signal overlaid in said input visual image signal and an output from said detecting unit.

* * * * *